US012745064B2

(12) United States Patent
Fei et al.

(10) Patent No.: US 12,745,064 B2
(45) Date of Patent: Sep. 22, 2026

(54) DATA PROCESSING METHOD AND APPARATUS FOR GENERATING MAP DATA OF ROADSIDE DEVICE COVERAGE

(71) Applicant: Yinwang Intelligent Technologies Co., Ltd., Shenzhen (CN)

(72) Inventors: Wenkai Fei, Beijing (CN); Jianqin Liu, Beijing (CN); Yong Wu, Beijing (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 200 days.

(21) Appl. No.: 18/585,282

(22) Filed: Feb. 23, 2024

(65) Prior Publication Data

US 2024/0244410 A1 Jul. 18, 2024

Related U.S. Application Data

(63) Continuation of application No. PCT/CN2022/113648, filed on Aug. 19, 2022.

(30) Foreign Application Priority Data

Aug. 27, 2021 (CN) ......................... 202110996319.4

(51) Int. Cl.

| | |
|---|---|
| ***H04W 4/44*** | (2018.01) |
| ***G06F 16/29*** | (2019.01) |
| ***G08G 1/01*** | (2006.01) |
| ***H04W 24/08*** | (2009.01) |

(52) U.S. Cl.

CPC .............. *H04W 4/44* (2018.02); *G06F 16/29* (2019.01); *G08G 1/0116* (2013.01); *H04W 24/08* (2013.01)

(58) Field of Classification Search

CPC ......... H04W 4/44; H04W 24/08; G06F 16/29; G08G 1/0116

USPC ........................................................ 370/252

See application file for complete search history.

(56) References Cited

U.S. PATENT DOCUMENTS

| | | | | |
|---|---|---|---|---|
| 10,203,699 | B1 * | 2/2019 | Kim | G05D 1/0285 |
| 2019/0132709 | A1 | 5/2019 | Graefe et al. | |
| 2019/0227567 | A1 * | 7/2019 | Ko | G01C 21/3889 |
| 2019/0244518 | A1 * | 8/2019 | Cheng | G08G 1/0145 |
| 2019/0323855 | A1 * | 10/2019 | Mahler | G05D 1/0088 |
| 2021/0005085 | A1 * | 1/2021 | Cheng | G08G 1/012 |

(Continued)

FOREIGN PATENT DOCUMENTS

| | | | |
|---|---|---|---|
| CN | 111404999 | A | 7/2020 |
| CN | 112586007 | A | 3/2021 |

*Primary Examiner* — Nicholas R Taylor
*Assistant Examiner* — Chong G Kim
(74) *Attorney, Agent, or Firm* — Leydig, Voit & Mayer, Ltd.

(57) ABSTRACT

A data processing method and apparatus, applied to the field of electronic maps. Coverage information of a roadside device is stored in a map, so that content of the map is enriched, and the map can meet a higher-level use requirement of a user. The coverage information includes coverage region information that indicates at least one coverage region of the roadside device and coverage capability information that indicates a coverage capability of the roadside device in the at least one coverage region. The coverage information can be used to generate a control signal for controlling a vehicle, so that safety of autonomous driving or assisted driving can be improved.

28 Claims, 29 Drawing Sheets

(56) References Cited

U.S. PATENT DOCUMENTS

| | | | | |
|---|---|---|---|---|
| 2022/0345859 | A1* | 10/2022 | Falla Cepeda ..... | G01C 21/3841 |
| 2024/0169826 | A1* | 5/2024 | Fei ....................... | G08G 1/0116 |

* cited by examiner

Coverage region 5
Accuracy rate ≥ 95%
25 m
Coverage region 4
Accuracy rate ≥ 98%
15 m
Coverage scope
80 m
Vehicle V1
Communication device
301
Vehicle V2
Vehicle V2
Vehicle V1

11
First roadside device
14
Server
Report traffic participant information
Report traffic participant information
Report traffic participant information
13
Second terminal device
13
Second terminal device
13
Second terminal device

DATA PROCESSING METHOD AND APPARATUS FOR GENERATING MAP DATA OF ROADSIDE DEVICE COVERAGE

CROSS-REFERENCE TO RELATED APPLICATIONS

This application is a continuation of International Application No. PCT/CN2022/113648, filed on Aug. 19, 2022, which claims priority to Chinese Patent Application No. 202110996319.4, filed on Aug. 27, 2021. The disclosures of the aforementioned applications are hereby incorporated by reference in their entireties.

TECHNICAL FIELD

The embodiments relate to the field of electronic maps and to a data processing method and apparatus.

BACKGROUND

With the development of society, intelligent vehicles are gradually entering people's daily lives. A sensor plays a very important role in assisted driving and autonomous driving of the intelligent vehicles. Various sensors installed in a vehicle, such as a millimeter-wave radar, a lidar, an ultrasonic radar, or a camera, can sense an ambient environment, identify and track a moving object, and recognize a static scenario (for example, a lane line or a signboard) during driving of the vehicle. In a word, the sensor may detect a possible danger in advance and remind a driver in time, or assist the driver or automatically take measures to avoid the danger, thus effectively increasing safety and comfort of driving of the vehicle.

A high-definition map (HD MAP) is also referred to as a high-precision map. As one of key capabilities for implementing autonomous driving, the high-definition map becomes an effective supplement to existing autonomous driving sensors, and improves safety of autonomous driving decision-making of the vehicle. Compared with a traditional navigation map, the high-definition map that serves autonomous driving has higher requirements in all aspects and can cooperate with sensors and algorithms to support decision-making. During autonomous driving, an external environment dynamically changes and affects driving of the vehicle. Therefore, in addition to a static layer, the high-definition map increasingly needs more dynamic information to meet a development requirement in the transportation field. However, richness of existing map content cannot fully meet requirements of future use.

SUMMARY

Embodiments provide a data processing method and apparatus. A new type of map information, such as coverage information of a roadside device, is added to a map, so that richness of map information is improved, and a higher-level map use requirement can be met.

According to a first aspect, an embodiment provides a data processing method, and the method includes:

- obtaining coverage information of a roadside device, where the coverage information includes coverage region information that indicates at least one coverage region of the roadside device and coverage capability information that indicates a coverage capability of the roadside device in the at least one coverage region; and
- storing the coverage information as map data.

In embodiments, the coverage information of the roadside device is maintained on a map, to meet a use requirement of a user. Subsequently, when another device uses information provided by the roadside device, the another device may obtain the coverage region of the roadside device and the coverage capability in the coverage region from the map, where the coverage region and the coverage capability are used as references for how to use the information provided by the roadside device. For example, based on the coverage information, confidence of a sensing result of the roadside device in a region may be more accurately determined, or an indicator like robustness of a communication connection to the roadside device in a region may be determined, to improve reliability of autonomous driving or assisted driving.

The obtaining coverage information of a roadside device may be generating the coverage information of the roadside device. A cloud device, a roadside device, and a terminal device all have an information generation capability. Therefore, in this case, an execution body of the method may be a cloud device, a roadside device, or a terminal device, including, but not limited to, devices such as a map server on a cloud, an application server, a road side unit (RSU), an edge processor (MEC), a vehicle, or a portable terminal, or a component, a chip, a software module, or a hardware module in these devices.

The obtaining coverage information of a roadside device may alternatively be receiving the coverage information from the roadside device. In a case, the receiving operation is a receiving operation between devices based on wireless communication or wired communication. In this case, an execution body of the method may be a device like a cloud device, a roadside device, or a terminal device, including, but not limited to, a map server on a cloud, an application server, a road side unit (RSU), an edge processor (MEC), a vehicle, or a portable terminal. An application scenario includes, but is not limited to, information transmission between vehicles, information transmission between roads, information transmission between a vehicle and a cloud, or information transmission between a vehicle and a road. In another case, the receiving operation is a receiving operation invoked by a module in a device based on a bus, a wiring, an interface, or a parameter. In this case, an execution body of the method may be a component, a chip, a software module, or a hardware module in the foregoing device.

The storing the coverage information as map data means that the coverage information is stored in a map database in a compilation form or a storage format of other information in the map as information carried in the map. The execution body of the method may be located in a cloud, a roadside, or a terminal, and the map data may be correspondingly stored in a storage medium of the cloud, the roadside, or the terminal.

In another possible implementation, generating a map or updating a map based on the coverage information includes:

- generating or updating a layer in the map based on the coverage information. Further, the map may be a high-definition map.

In still another possible implementation, the coverage information further includes a tile identifier.

The coverage information may be associated with a tile based on the tile identifier, so that the coverage information can be easily maintained in a map data management manner.

The tile may be understood as follows: a map within a specific scope is cut into several rows and columns of rectangular raster pictures based on a specific size and format and different map resolutions, and the rectangular raster picture obtained through cutting is referred to as a tile. A higher map resolution indicates a larger quantity of cutting times, a larger quantity of tiles that form the map, and a higher tile level. When a cutting mode is cross cutting, a tile of a specific level includes 4 tiles of a corresponding higher level.

For example, a tile 1 is a tile of a specific level in the map. After cross-cutting is performed on the tile 1, four tiles of a level higher than the level of the tile 1 are generated, and the four tiles are identified as 1-00, 1-01, 1-10, and 1-11. It may be understood that a geographical coverage scope of the tile 1 is a union of a geographical coverage scope of the tile 1-00, a geographical coverage scope of the tile 1-01, a geographical coverage scope of the tile 1-10, and a geographical coverage scope of the tile 1-11.

In still another possible implementation, the coverage information further includes an identifier of the roadside device.

In a possible implementation, the at least one coverage region includes M communication coverage regions and N sensing coverage regions, where M and N are natural numbers, and M and N are not simultaneously 0.

For example, the coverage region may include one or more communication coverage regions, or may include one or more sensing coverage regions, or may include both a communication coverage region and a sensing coverage region.

The communication coverage region is used to reflect a communication capability of the roadside device, and the sensing coverage region is used to reflect a sensing capability of the roadside device.

In still another possible implementation, the at least one coverage region is classified by level based on the coverage capability in the at least one coverage region. For example, the coverage information includes coverage region information that indicates the M communication coverage regions and coverage capability information that indicates coverage capabilities of the roadside device in the M communication coverage regions. The M communication coverage regions are classified by level based on the coverage capabilities in the M communication coverage regions, where M is greater than 1.

The foregoing describes a possible case in which a plurality of communication coverage regions are included. Because different regions correspond to different coverage capabilities, different communication coverage regions are obtained through classification based on levels of the different coverage capabilities, to facilitate capability boundary determining. In addition, when the plurality of communication coverage regions are classified based on levels of capabilities, a structure of the coverage information is clearer, and management and use are facilitated.

In still another possible implementation, the coverage information includes coverage region information that indicates the N sensing coverage regions and coverage capability information that indicates coverage capabilities of the roadside device in the N sensing coverage regions. The N sensing coverage regions are classified by level based on the coverage capabilities in the N sensing coverage regions, where N is greater than 1.

The foregoing describes a possible case in which a plurality of sensing coverage regions are included. For details, refer to the foregoing description of the communication coverage region.

In still another possible implementation, at least one of the N sensing coverage regions corresponds to a sensing device group, and this is reflected on that the N sensing coverage regions include a multi-device sensing coverage region. The multi-device sensing coverage region and a coverage capability of the roadside device in the multi-device sensing coverage region are determined based on coverage capabilities of a plurality of sensing devices related to the roadside device.

The foregoing describes a possible implementation of the sensing coverage region. The plurality of sensing devices related to the roadside device may be a plurality of sensing devices included in the roadside device, or may be a plurality of sensing devices that are associated with the roadside device and that send sensing information to the roadside device. The sensing coverage region of the roadside device may correspond to an independent sensing device, or may correspond to a sensing device group. The sensing device group includes one or more sensing devices related to the roadside device.

For example, the sensing device group may include a lidar and a camera. Information sensed by the lidar and information sensed by the camera may be fused, to obtain a sensing coverage region about a fused sensing capability and a coverage capability corresponding to the sensing coverage region.

In still another possible implementation, the N sensing coverage regions respectively correspond to N sensing device groups, and the coverage information further includes identifiers of the sensing device groups.

It can be understood that, when the sensing coverage region corresponds to the sensing device group, the coverage information may include the identifier of the sensing device group, so that a structure of the sensing coverage information is clearer and use and management are facilitated.

In still another possible implementation, the N sensing coverage regions respectively correspond to N sensing devices, and the coverage information further includes identifiers of the sensing devices.

In still another possible implementation, in the N sensing coverage regions, a part of the sensing regions correspond to sensing device groups, the other part of the sensing regions correspond to sensing devices, and the coverage information further includes: an identifier of the sensing device group and an identifier of the sensing device.

For example, a coverage capability of the sensing device group may be obtained by fusing sensing capabilities of the plurality of sensing devices. Regions are classified by levels based on the fused coverage capability, to obtain a coverage region corresponding to the sensing device group.

For another example, a coverage region of the sensing device group may be obtained based on a union part of a plurality of coverage sub-regions, and each coverage sub-region may correspond to one sensing device in the sensing device group.

In still another possible implementation, the roadside device is related to a first sensing device and a second sensing device, the N sensing coverage regions include a first coverage region of the first sensing device and a second coverage region of the second sensing device, and the coverage capability information includes first coverage capability information that indicates a coverage capability of the first sensing device in the first coverage region and second coverage capability information that indicates a coverage capability of the second sensing device in the second coverage region.

In still another possible implementation, the coverage information further includes information about a dead zone, and the dead zone includes a communication dead zone, a sensing dead zone, or a communication dead zone and a sensing dead zone.

In still another possible implementation, when the coverage capability is a coverage capability of the roadside device in a communication coverage region, the coverage capability information indicates at least one of the following content:

a data accuracy rate, a packet loss rate, a communication delay, communication stability, and signal strength.

In embodiments, several types of content (or indicators) indicated by the coverage capability information are provided as an example. The coverage capability information indicates one or more of the foregoing content, so that design rationality of the coverage information can be improved, to facilitate subsequent use.

For example, during traveling, a vehicle may communicate with the roadside device at any time, and a communication status may be indicated based on communication stability of the roadside device, so that a communication requirement between the vehicle and the roadside device can be planned and adjusted in a timely manner.

In still another possible implementation, when the coverage capability is a coverage capability of the roadside device in a sensing coverage region, the coverage capability information indicates at least one of the following content:

a sensing result accuracy rate, a false detection rate, a missing detection rate, a recall rate, sensing precision, detection stability, and detection location precision.

For example, a sensing result is used for an autonomous driving policy. In this case, confidence of the sensing result is determined based on the sensing result accuracy rate and the recall rate that are indicated by the sensing capability, so that reliability of the autonomous driving policy can be improved.

In still another possible implementation, the coverage capability information indicates coverage capabilities in a plurality of environments.

For example, in different environments such as a sunny day, a rainy day, and a foggy day, coverage regions corresponding to a coverage capability may be different. For another example, regions corresponding to a coverage capability may be different under different temperature, humidity, and luminance conditions at different moments such as daytime and night. Based on coverage regions corresponding to a plurality of capabilities in a plurality of environments, a scenario factor may be appropriately considered when coverage information is subsequently used, to improve accuracy of the coverage information.

In still another possible implementation, the coverage region is a road section or a lane section, and it is more convenient to assist driving based on the coverage information.

In still another possible implementation, the coverage information is displayed on a display interface. The display interface includes, but is not limited to, a display on a vehicle, a display on a portable terminal, or a screen for screen projection. The coverage information is displayed on the display interface, so that the user can intuitively understand the coverage capability of the roadside device. A display manner may be graphical interface display. For example, the coverage region is displayed in a superimposed manner on a map display interface, or a coverage capability corresponding to the coverage region is further displayed. The display manner may alternatively be text display.

In still another possible implementation, the coverage information is sent. A map generation side device may add the coverage information to a map data packet and send the map data packet to a map usage side device.

In still another possible implementation, information processing is performed or a control signal is generated for controlling the vehicle based on the coverage information. The following is an example.

When a vehicle is located in a coverage region, based on the coverage region indicated by the coverage information and a coverage capability in the coverage region, a safety level of the vehicle is determined, or confidence of a sensing result from the roadside device is determined, or a first notification message is triggered to remind a user to enable an autonomous driving function of the vehicle or enable an assisted driving function of the vehicle, or a second notification message is triggered to remind the user to take over the vehicle.

The foregoing examples describe a plurality of possible implementation cases. It can be understood that reliability of the sensing result (or communication data) can be more accurately determined based on the coverage information of the roadside device. In a driving process, a plurality of information processing operations or vehicle control operations may be performed based on the coverage information, to improve driving safety.

According to a second aspect, an embodiment provides a data processing apparatus, including:

an obtaining unit, configured to obtain coverage information of a roadside device, where the coverage information includes coverage region information that indicates at least one coverage region of the roadside device and coverage capability information that indicates a coverage capability of the roadside device in the at least one coverage region; and a storage unit, configured to store the coverage information as map data.

In embodiments, the coverage information of the roadside device is maintained on a map, to meet a use requirement of a user. Subsequently, when another device uses information provided by the roadside device, the another device may obtain the coverage region of the roadside device and the coverage capability in the coverage region from the map, to provide reference for how to use the information provided by the roadside device. For example, based on the coverage information, confidence of a sensing result of the roadside device in a region may be more accurately determined, or an indicator such as robustness of a communication connection to the roadside device in a region may be determined, to improve reliability of autonomous driving or assisted driving.

The obtaining unit may be a processing unit configured to generate the coverage information of the roadside device. A cloud device, a roadside device, and a terminal device all have an information generation capability. Therefore, in this case, the data processing apparatus may be a cloud device, a roadside device, or a terminal device, including, but not limited to, devices such as a map server on a cloud, an application server, a roadside unit (RSU), an edge processor (MEC), a vehicle, or a portable terminal, or a component, a chip, a software module, or a hardware module in these devices.

The obtaining unit may also be a communication unit configured to receive the coverage information of the roadside device. In one case, the receiving operation is a receiving operation between devices based on wireless communication or wired communication. In this case, the data processing apparatus may be a device such as a cloud device, a roadside device, or a terminal device, including, but not limited to, a map server on a cloud, an application server, a roadside unit (RSU), an edge processor (MEC), a vehicle, or a portable terminal. An application scenario includes, but is not limited to, information transmission between vehicles, information transmission between roads, information transmission between a vehicle and a cloud, or information transmission between a vehicle and a road. In another case, the receiving operation is a receiving operation invoked by a module in a device based on a bus, a wiring, an interface, or a parameter. In this case, the data processing apparatus may be a component, a chip, a software module, or a hardware module in the foregoing device.

The storing the coverage information as map data means that the coverage information is stored in a map database in a compilation form or a storage format of other information in the map as information carried in the map. An execution body of the method may be located in a cloud, a roadside, or a terminal, and the map data may be correspondingly stored in a storage medium of the cloud, a storage medium of the roadside, or a storage medium of the terminal.

In still another possible implementation, the processing unit included in the apparatus generates a map or updates a map based on the coverage information. For example, the processing unit generates or updates a layer in the map based on the coverage information. Further, the map may be a high-definition map.

In still another possible implementation, the coverage information further includes a tile identifier.

The coverage information may be associated with a tile based on the tile identifier, so that the coverage information can be easily maintained in a management manner of the map data.

In still another possible implementation, the coverage information further includes an identifier of the roadside device.

In a possible implementation, the at least one coverage region includes M communication coverage regions and N sensing coverage regions, where M and N are natural numbers, and M and N are not simultaneously 0.

For example, the coverage region may include one or more communication coverage regions, or may include one or more sensing coverage regions, or may include both a communication coverage region and a sensing coverage region.

The communication coverage region is used to reflect a communication capability of the roadside device, and the sensing coverage region is used to reflect a sensing capability of the roadside device.

In still another possible implementation, the at least one coverage region is classified by level based on the coverage capability in the at least one coverage region. For example, the coverage information includes coverage region information that indicates the M communication coverage regions and coverage capability information that indicates coverage capabilities of the roadside device in the M communication coverage regions. The M communication coverage regions are classified by level based on the coverage capabilities in the M communication coverage regions, where M is greater than 1.

The foregoing describes a possible case in which a plurality of communication coverage regions are included. Because different regions correspond to different coverage capabilities, different communication coverage regions are obtained through classification based on levels of the different coverage capabilities, to facilitate capability boundary determining. In addition, when the plurality of communication coverage regions are classified based on levels of capabilities, a structure of the coverage information is clearer, and management and use are facilitated.

In still another possible implementation, the coverage information includes coverage region information that indicates the N sensing coverage regions and coverage capability information that indicates coverage capabilities of the roadside device in the N sensing coverage regions. The N sensing coverage regions are classified by level based on the coverage capabilities in the N sensing coverage regions, where N is greater than 1.

The foregoing describes a possible case in which a plurality of sensing coverage regions are included. For details, refer to the foregoing description of the communication coverage region.

In still another possible implementation, at least one of the N sensing coverage regions corresponds to a sensing device group, and this is reflected on that the N sensing coverage regions include a multi-device sensing coverage region. The multi-device sensing coverage region and a coverage capability of the roadside device in the multi-device sensing coverage region are determined based on coverage capabilities of a plurality of sensing devices related to the roadside device.

The foregoing describes a possible implementation of the sensing coverage region. The plurality of sensing devices related to the roadside device may be a plurality of sensing devices included in the roadside device, or may be a plurality of sensing devices that are associated with the roadside device and that send sensing information to the roadside device. The sensing coverage region of the roadside device may correspond to an independent sensing device, or may correspond to a sensing device group. The sensing device group includes one or more sensing devices related to the roadside device.

For example, the sensing device group may include a lidar and a camera. Information sensed by the lidar and information sensed by the camera may be fused, to obtain a sensing coverage region about a fused sensing capability and a coverage capability corresponding to the sensing coverage region.

In still another possible implementation, the N sensing coverage regions respectively correspond to N sensing device groups, and the coverage information further includes identifiers of the sensing device groups.

It can be understood that, when the sensing coverage region corresponds to the sensing device group, the coverage information may include the identifier of the sensing device group, so that a structure of the sensing coverage information is clearer and use and management are facilitated.

In still another possible implementation, the N sensing coverage regions respectively correspond to N sensing devices, and the coverage information further includes identifiers of the sensing devices.

In still another possible implementation, in the N sensing coverage regions, a part of the sensing regions correspond to sensing device groups, the other part of the sensing regions correspond to sensing devices, and the coverage information further includes: an identifier of the sensing device group and an identifier of the sensing device.

For example, a coverage capability of the sensing device group may be obtained by fusing sensing capabilities of the plurality of sensing devices. Regions are classified by levels based on the fused coverage capability, to obtain a coverage region corresponding to the sensing device group.

For another example, a coverage region of the sensing device group may be obtained based on a union part of a plurality of coverage sub-regions, and each coverage sub-region may correspond to one sensing device in the sensing device group.

In still another possible implementation, the roadside device is related to a first sensing device and a second sensing device, the N sensing coverage regions include a first coverage region of the first sensing device and a second coverage region of the second sensing device, and the coverage capability information includes first coverage capability information that indicates a coverage capability of the first sensing device in the first coverage region and second coverage capability information that indicates a coverage capability of the second sensing device in the second coverage region.

In still another possible implementation, the coverage information further includes information about a dead zone, and the dead zone includes a communication dead zone, a sensing dead zone, or a communication dead zone and a sensing dead zone.

In still another possible implementation, when the coverage capability is a coverage capability of the roadside device in a communication coverage region, the coverage capability information indicates at least one of the following content:

a data accuracy rate, a packet loss rate, a communication delay, communication stability, and signal strength.

In embodiments, several types of content (or indicators) indicated by the coverage capability information are provided as an example. The coverage capability information indicates one or more of the foregoing content, so that design rationality of the coverage information can be improved, to facilitate subsequent use.

For example, during traveling, a vehicle may communicate with the roadside device at any time, and a communication status may be indicated based on communication stability of the roadside device, so that a communication requirement between the vehicle and the roadside device can be planned and adjusted in a timely manner.

In still another possible implementation, when the coverage capability is a coverage capability of the roadside device in a sensing coverage region, the coverage capability information indicates at least one of the following content:

a sensing result accuracy rate, a false detection rate, a missing detection rate, a recall rate, sensing precision, detection stability, and detection location precision.

For example, a sensing result is used for an autonomous driving policy. In this case, confidence of the sensing result is determined based on the sensing result accuracy rate and the recall rate that are indicated by the sensing capability, so that reliability of the autonomous driving policy can be improved.

In still another possible implementation, the coverage capability information indicates coverage capabilities in a plurality of environments.

For example, in different environments such as a sunny day, a rainy day, and a foggy day, coverage regions corresponding to a coverage capability may be different. For another example, regions corresponding to a coverage capability may be different under different temperature, humidity, and luminance conditions at different moments such as daytime and night. Based on coverage regions corresponding to a plurality of capabilities in a plurality of environments, a scenario factor may be appropriately considered when coverage information is subsequently used, to improve accuracy of the coverage information.

In still another possible implementation, the coverage region is a road section or a lane section, and it is more convenient to assist driving based on the coverage information.

In still another possible implementation, the apparatus includes a display unit, and the display unit displays the coverage information on a display interface. The display interface includes, but is not limited to, a display on a vehicle, a display on a portable terminal, or a screen for screen projection. The coverage information is displayed on the display interface, so that the user can intuitively understand the coverage capability of the roadside device. A display manner may be graphical interface display. For example, the coverage region is displayed in a superimposed manner on a map display interface, or a coverage capability corresponding to the coverage region is further displayed. The display manner may alternatively be text display.

In still another possible implementation, the apparatus includes a communication unit, and the communication unit is configured to send the coverage information. A map generation side device may add the coverage information to a map data packet and send the map data packet to a map usage side device.

In still another possible implementation, the apparatus includes a processing unit, and the processing unit performs information processing or generates a control signal for controlling the vehicle based on the coverage information. The following is an example.

When a vehicle is located in a coverage region, based on the coverage region indicated by the coverage information and a coverage capability in the coverage region, a safety level of the vehicle is determined, or confidence of a sensing result from the roadside device is determined, or a first notification message is triggered to remind a user to enable an autonomous driving function of the vehicle or enable an assisted driving function of the vehicle, or a second notification message is triggered to remind the user to take over the vehicle.

According to a third aspect, an embodiment provides a data processing apparatus. The apparatus may include a processor, and the processor is configured to implement the data processing method according to any one of the first aspect or the possible implementations of the first aspect.

In a possible implementation, the apparatus may further include a memory. The memory is coupled to the processor. When executing a computer program stored in the memory, the processor may implement the data processing method according to any one of the first aspect or the possible implementations of the first aspect.

In still another possible implementation, the apparatus may further include a communication interface. The communication interface is configured to receive computer-executable instructions and transmit the computer-executable instructions to the processor, and the processor is configured to execute the computer-executable instructions, so that the data processing apparatus performs the data processing method according to any one of the first aspect or the possible implementations of the first aspect.

It should be noted that in embodiments, the computer program in the memory may be prestored, or may be downloaded from a network and stored when the device is used. A source of the computer program in the memory is not limited in embodiments. The coupling in embodiments may be an indirect coupling or a connection between apparatuses, units, or modules in an electrical form, a mechanical form, or another form, and is used for information exchange between the apparatuses, the units, or the modules.

According to a fourth aspect, an embodiment provides a non-transitory computer-readable storage medium. The non-transitory computer computer-readable storage medium stores a computer program. The computer program is executed by a processor to implement the data processing method according to any one of the first aspect or the possible implementations of the first aspect.

According to a fifth aspect, an embodiment provides a computer program product. When the computer program product is read and executed by a processor, the data processing method according to any one of the first aspect or the possible implementations of the first aspect is performed.

The solutions provided in the third aspect to the fifth aspect are used to implement or cooperate to implement the method provided in the first aspect, and therefore, can achieve beneficial effects the same as or corresponding to those in the first aspect. Details are not described herein again.

According to a sixth aspect, an embodiment provides a vehicle. The vehicle includes the data processing apparatus according to any one of the second aspect or the possible implementations of the second aspect, or includes the data processing apparatus according to any one of the third aspect or the possible implementations of the third aspect.

According to a seventh aspect, an embodiment provides a map, where the map includes coverage information of a roadside device. The coverage information includes coverage region information that indicates at least one coverage region of the roadside device and coverage capability information that indicates a coverage capability of the roadside device in the at least one coverage region.

The map in embodiments is a map product. For example, the map product may be a map data product that carries map information, for example, a map update data packet; or may be a map application product to which map information is loaded, for example, a map application that can be installed on a vehicle or a portable terminal; or may be a map display product that can present map information, for example, a paper map or an electronic navigator.

In embodiments, the coverage information of the roadside device is maintained on the map, to meet a use requirement of a user. Subsequently, when another device uses information provided by the roadside device, the another device may obtain the coverage region of the roadside device and the coverage capability in the coverage region from the map, to provide reference for how to use the information provided by the roadside device. For example, based on the coverage information, confidence of a sensing result of the roadside device in a region may be more accurately determined, or an indicator such as robustness of a communication connection to the roadside device in a region may be determined, to improve reliability of autonomous driving or assisted driving.

Further, the map may be a high-definition map.

In still another possible implementation, the coverage information further includes a tile identifier.

The coverage information may be associated with a tile based on the tile identifier, so that the coverage information can be easily maintained in a management manner of the map data.

In still another possible implementation, the coverage information further includes an identifier of the roadside device.

In a possible implementation, the at least one coverage region includes M communication coverage regions and N sensing coverage regions, where M and N are natural numbers, and M and N are not simultaneously 0.

For example, the coverage region may include one or more communication coverage regions, or may include one or more sensing coverage regions, or may include both a communication coverage region and a sensing coverage region.

The communication coverage region is used to reflect a communication capability of the roadside device, and the sensing coverage region is used to reflect a sensing capability of the roadside device.

In still another possible implementation, the at least one coverage region is classified by level based on the coverage capability in the at least one coverage region. For example, the coverage information includes coverage region information that indicates the M communication coverage regions and coverage capability information that indicates coverage capabilities of the roadside device in the M communication coverage regions. The M communication coverage regions are classified by level based on the coverage capabilities in the M communication coverage regions, where M is greater than 1.

The foregoing describes a possible case in which a plurality of communication coverage regions are included. Because different regions correspond to different coverage capabilities, different communication coverage regions are obtained through classification based on levels of the different coverage capabilities, to facilitate capability boundary determining. In addition, when the plurality of communication coverage regions are classified based on levels of capabilities, a structure of the coverage information is clearer, and management and use are facilitated.

In still another possible implementation, the coverage information includes coverage region information that indicates the N sensing coverage regions and coverage capability information that indicates coverage capabilities of the roadside device in the N sensing coverage regions. The N sensing coverage regions are classified by level based on the coverage capabilities in the N sensing coverage regions, where N is greater than 1.

The foregoing describes a possible case in which a plurality of sensing coverage regions are included. For details, refer to the foregoing description of the communication coverage region.

In still another possible implementation, at least one of the N sensing coverage regions corresponds to a sensing device group, and this is reflected on that the N sensing coverage regions include a multi-device sensing coverage region. The multi-device sensing coverage region and a coverage capability of the roadside device in the multi-device sensing coverage region are determined based on coverage capabilities of a plurality of sensing devices related to the roadside device.

The foregoing describes a possible implementation of the sensing coverage region. The plurality of sensing devices related to the roadside device may be a plurality of sensing devices included in the roadside device, or may be a plurality of sensing devices that are associated with the roadside device and that send sensing information to the roadside device. The sensing coverage region of the roadside device may correspond to an independent sensing device, or may correspond to a sensing device group. The sensing device group includes one or more sensing devices related to the roadside device.

For example, the sensing device group may include a lidar and a camera. Information sensed by the lidar and information sensed by the camera may be fused, to obtain a sensing coverage region about a fused sensing capability and a coverage capability corresponding to the sensing coverage region.

In still another possible implementation, the N sensing coverage regions respectively correspond to N sensing device groups, and the coverage information further includes identifiers of the sensing device group.

It can be understood that, when the sensing coverage region corresponds to the sensing device group, the coverage information may include the identifier of the sensing device group, so that a structure of the sensing coverage information is clearer and use and management are facilitated.

In still another possible implementation, the N sensing coverage regions respectively correspond to N sensing devices, and the coverage information further includes identifiers of the sensing device.

In still another possible implementation, in the N sensing coverage regions, a part of the sensing regions correspond to sensing device groups, the other part of the sensing regions correspond to sensing devices, and the coverage information further includes: an identifier of the sensing device group and an identifier of the sensing device.

For example, a coverage capability of the sensing device group may be obtained by fusing sensing capabilities of the plurality of sensing devices. Regions are classified by levels based on the fused coverage capability, to obtain a coverage region corresponding to the sensing device group.

For another example, a coverage region of the sensing device group may be obtained based on a union part of a plurality of coverage sub-regions, and each coverage sub-region may correspond to one sensing device in the sensing device group.

In still another possible implementation, the roadside device is related to a first sensing device and a second sensing device, the N sensing coverage regions include a first coverage region of the first sensing device and a second coverage region of the second sensing device, and the coverage capability information includes first coverage capability information that indicates a coverage capability of the first sensing device in the first coverage region and second coverage capability information that indicates a coverage capability of the second sensing device in the second coverage region.

In still another possible implementation, the coverage information further includes information about a dead zone, and the dead zone includes a communication dead zone, a sensing dead zone, or a communication dead zone and a sensing dead zone.

In still another possible implementation, when the coverage capability is a coverage capability of the roadside device in a communication coverage region, the coverage capability information indicates at least one of the following content:

a data accuracy rate, a packet loss rate, a communication delay, communication stability, and signal strength.

In embodiments, several types of content (or indicators) indicated by the coverage capability information are provided as an example. The coverage capability information indicates one or more of the foregoing content, so that design rationality of the coverage information can be improved, to facilitate subsequent use.

For example, during traveling, a vehicle may communicate with the roadside device at any time, and a communication status may be indicated based on communication stability of the roadside device, so that a communication requirement between the vehicle and the roadside device can be planned and adjusted in a timely manner.

In still another possible implementation, when the coverage capability is a coverage capability of the roadside device in a sensing coverage region, the coverage capability information indicates at least one of the following content:

a sensing result accuracy rate, a false detection rate, a missing detection rate, a recall rate, sensing precision, detection stability, and detection location precision.

For example, a sensing result is used for an autonomous driving policy. In this case, confidence of the sensing result is determined based on the sensing result accuracy rate and the recall rate that are indicated by the sensing capability, so that reliability of the autonomous driving policy can be improved.

In still another possible implementation, the coverage capability information indicates coverage capabilities in a plurality of environments.

For example, in different environments such as a sunny day, a rainy day, and a foggy day, coverage regions corresponding to a coverage capability may be different. For another example, regions corresponding to a coverage capability may be different under different temperature, humidity, and luminance conditions at different moments such as daytime and night. Based on coverage regions corresponding to a plurality of capabilities in a plurality of environments, a scenario factor may be appropriately considered when coverage information is subsequently used, to improve accuracy of the coverage information.

In still another possible implementation, the coverage region is a road section or a lane section, and it is more convenient to assist driving based on the coverage information.

According to an eighth aspect, an embodiment provides a non-transitory computer-readable storage medium. The non-transitory computer-readable storage medium stores the map according to any one of the seventh aspect or the implementations of the seventh aspect.

BRIEF DESCRIPTION OF DRAWINGS

The following briefly describes the accompanying drawings for embodiments.

DETAILED DESCRIPTION OF EMBODIMENTS

The following describes embodiments with reference to the accompanying drawings in embodiments.

Figure 1:
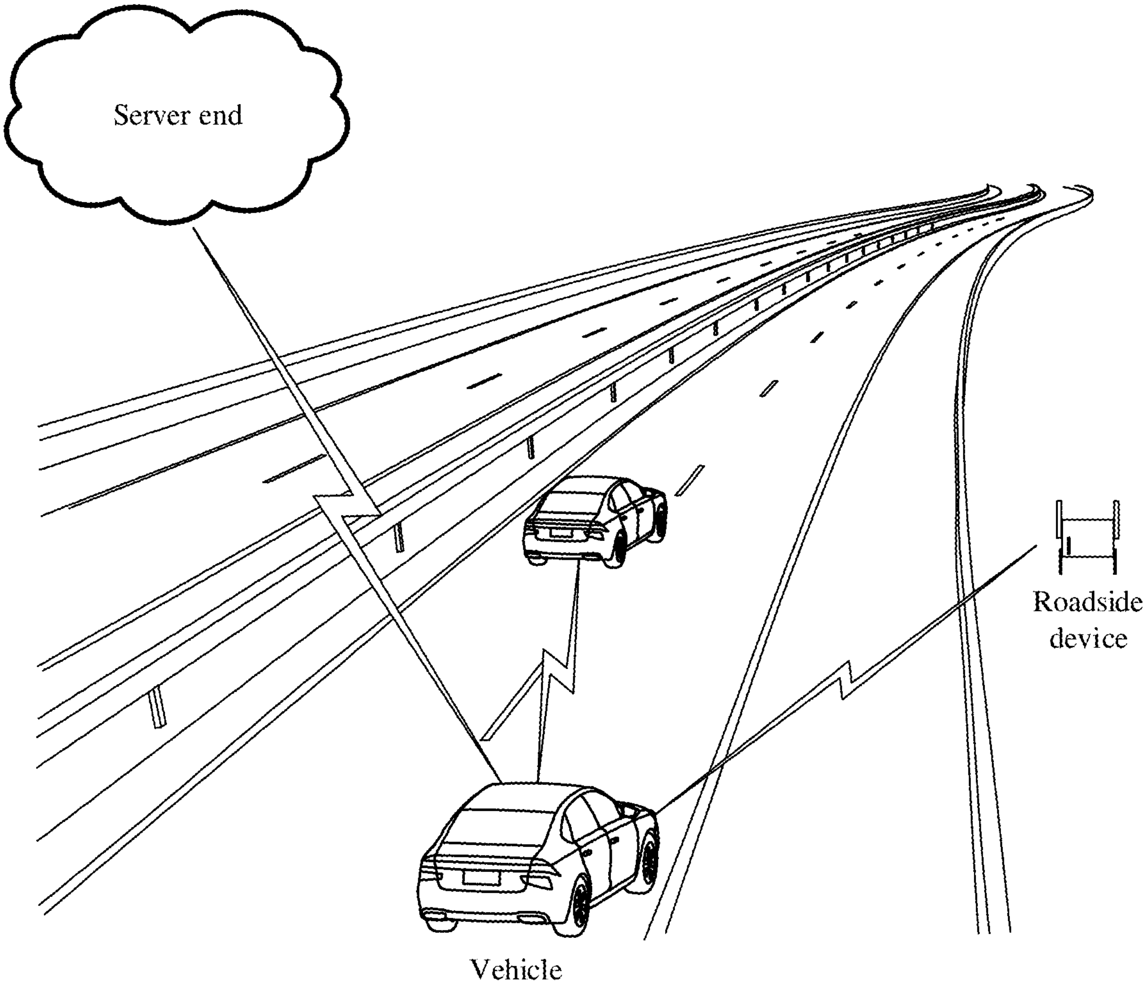
FIG. 1 is a schematic diagram of an application scenario to which an embodiment is applicable.

FIG. 1 is a schematic diagram of an application scenario to which an embodiment is applicable. FIG. 1 is also a schematic diagram of a communication system, where a roadside device, a vehicle, and a server end are included.

(1) The roadside device may be disposed on a roadside (or at a road intersection or on a road side). The roadside device may communicate with the server end and/or the vehicle to implement a plurality of function services. For example, the roadside device collects peripheral information and provides the peripheral information to the server end and/or the vehicle, and the roadside device provides one or more services such as vehicle identification, electronic toll collection, and electronic point deduction for the vehicle. The roadside device may include a sensing device (or referred to as a sensor) and/or a communication device.

The sensing device of the roadside device may collect peripheral information (for example, road information), to provide a vehicle-road collaboration service. Optionally, the sensing device may include one or more of a millimeter wave radar, a lidar, a visual sensor (for example, a camera), or the like.

The roadside device has a specific coverage scope, and the coverage scope indicates a region in which the roadside device can provide a service. Further, the coverage scope may include at least one of a sensing coverage scope, a communication coverage scope, and the like.

Figure 2:
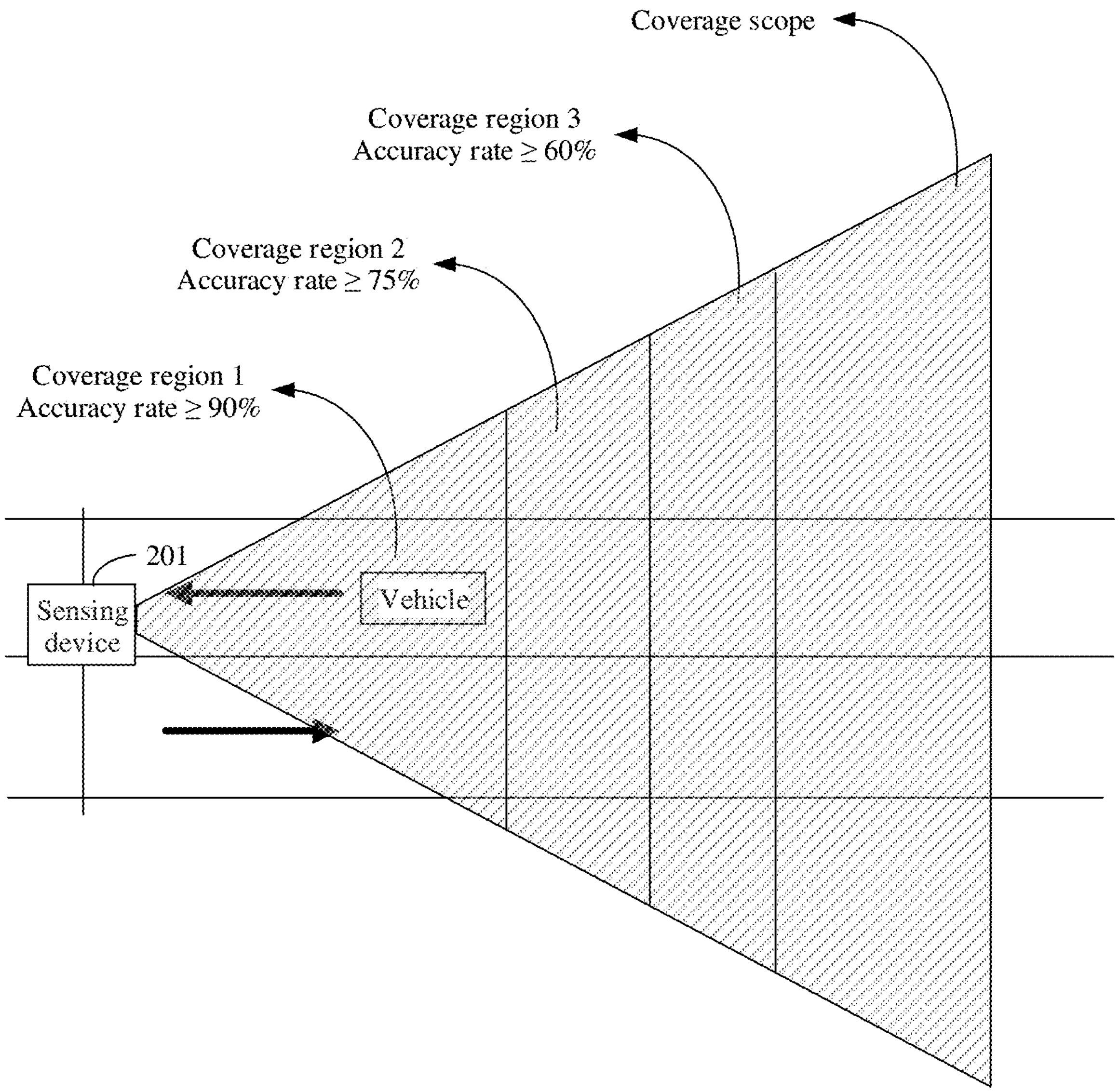
FIG. 2 is a schematic diagram of a sensing coverage scope according to an embodiment.

For example, the roadside device includes a lidar. The roadside device may perform target detection by using the lidar, and a view scope of the lidar of the roadside device may be considered as a sensing coverage scope of the roadside device. For example, refer to FIG. 2. FIG. 2 is a schematic diagram of a possible sensing coverage scope according to an embodiment o. A sensing device 201 may be considered as a roadside device or a module in a roadside device (or the sensing device 201 may be connected to a roadside device). A coverage scope of the sensing device 201 is shown in the figure. Different regions in the coverage scope correspond to different coverage capabilities. As shown in FIG. 2, for example, a coverage capability is described by using an accuracy rate, and different regions in the coverage scope correspond to different accuracy rates of a sensing result. Generally, as a distance to the sensing device 201 becomes longer, an accuracy rate of the sensing result becomes lower. In other words, a coverage capability gradually becomes weaker.

The communication device of the roadside device may support communication between the roadside device and another device (for example, a vehicle, a cloud, or another roadside device). The communication device may receive data sent from the outside and/or send data to the outside. For example, the communication device may include a module or an interface related to a wired link like an Ethernet cable, or may include a module or an interface related to a wireless link technology (Wi-Fi, Bluetooth, universal wireless transmission, a vehicle-mounted short-range communication technology, or the like) or the like, or may include both a module or an interface related to a wired link and a module or an interface related to a wireless link technology. When the roadside device includes a communication device (for example, when the roadside device includes a road side unit (RSU) or is a road side unit), the roadside device can communicate with a device like a nearby vehicle, another roadside device, a server, or a terminal by using the communication device. The terminal may be an electronic device, for example, a mobile phone, a portable computer, or an intelligent wearable device. A region in which communication can be implemented with the communication device in the roadside device may be considered as a communication coverage scope of the roadside device.

In a possible implementation, the communication device of the roadside device may include a radio frequency part and a baseband part. The radio frequency part includes an antenna and a radio frequency circuit. A region that can be reached by a radio signal transmitted by the roadside device by using the antenna may be considered as a communication coverage scope of the roadside device. Alternatively, a region in which the roadside device can receive a signal by using the antenna may be considered as a communication coverage scope of the roadside device.

Figure 3:
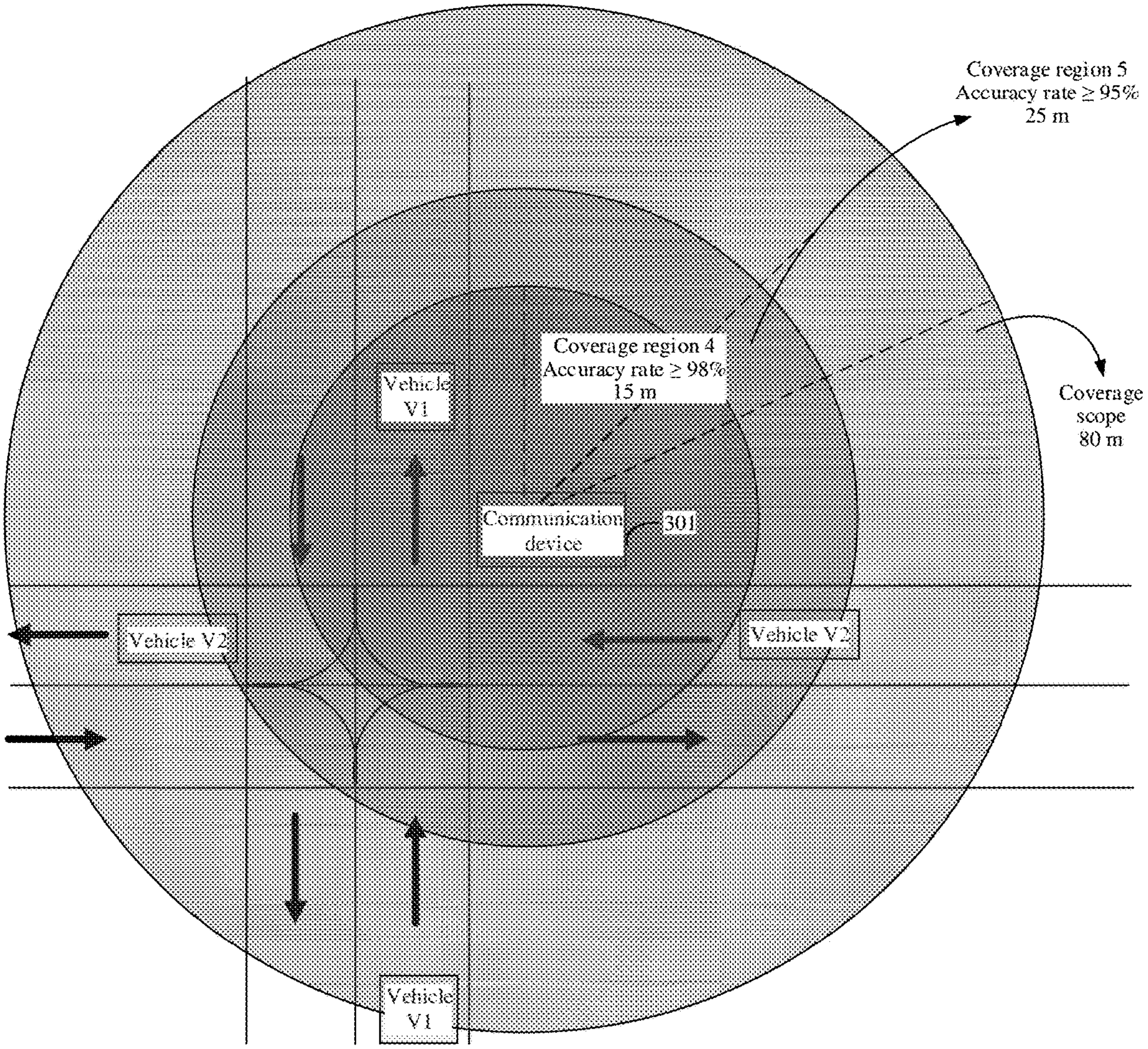
FIG. 3 is a schematic diagram of a communication coverage scope according to an embodiment.

For example, refer to FIG. 3. FIG. 3 is a schematic diagram of a possible communication coverage scope according to an embodiment. A communication device 301 may be considered as a roadside device or a module in a roadside device (or the communication device 301 may be connected to a roadside device). A coverage scope of the communication device 301 is shown in the figure. Different regions in the coverage scope correspond to different coverage capabilities. For example, a coverage capability is described by using an accuracy rate, and different regions correspond to different accuracy rates of a sensing result. Generally, as a distance to the communication device 301 becomes longer, an accuracy rate of a result of data transmission in a communication process becomes lower. In other words, a communication capability gradually becomes weaker.

In embodiments, coverage information of the roadside device is provided to a vehicle, so that the vehicle selects or processes, based on the coverage information, environment information provided by the roadside device, to improve accuracy of environment information used by the vehicle, and improve driving safety of the vehicle.

It should be noted that the roadside device may be an independent device, or may be integrated into another device. For example, the roadside apparatus may be integrated into a device like an intelligent gas station, a charging pile, an intelligent traffic light, a street lamp, a utility pole, or a traffic sign. In addition, the foregoing roadside (or a road intersection or a road side) may be an outdoor road, including various roads such as a main road, an auxiliary road, an elevated road, or a temporary road, or may be an indoor road, for example, a road in an indoor parking lot.

The coverage scopes in FIG. 2 and FIG. 3 are used as examples, but are not used to limit a form of a coverage scope. Different sensing devices may have coverage scopes in different forms (for example, shapes and scopes), and different communication devices may have coverage scopes in different forms (for example, shapes and scopes).

(2) The vehicle in embodiments is an apparatus that moves based on power drive, and can include various subsystems, for example, but not limited to, a traveling system, a sensor system, a control system, one or more peripheral devices, a power supply, and a user interface. Optionally, the vehicle may include more or fewer subsystems, and each subsystem may include a plurality of elements. In addition, all the subsystems and elements of the vehicle may be interconnected in a wired or wireless manner.

It should be noted that the vehicle in embodiments may be an automobile, an electric vehicle, or may be a vehicle running on a track, or may be an intelligent vehicle (for example, an autonomous vehicle), an intelligent mobile robot, or the like. The intelligent vehicle can sense a road environment by using a vehicle-mounted sensor system, automatically plan a traveling route, and control the vehicle to reach a predetermined target location. The intelligent vehicle is integrated with technologies such as a computer, modern sensing, information fusion, communication, artificial intelligence machine, or automatic control, and is a high-tech complex integrated with functions such as environment sensing, planning and decision-making, and multilevel driver assistance. For example, the intelligent vehicle may be an automobile, a wheeled mobile robot, or the like that has a driver assistance system or a fully autonomous driving system.

(3) The server end may be implemented by an apparatus like a server, a mobile terminal, a host, a virtual machine, or a robot. When the server end is a server, the server end may include one server or a server cluster including a plurality of servers. In some scenarios, the server end may alternatively be a cloud, and the cloud may include a cloud server and/or a cloud virtual machine. Optionally, the cloud may be deployed on a public cloud, a private cloud, or a hybrid cloud.

A communication link between any two of the three clouds may include one or more types of connection media, including a wired link (for example, an optical fiber), a wireless link, a combination of a wired link and a wireless link, or the like. For example, the connection medium may be a wireless link, and the wireless link uses a short-range connection technology, for example, an 802.11b/g technology, a Bluetooth technology, a Zigbee technology, a radio frequency identification (RFID) technology, an ultra-wideband (UWB) technology, a wireless short-range communication (such as vehicle-mounted wireless short-range communication) technology, or a vehicle to everything (V2X) technology. For another example, the wireless link uses a long-range connection technology, for example, a radio access type technology like a global system for mobile communications (GSM), a general packet radio service (GPRS), a universal mobile telecommunications system (UMTS), LTE, or 5G.

In an implementation, the server end may communicate with the vehicle to provide a plurality of services for the vehicle, for example, a high-definition map service, an autonomous driving service, or an assisted driving service. In another possible implementation, the vehicle may interact with the server end, and use a plurality of services provided by the cloud. For example, an autonomous driving function or an assisted driving function may be improved based on a high-definition map service, to improve driving safety and travel efficiency of the vehicle.

In still another possible implementation, the vehicle may download high-definition map data from the server end to obtain a high-definition map, to provide a more accurate navigation service for a user. The high-definition map service provided by the cloud enables the vehicle to obtain a high-definition map in real time during traveling, and this improves safety of autonomous driving decision-making. Because the environment changes dynamically, in addition to a static layer, the high-definition map needs more dynamic information to meet a development requirement in the transportation field.

The roadside device is an important source of the dynamic information of the high-definition map. Currently, the roadside device may be configured to provide environment information on a driving lane, such as traffic light information and obstacle information. However, a coverage scope of a roadside device is limited, and reliability evaluation needs to be performed on services (such as a sensing result and a communication result) provided by roadside devices in different coverage scopes. The coverage scope of the roadside device is designed, and the coverage scope of the roadside device is provided to the cloud as information of the high-definition map, so that service quality of the high-definition map can be improved. Alternatively, the coverage scope is provided for the vehicle to determine a driving policy, so that reliability of the vehicle driving decision-making can be improved.

Figure 4:
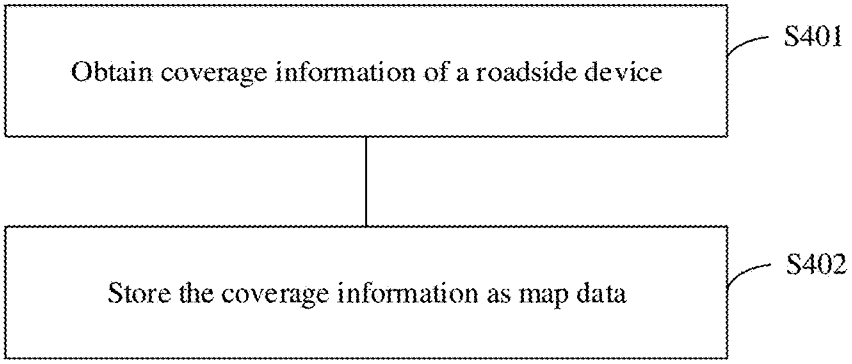
FIG. 4 is a schematic flowchart of a data processing method according to an embodiment.

FIG. 4 is a schematic flowchart of a data processing method according to an embodiment. Optionally, the data processing method shown in FIG. 4 may be applied to the scenario shown in FIG. 1. The data processing method may include at least step S401 and step S402, which are as follows.

Step S401: Obtain coverage information of a roadside device. The coverage information includes coverage region information and coverage capability information, where the coverage region information indicates at least one coverage region of the roadside device, and the coverage capability information indicates a coverage capability of the roadside device in the at least one coverage region.

This step is performed by a data processing apparatus, and the data processing apparatus may be located at a service end, a roadside device, or a vehicle.

The roadside device may be disposed on a roadside (or at a road intersection or on a road side). The roadside device has a specific coverage scope, and the coverage scope indicates a region in which the roadside device can provide a service. Further, the coverage scope may include at least one of a sensing coverage scope, a communication coverage scope, and the like. For description of the roadside apparatus, the coverage scope, the communication coverage scope, the sensing coverage scope, and the like, refer to the foregoing related description of FIG. 1, and details are not described herein again.

Further, the coverage region may be classified into different types of coverage regions such as a sensing coverage region and a communication coverage region. The coverage region may be indicated by using a geometric shape, may be indicated by using coordinates, or may be indicated by using a relative location. The following describes three examples of possible implementations or designs.

Figure 5A:
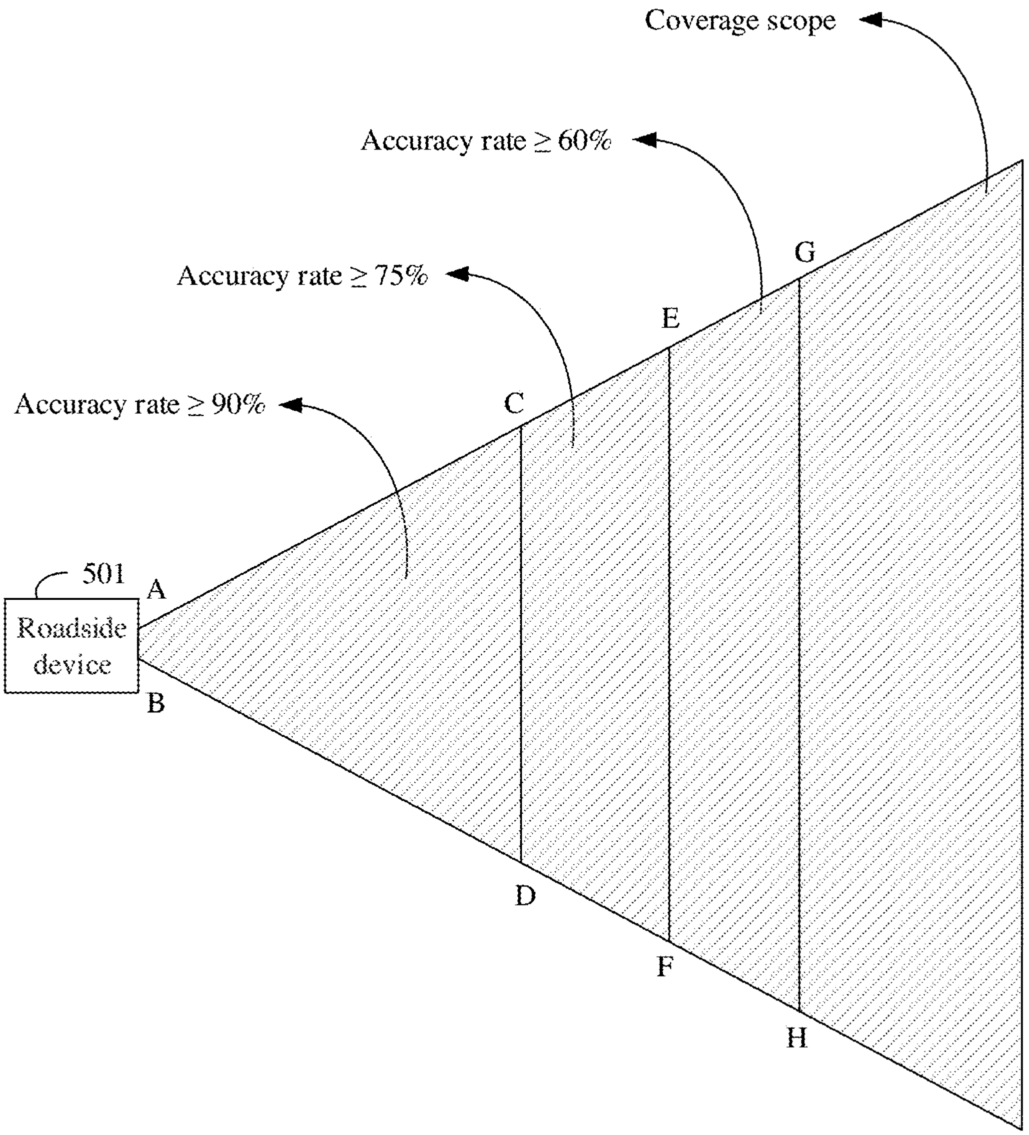
FIG. 5A is a schematic diagram of a coverage region indication method according to an embodiment.

Design 1: A location of the roadside device is used as a reference location, and the coverage region may be indicated by using a relative location of an endpoint of the coverage region relative to the roadside device. For example, a coverage capability is described by using an accuracy rate. Refer to FIG. 5A. FIG. 5A is a schematic diagram of a possible coverage region indication method according to an embodiment. A location of a roadside device 501 (or a sensing device associated with a roadside device) is used as a common reference point. A coverage region in which an accuracy rate is greater than or equal to 90% may be indicated by using relative locations of a point A, a point B, a point C, and a point D relative to the roadside device 501. Similarly, a coverage region in which an accuracy rate is greater than or equal to 75% may be determined based on the location of the roadside device 501 and relative locations of the point A, the point B, a point E, and a point F relative to the roadside device 501. Another coverage region may be deduced by analogy.

It should be understood that a plurality of coverage regions may alternatively be described in a non-overlapping manner. As shown in FIG. 5A, a coverage region in which an accuracy rate is less than or equal to 90% and greater than or equal to 75% may be determined by using the location of the roadside device 501 and the relative locations of the point C, the point D, the point E, and the point F relative to the roadside device 501.

Figure 5B:
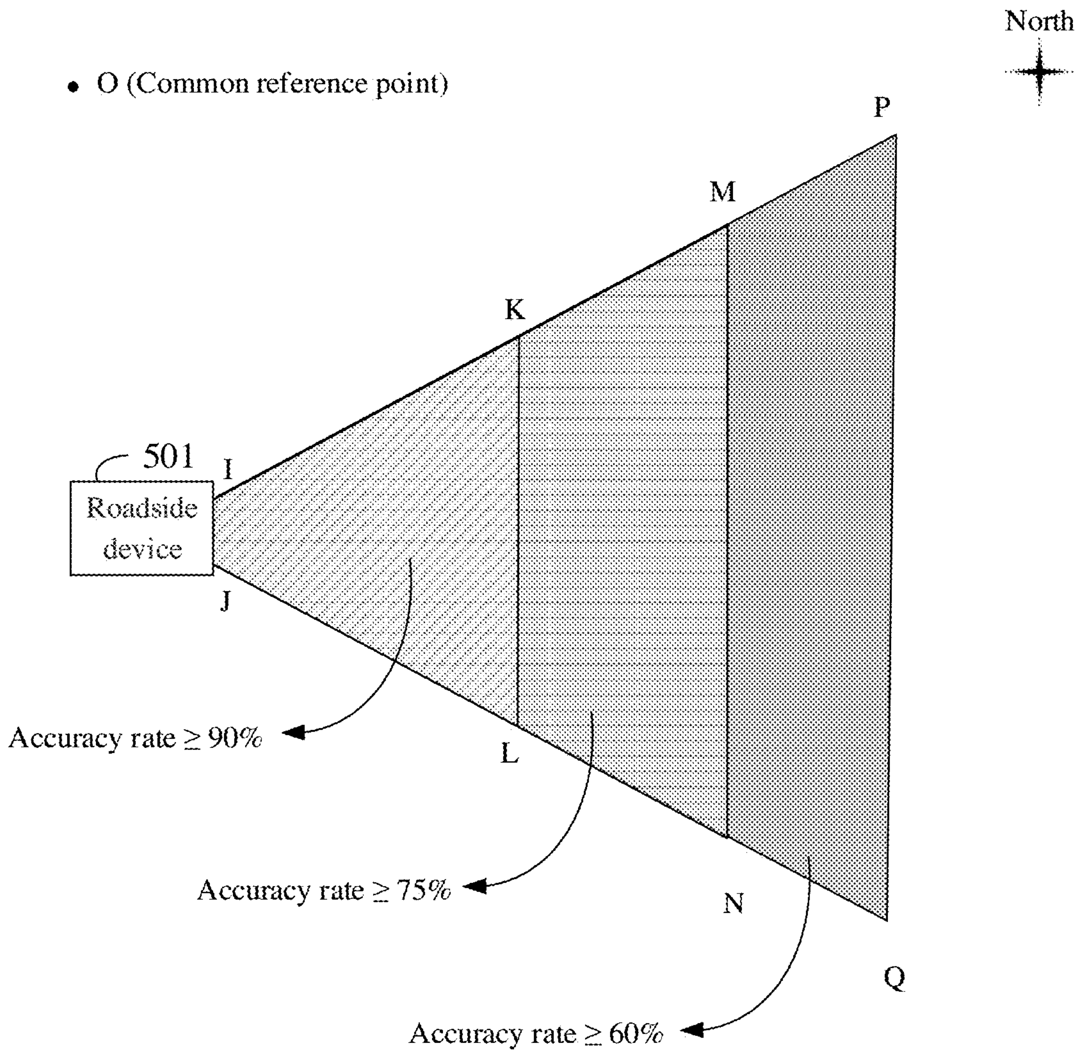
FIG. 5B is a schematic diagram of another coverage region indication method according to an embodiment.

Design 2: The coverage region may be indicated by using a location of an endpoint of the coverage region relative to a common reference point O. Refer to FIG. 5B. FIG. 5B is a schematic diagram of another possible coverage region indication method according to an embodiment. A coverage region in which an accuracy rate is greater than or equal to 90% may be determined by using locations of a point I, a point J, a point K, and a point L relative to the common reference point O. Similarly, a coverage region in which an accuracy rate is greater than or equal to 75% may be determined by using locations of the point I, the point J, a point M, and a point N relative to the common reference point O. Another coverage region may be deduced by analogy.

Similarly, a plurality of coverage regions may alternatively be described in a non-overlapping manner. As shown in FIG. 5B, a coverage region in which an accuracy rate is less than or equal to 90% and greater than or equal to 75% may be determined by using locations of the point K, the point L, the point M, and the point N relative to the common reference point O.

Design 3: The coverage region is indicated by using a geometric shape. Refer to FIG. 3. For example, a shape of the communication coverage region is a circle, and the coverage region may be indicated by using a location of the communication device 301 (or a roadside device in which the communication device is located) and a radius length. For example, if an accuracy rate within a radius of 15 meters (m) is 98%, the coverage region is a circle whose center is the communication device 301 (or a preconfigured center point) and whose radius is 15 m. The shape of the communication coverage region is not limited. For example, the communication coverage region may alternatively be a sector region.

Optionally, an endpoint may alternatively be described by using a longitude, a latitude, or the like, to indicate the coverage region. Alternatively, optionally, for a three-dimensional coverage region, a six-degree-of-freedom pose or the like may be used to indicate the coverage region. Details are not described one by one herein.

Figure 6:
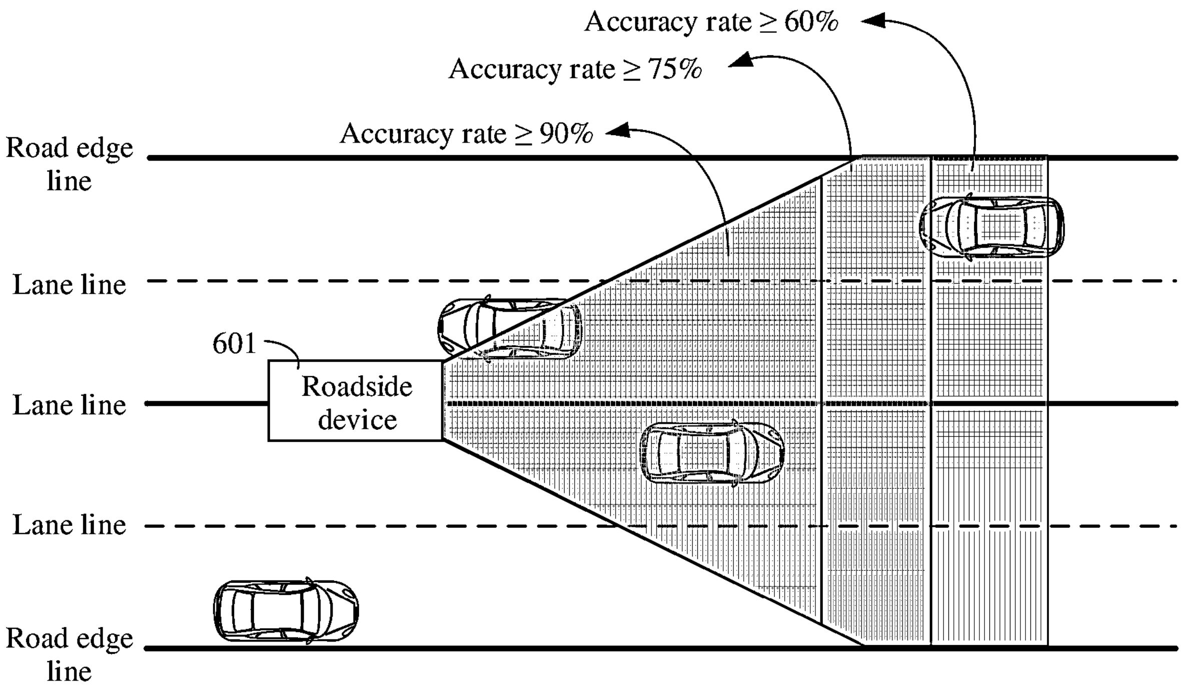
FIG. 6 is a schematic diagram of still another coverage region indication method according to an embodiment.

In another possible implementation, processing such as cutting, splicing, intersection obtaining, or union obtaining may be performed on the coverage region. For example, the coverage region may include a road section or a lane section. For example, refer to FIG. 6. FIG. 6 is a schematic diagram of still another possible coverage region indication method according to an embodiment. It can be understood that a coverage region of a roadside device 601 is an intersection part between an actual coverage region of the roadside device 601 and a road section. It should be understood that this method is also applicable to a case in which the coverage region includes a lane section. Similarly, in some implementation cases, the coverage region may alternatively include a region whose distance from a road edge line is within a scope. Alternatively, in some implementation cases, the coverage region may further include a section like a sidewalk or an auxiliary road.

The coverage capability can be a coverage capability of the roadside device in a coverage region, and the coverage capability may be described by using coverage capability information. A sensing coverage capability is a coverage capability of the roadside device in a sensing coverage region, and a communication coverage capability is a coverage capability of the roadside device in a communication coverage region.

The coverage capability information may indicate different indicators, which may be referred to as content. In a possible implementation, the coverage capability is a coverage capability of the roadside device in a communication coverage region, and the coverage capability information may indicate at least one of the following content (or indicators): a data accuracy rate, a packet loss rate, a communication delay, communication stability, or signal strength. In design implementation, the content may also be referred to as a basic indicator.

In another possible implementation, the coverage capability is a coverage capability of the roadside device in a sensing coverage region, and the coverage capability information indicates at least one of the following content (or indicators): a sensing result accuracy rate, a false detection rate, a missing detection rate, a recall rate, sensing precision, sensing average precision (AP), detection stability, or detection location precision. Optionally, the content may also be referred to as a basic indicator. For example, the sensing result accuracy rate indicates a ratio of detected correct results to detected results. The false detection rate refers to a ratio of detected incorrect results to the detected results. The missing detection rate refers to a ratio of undetected results to the detected results. The recall rate (recall, which may alternatively be referred to as a recall rate) refers to a ratio of correctly detected results to all results (or all results that need to be detected). The sensing precision and the sensing average precision may be used to evaluate the accuracy rate and/or the recall rate. The detection stability indicates a capability of each detection indicator to remain constant over time. The detection location precision is used to describe a correspondence capability between a location of a sensing result and an actual location.

It should be understood that descriptions of the foregoing content are only for reference, and other explanations may alternatively be provided for the foregoing indicators in different application scenarios. The recall rate is used as an example. In a possible scenario, the recall rate is related to an actual result of a sample and a detection result of the sample. For example, a relationship between the actual result of the sample and the detection result of the sample may be classified into the following types: true positive (TP), true negative (TN), false positive (FP), and false negative FN (FN). True and False are used to determine whether the result is correct or incorrect. Positive and Negative are used to determine whether the result is positive or negative. Therefore, a total number of samples=TP+FP+TN+FN. For example, the recall rate may meet the following formula: Recall=TP/(TP+FN). The precision may meet the following formula: Precision=TP/(TP+FP).

There may be one or more coverage regions included in the coverage information. Correspondingly, there may also be one or more pieces of coverage capability information. Further, due to different types of coverage scopes, the coverage region may also correspondingly have different types of coverage regions such as a sensing coverage region and a communication coverage region. The coverage information may include one type of coverage region, or may include a plurality of types of coverage regions, for example, includes both a communication coverage region and a sensing coverage region.

In a possible implementation, the at least one coverage region indicated by the coverage information may include M communication coverage regions and N sensing coverage regions, where M and N are natural numbers, and M and N are not simultaneously 0. The following are examples of possible cases.

Case 1: N>0. The coverage information includes coverage region information of at least two sensing coverage regions. Further, coverage capability information corresponding to the at least two sensing coverage regions may be further included. For example, refer to Table 1. Table 1 is possible coverage information according to an embodiment. The coverage information may be used to describe the sensing coverage scope shown in FIG. 2. For example, a coverage capability is described by using an accuracy rate. Different regions correspond to different communication result accuracy rates. In a coverage region 1, a corresponding communication result accuracy rate is greater than or equal to 98%.

TABLE 1

| Coverage information<br>Coverage capability and corresponding coverage region |
|---|
| {Coverage capability: sensing result accuracy rate ≥ 90%; and coverage region: coverage region 1} |
| {Coverage capability: sensing result accuracy rate ≥ 75%; and coverage region: coverage region 2} |
| {Coverage capability: sensing result accuracy rate ≥ 60%; and coverage region: coverage region 3} |
| . . . |

Optionally, when a plurality of sensing coverage regions are included, the coverage capability may be represented by using the sensing capability, and the plurality of sensing coverage regions may be classified based on levels of sensing capabilities. For example, the sensing capability may be classified into a plurality of levels, such as a first level, a second level, and a third level. The coverage region 1 corresponds to the first level, the coverage region 2 corresponds to the second level, and the coverage region 3 corresponds to the third level.

Optionally, the level of the sensing capability in embodiments may be determined based on strength (for example, a value of the accuracy rate) of the sensing capability, or may be predefined, preconfigured, or specified in a protocol.

Case 2: M>0. The coverage information includes coverage region information of at least two communication coverage regions. Further, coverage capability information corresponding to the at least two communication coverage regions may be further included. For example, refer to Table 2. Table 2 is possible coverage information according to an embodiment. The coverage information may be used to describe the communication coverage scope shown in FIG. 3. For example, a coverage capability is described by using an accuracy rate. Different regions correspond to different communication result accuracy rates. In a coverage region 1, a corresponding communication data accuracy rate is greater than or equal to 98%.

TABLE 2

| Coverage information<br>Coverage capability and corresponding coverage region |
|---|
| {Coverage capability: data accuracy rate ≥ 98%; and coverage region: coverage region 4} |
| {Coverage capability: data accuracy rate ≥ 95%; and coverage region: coverage region 5} |
| . . . |

Optionally, when a plurality of communication coverage regions are included, the coverage capability may be represented by using the communication capability, and the plurality of communication coverage regions may be classified based on levels of communication capabilities. For example, the communication capability may be classified into a plurality of levels, such as a first level, a second level, and a third level. The coverage region 4 corresponds to the first level, and the coverage region 5 corresponds to the second level.

Further, optionally, the level of the communication capability may alternatively be related to another indicator. For example, the first level is a coverage region in which a data accuracy rate is greater than or equal to 98% and a communication delay is less than 50 ms. The second level is a coverage region in which a data accuracy rate is greater than or equal to 95% and a communication delay is less than 70 ms.

It should be understood that Case 1 and Case 2 may exist simultaneously. The foregoing descriptions are provided merely by using an example in which the coverage capability indicates the accuracy rate. This is also applicable to a case in which the coverage capability indicates other content.

In a possible implementation, the coverage information may alternatively not include coverage capability information. For example, as shown in Table 3, the coverage information may be indexed by using a data number, and data content corresponding to the data number may be preconfigured, defined according to a protocol, or obtained through negotiation. For example, according to a protocol, content of a data number 1001 corresponds to a communication coverage region in which an accuracy rate is greater than 98% (such as the coverage region 4), content of a data number 1001 corresponds to a communication coverage region in which an accuracy rate is greater than 95% (such as the coverage region 5), and other content can be deduced by analogy. A format of the coverage information is specified in advance, so that redundant coverage capability information can be reduced, and data transmission efficiency can be improved. It should be understood that the data number is merely an example for indexing. In an actual implementation, the data number may alternatively be replaced with a data identifier, a bit location, or the like. Details are not described herein again.

TABLE 3

| Coverage information | |
|---|---|
| Data number | Data content |
| . . . | . . . |
| 1001 | {Coverage region: coverage region 1} |
| 1002 | {Coverage region: coverage region 2} |
| . . . | . . . |

That a data processing apparatus obtains coverage information of a roadside device may include the following several implementations:

Implementation 1: The data processing apparatus receives coverage information sent by another apparatus. The following provides two possible examples.

Example 1

Figure 7:
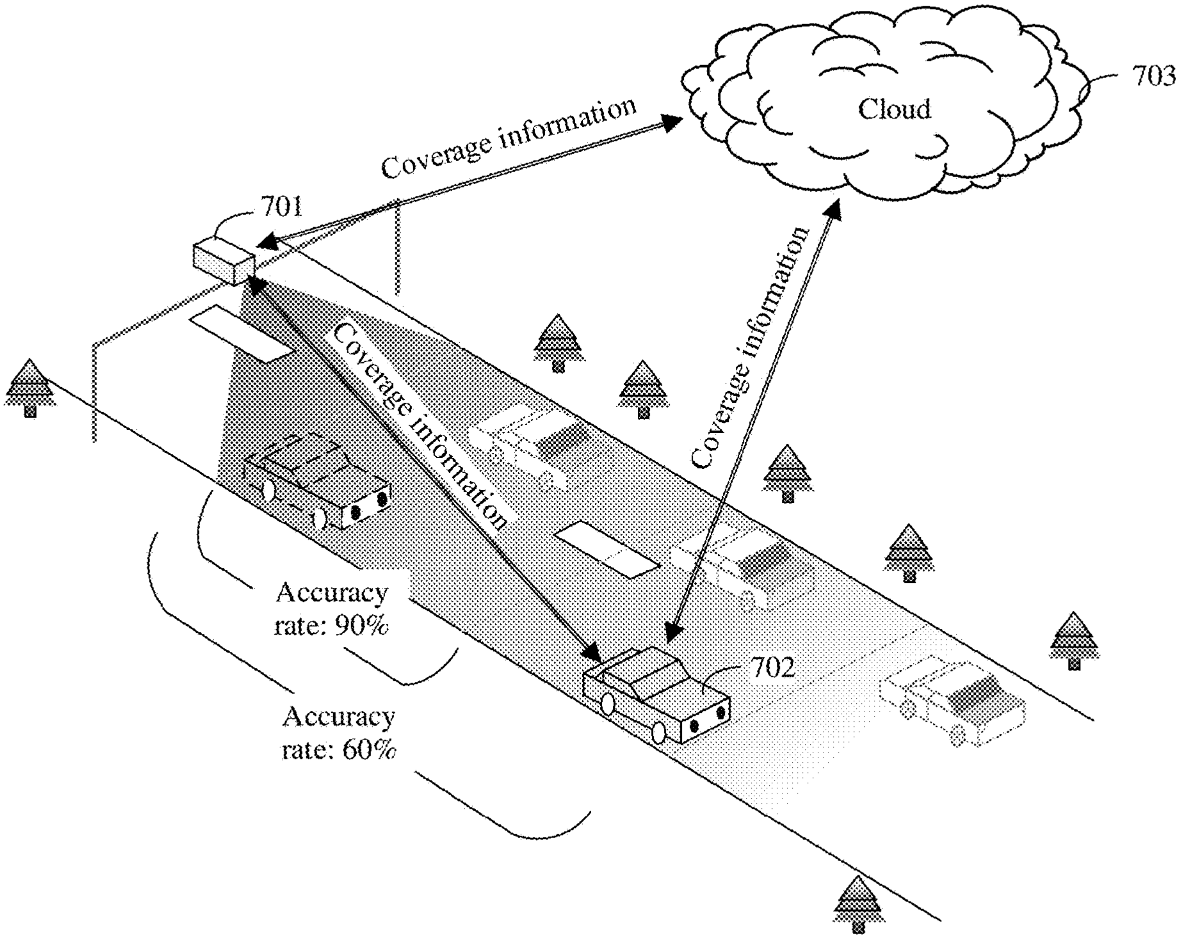
FIG. 7 is a schematic diagram of an application scenario of a data processing method according to an embodiment.

The data processing apparatus may receive coverage information sent by the roadside apparatus. For example, refer to FIG. 7. FIG. 7 is a schematic diagram of a scenario to which an embodiment may be applied. The data processing apparatus may be included in a vehicle 702 (or a cloud 703), and may receive coverage information sent by a roadside device 701.

Example 2

The data processing apparatus may receive coverage information sent by a server end (or a cloud). For example, the data processing apparatus may be included in a vehicle 702, and the vehicle 702 may obtain the coverage information of the roadside device from a cloud 703 (for example, a map cloud, or a driver assistance cloud). For another example, the data processing apparatus may alternatively be included in a roadside device 701, and the roadside device 701 may receive coverage information sent by a vehicle 702 (or a cloud 703). The coverage information may include coverage information of the roadside device 701. Optionally, the coverage information may also include coverage information of another roadside device (not shown in FIG. 7).

Implementation 2: The data processing apparatus generates coverage information of the roadside device. The following separately describes coverage information for a sensing capability and a communication capability of the roadside device.

(1) For the sensing capability of the roadside device, a coverage region of the roadside device is a sensing region, and the coverage capability information that indicates the coverage capability of the roadside device in the at least one coverage region is sensing capability information.

Figure 17:
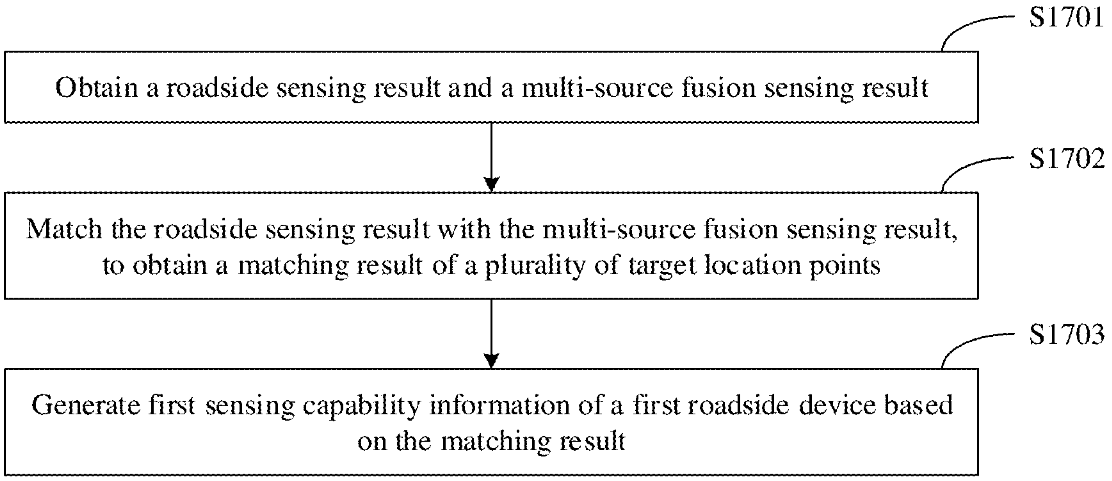
FIG. 17 is a flowchart of a sensing capability information generation method according to an embodiment.

FIG. 17 is a flowchart of a sensing capability information generation method according to an embodiment. As shown in FIG. 17, the method includes the following steps.

Step S1701: Obtain a roadside sensing result and a multi-source fusion sensing result.

Step S1702: Match the roadside sensing result with the multi-source fusion sensing result, to obtain a matching result of a plurality of target location points.

Step S1703: Generate first sensing capability information of a first roadside device based on the matching result.

The first roadside device is a roadside device whose sensing capability is to be determined. The first roadside device may be any roadside device. The first sensing capability information may indicate a sensing capability of the first roadside device. The first sensing capability information may indicate the sensing capability of the first roadside device, for example, a region that can be sensed by the first roadside device and a region that cannot be sensed by the first roadside device. The first sensing capability information may be generated based on the matching result of the roadside sensing result and the multi-source fusion sensing result.

The roadside sensing result may indicate a first group of location points that are of a traffic participant and that are sensed by the first roadside device in a preset time period. The first group of location points may be location points that are of the traffic participant and that are sensed by a sensor in the first roadside device, or may be a group of location points obtained after a plurality of groups of location points that are of the traffic participant and that are sensed by a plurality of sensors in the first roadside device are fused in the first roadside device.

The multi-source fusion sensing result may indicate a second group of location points obtained after a plurality of groups of location points that are of the traffic participant and that are obtained by a plurality of sensing devices in a preset time period are fused. The plurality of sensing devices may be a same sensing device, or may be different sensing devices. The plurality of sensing devices may be located on different carriers, and types of the different carriers may be the same or different. For example, the plurality of sensing devices may be located in at least one of a roadside device, a vehicle, or a portable terminal (which may also be referred to as a mobile terminal). For example, the plurality of sensing devices may be located in a plurality of roadside devices, or may be located in a plurality of vehicles, or may be located in a plurality of portable terminals, or may be located in two or three of the roadside device, the vehicle, and the portable terminal.

The preset time period may be any time period. For example, the preset time period may be in a unit of a month, a week, a day, or an hour. For example, the preset time period is one month, one week, or one day. The preset time period may be set as used. This is not limited. It may be understood that, when duration of the preset time period is long, and a large quantity of location points of the traffic participant are used, accuracy of the obtained first sensing capability information is high.

The roadside sensing result and the multi-source fusion sensing result are sensing results of a traffic participant near a same roadside device in a same time period. The roadside sensing result reflects a traffic participant actually sensed by the first roadside device in the preset time period. Data used by the multi-source fusion sensing result comes from a plurality of sensing devices, and the multi-source fusion sensing result reflects a traffic participant actually sensed by the plurality of sensing devices in the preset time period. Because these sensing devices compensate for each other's perspectives and disadvantages, confidence of the multi-source fusion sensing result is high. The multi-source fusion sensing result may be used as a reference standard for the roadside sensing result, to determine whether the roadside sensing result is accurate, to determine the sensing capability of the first roadside device. It may be understood that, if the first roadside device well senses traffic participants indicated by the multi-source fusion sensing result, it indicates that these traffic participants are within a sensing scope of the first roadside device. If the first roadside device does not sense the traffic participants indicated by the multi-source fusion sensing result, it indicates that these traffic participants are outside the sensing scope of the first roadside device. For example, a pedestrian crosses a roadside green belt, and the pedestrian does not report location information of the pedestrian by using a mobile terminal. In addition, because the pedestrian is partially blocked by a green plant, vehicles at some angles cannot identify the pedestrian. However, vehicles at other angles can identify the pedestrian. Therefore, the pedestrian exists in a multi-source fusion sensing result. If the pedestrian also exists in the roadside sensing result, it indicates that the pedestrian is within the sensing scope of the first roadside device. Alternatively, if the pedestrian does not exist in the roadside sensing result, it indicates that the pedestrian is outside the sensing scope of the first roadside device. Therefore, the roadside sensing result of the first roadside device is matched with the multi-source fusion sensing result, so that the sensing scope of the first roadside device can be conveniently and accurately determined.

The following describes a process of obtaining the roadside sensing result and the multi-source fusion sensing result. Because the method may be executed by a cloud server, or may be executed by the first roadside device, the process of obtaining the roadside sensing result and the multi-source fusion sensing result is separately described herein with reference to schematic diagrams of system structures shown in FIG. 18A to FIG. 18C.

Figure 18A:
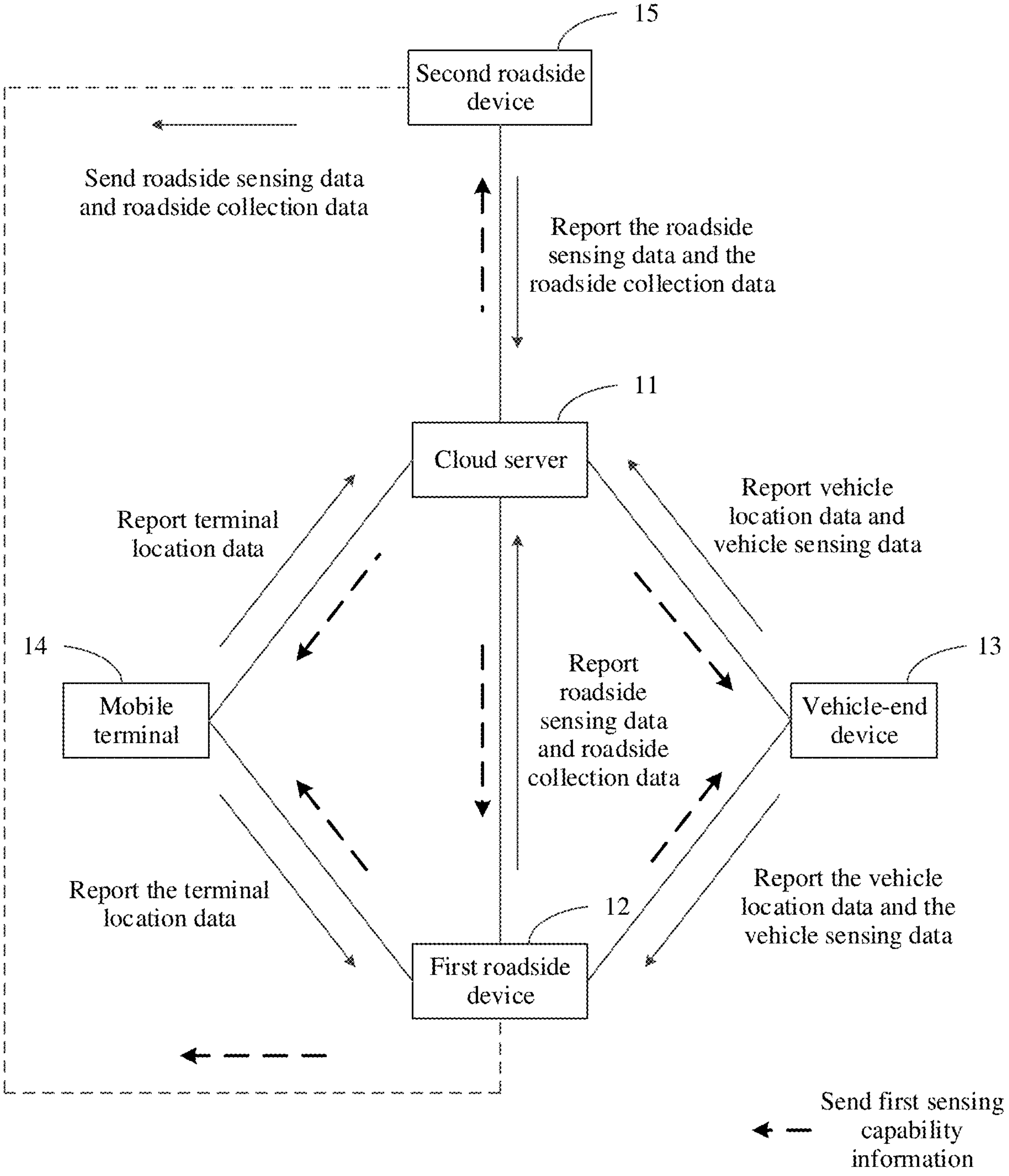
FIG. 18A is a schematic diagram of a structure of a communication system according to an embodiment.

FIG. 18A is a schematic diagram of a structure of a communication system according to an embodiment. As shown in FIG. 18A, the communication system includes a cloud server 11, a first roadside device 12, a vehicle-end device 13, a mobile terminal 14, and a second roadside device 15. The first roadside device 12 may be any roadside device. The second roadside device 15 may be a roadside device, other than the first roadside device 12, that establishes a communication connection to the cloud server 11. There may be one or more second roadside devices 15. The second roadside device 15 may establish a communication connection to the first roadside device 12, or may not establish a communication connection to the first roadside device 12. For ease of understanding, in this embodiment, a roadside device that is in the second roadside device 15 and that establishes a communication connection to the first roadside device 12 is referred to as a third roadside device.

As shown in FIG. 18A, the first roadside device 12, the second roadside device 15, the vehicle-end device 13, and the mobile terminal 14 each establish a communication connection to the cloud server 11. The vehicle-end device 13 and the mobile terminal 14 each further establish a communication connection to the first roadside device 12. In an example, the first roadside device 12, the second roadside device 15, the vehicle-end device 13, and the mobile terminal 14 each may establish a communication connection to the cloud server 11 through a cellular network (such as 3G, 4G, and 5G). Similarly, the mobile terminal 14 may establish a communication connection to the first roadside device 12 through a cellular network. The vehicle-end device 13 may establish a communication connection to the first roadside device 12 by using a vehicle to everything (V2X) technology, for example, a dedicated short-range communication (DSRC) technology. For example, the vehicle-end device 13 may establish a communication connection to the first roadside device 12 through an on board unit (OBU) and a communication device of the roadside device. The first roadside device 12 may establish a communication connection to the second roadside device 15 by using a V2X technology.

As shown in FIG. 18A, the mobile terminal 14 may obtain terminal location data through a terminal positioning apparatus, and then may report the terminal location data to the first roadside device 12 through a V2X network, and report the terminal location data to the cloud server 11 through the cellular network. The vehicle-end device 13 may obtain vehicle location data through a vehicle positioning apparatus, and obtain vehicle sensing data through a vehicle sensing apparatus. Then, the vehicle-end device 13 may report the vehicle location data and the vehicle sensing data to the first roadside device 12 through the V2X network, and report the vehicle location data and the vehicle sensing data to the cloud server 11 through the cellular network. The first roadside device 12 may obtain roadside sensing data through a roadside sensing apparatus, obtain terminal location data through the mobile terminal 14, and obtain vehicle location data and vehicle sensing data through the vehicle-end device 13. The terminal location data, the vehicle location data, and the vehicle sensing data may be referred to as roadside collection data of the first roadside device 12. Optionally, if the third roadside device that establishes a communication connection to the first roadside device 12 exists in the second roadside device 15, the third roadside device may send roadside collection data collected by the third roadside device to the first roadside device 12. In this case, the roadside collection data of the first roadside device 12 further includes the roadside collection data of the third roadside device. In this way, when the communication connection between the third roadside device and the cloud server 11 is faulty, the roadside collection data of the third roadside device can still be reported to the cloud server, so that reliability of the communication system is improved. Then, the first roadside device 12 may report the roadside sensing data and the roadside collection data to the cloud server through the cellular network. Similarly, the second roadside device 15 may also report roadside sensing data and roadside collection data to the cloud server through the cellular network. For a manner of obtaining the roadside sensing data and the roadside collection data by the second roadside device 15, refer to a manner of obtaining the roadside sensing data and the roadside collection data by the first roadside device 12, and details are not described herein again.

It can be understood that data received by the cloud server 11 includes: the roadside sensing data from the first roadside device 12, the roadside collection data from the first roadside device 12, the roadside sensing data from the second roadside device 15, the roadside collection data from the second roadside device 15, the vehicle location data and the vehicle sensing data from the vehicle-end device 13, and the terminal location data from the mobile terminal 14.

Then, the cloud server 11 may obtain a roadside sensing result based on the roadside sensing data from the first roadside device 12, and obtain, based on the received data, a multi-source fusion sensing result corresponding to the first roadside device. In an example, the cloud server 11 may select, from the roadside sensing data from the first roadside device 12, roadside sensing data in a preset time period, to obtain a roadside sensing result of the first roadside sensing device; and may select, from the received data, data that is in a preset time period and that is within a preselected scope, and perform fusion on the selected data, to obtain a multi-source fusion sensing result of the first roadside device. The preselected scope is a region near the first roadside device, and the preselected scope may be determined based on a sensing scope factory-delivery indicator of the first roadside device and an installation direction of the first roadside device. For example, the preselected scope may be obtained by reserving a specific margin (for example, 3 meters or 5 meters) in the installation direction based on the sensing scope factory-delivery indicator of the first roadside device. Data that is in the preset time period and that is within the preselected scope is selected for fusion, so that an amount of data for fusion and matching can be reduced, a calculation amount is reduced, and efficiency is improved. It may be understood that, in a process of obtaining the multi-source fusion sensing result, a larger quantity of related roadside sensing devices, a larger quantity of related traffic participants, or longer duration of the preset time period indicates a more accurate multi-source fusion sensing result.

After obtaining the roadside sensing result and the multi-source fusion sensing result, the cloud server 11 may match the roadside sensing result with the multi-source fusion sensing result, to obtain a matching result of a plurality of target location points, and generate first sensing capability information of the first roadside device based on the matching result. Then, as shown in FIG. 18A, the cloud server 11 may deliver the first sensing capability information to the first roadside device 12, the vehicle-end device 13, the mobile terminal 14, the second roadside device 15, and the like. After receiving the first sensing capability information, the first roadside device 12 may forward the first sensing capability information to the vehicle-end device 13, the mobile terminal 14, and the third roadside device in the second roadside device 15. A process of matching the roadside sensing result with the multi-source fusion sensing result to obtain the matching result of the plurality of target location points, and generating the first sensing capability information of the first roadside device based on the matching result is described in detail in a subsequent part of embodiments.

Figure 18B:
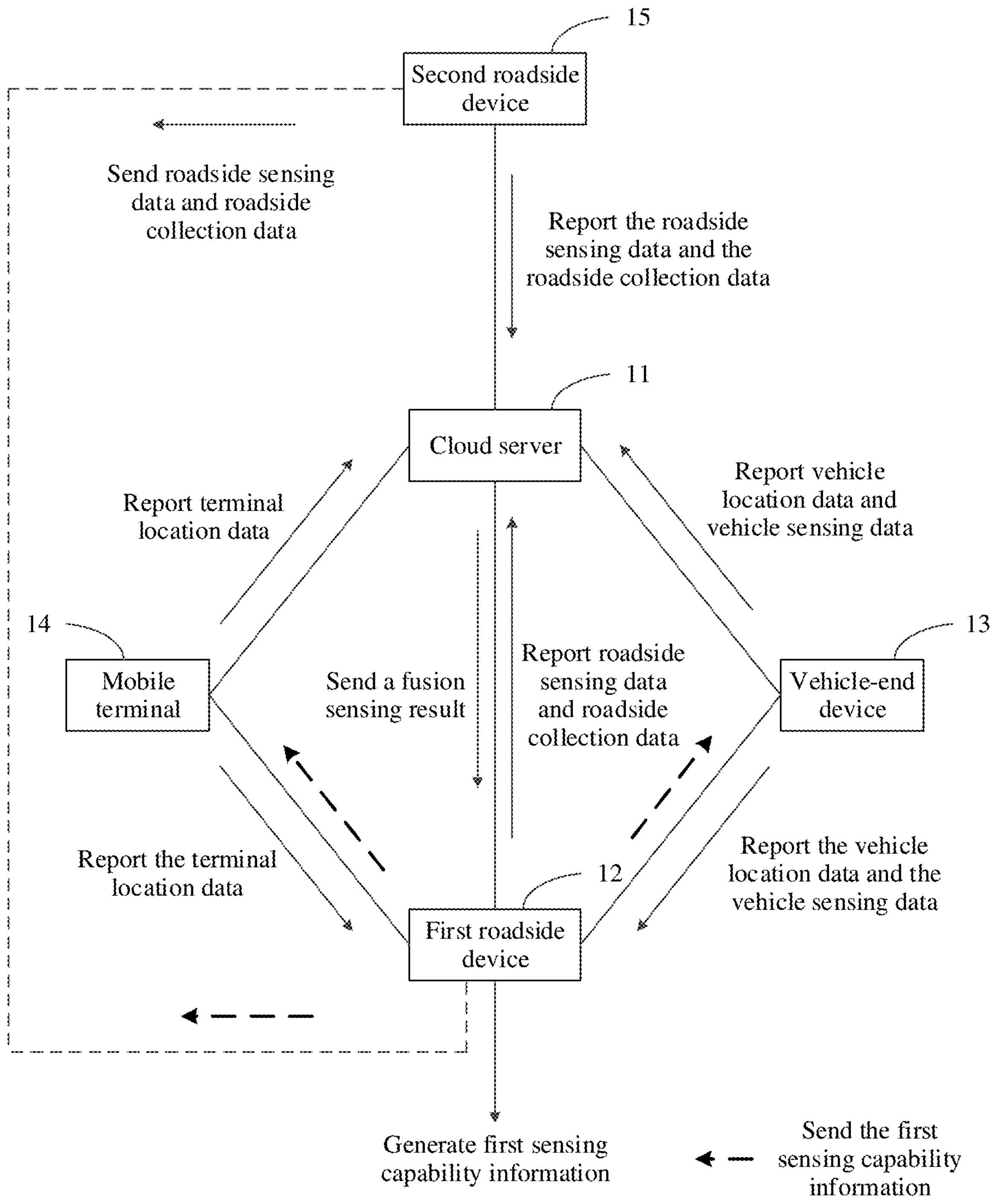
FIG. 18B is a schematic diagram of a structure of a communication system according to an embodiment.

FIG. 18B is a schematic diagram of a structure of a communication system according to an embodiment. For devices included in the communication system shown in FIG. 18B and connection relationships between the devices, refer to the communication system shown in FIG. 18A. Details are not described herein again. In FIG. 18B, for a process in which a cloud server 11 receives data, refer to the process in which the cloud server 11 receives data in FIG. 18A. Details are not described herein again.

In FIG. 18B, the data received by the cloud server 11 includes: roadside sensing data from a first roadside device 12, roadside collection data from the first roadside device 12, roadside sensing data from a second roadside device 15, roadside collection data from the second roadside device 15, vehicle location data and vehicle sensing data from a vehicle-end device 13, and terminal location data from a mobile terminal 14. The cloud server 11 may obtain, based on the received data, a multi-source fusion sensing result corresponding to the first roadside device. Then, the cloud server 11 may send the multi-source fusion sensing result corresponding to the first roadside device to the first roadside device 12. The first roadside device 12 may obtain a roadside sensing result based on the roadside sensing data of the first roadside device 12.

After obtaining the roadside sensing result and the multi-source fusion sensing result, the first roadside device 12 may match the roadside sensing result with the multi-source fusion sensing result, to obtain a matching result of a plurality of target location points, and generate first sensing capability information of the first roadside device based on the matching result. Then, as shown in FIG. 18B, the first roadside device 12 may send the first sensing capability information to the vehicle-end device 13, the mobile terminal 14, and a third roadside device in the second roadside device 15. A process of matching the roadside sensing result with the multi-source fusion sensing result to obtain the matching result of the plurality of target location points, and generating the first sensing capability information of the first roadside device based on the matching result is described in detail in a subsequent part of the embodiments.

Figure 18C:
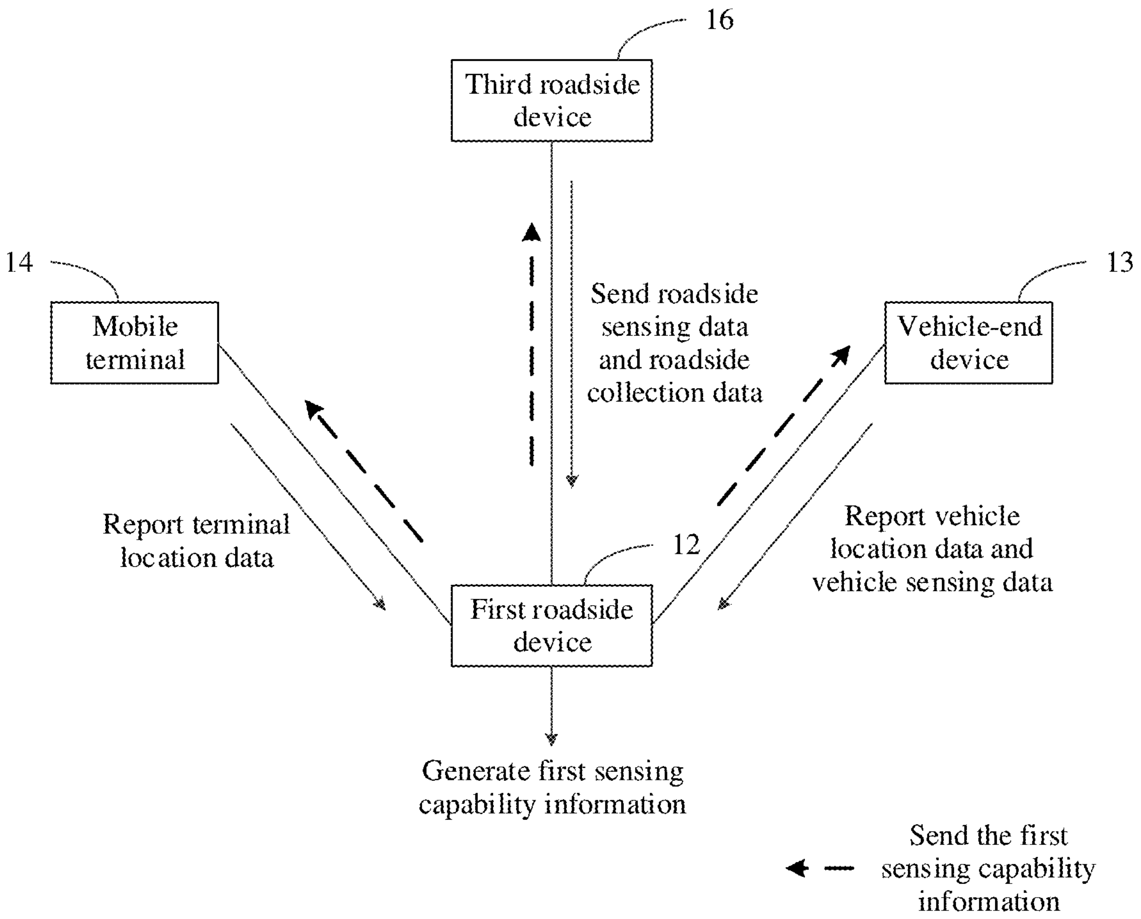
FIG. 18C is a schematic diagram of a structure of a communication system according to an embodiment.

FIG. 18C is a schematic diagram of a structure of a communication system according to an embodiment. As shown in FIG. 18C, the communication system may include a first roadside device 12, a vehicle-end device 13, a mobile terminal 14, and a third roadside device 16. The vehicle-end device 13, the mobile terminal 14, and the third roadside device 16 each establish a communication connection to the first roadside device 12.

As shown in FIG. 18C, the vehicle-end device 13 reports vehicle location data and vehicle sensing data to the first roadside device 12. The mobile terminal 14 reports terminal location data to the first roadside device 12. The third roadside device 16 sends roadside sensing data and roadside collection data of the third roadside device to the first roadside device 12. In this case, data obtained by the first roadside device 12 includes the vehicle location data and the vehicle sensing data that are from the vehicle-end device 13, the terminal location data from the mobile terminal 14, the roadside sensing data and the roadside collection data that are from the third roadside device 16, and roadside sensing data from the first roadside device 12. Then, the first roadside device 12 may obtain a roadside sensing result based on the roadside sensing data of the first roadside device 12, and obtain a multi-source fusion sensing result based on the obtained data. For a manner of obtaining the roadside sensing result by the first roadside device 12 and a manner of obtaining the multi-source fusion sensing result by the first roadside device 12, refer to a manner of obtaining the roadside sensing result by the cloud server 11 and a manner of obtaining the multi-source fusion sensing result by the cloud server 11 in FIG. 18A. Details are not described herein again.

After obtaining the roadside sensing result and the multi-source fusion sensing result, the first roadside device 12 may match the roadside sensing result with the multi-source fusion sensing result, to obtain a matching result of a plurality of target location points, and generate first sensing capability information of the first roadside device based on the matching result. Then, as shown in FIG. 18B, the first roadside device 12 may send the first sensing capability information to the vehicle-end device 13, the mobile terminal 14, and the third roadside device in the second roadside device 15. A process of matching the roadside sensing result with the multi-source fusion sensing result to obtain the matching result of the plurality of target location points, and generating the first sensing capability information of the first roadside device based on the matching result is described in detail in a subsequent part of embodiments.

The first roadside device may sense one or more traffic participants in a preset time period, and each sensed traffic participant corresponds to a group of location points, which is referred to as a first group of location points. In other words, the roadside sensing result may indicate the first group of location points of each of the one or more traffic participants that are sensed by the first roadside device in the preset time period. For example, the roadside sensing result may include at least one of time information, location information, a motion parameter, and attribute information of each location point in the first group of location points indicated by the roadside sensing result.

In the preset time period, location change information of a same traffic participant may be obtained by a plurality of sensing devices. For example, in the preset time period, location change information of a vehicle 1 may be obtained by a vehicle-end device of the vehicle 1, sensed by a nearby roadside device, and sensed by a vehicle-end device of another nearby vehicle. For a traffic participant, each sensing device that obtains location change information of the traffic participant in a preset time period may obtain a group of location points of the traffic participant. After all groups of location points obtained by sensing devices that sense the location change information of the traffic participant are fused, a group of location points corresponding to the traffic participant may be obtained, which is referred to as a second group of location points. For example, in embodiments, the data obtained by the plurality of sensing devices may be fused by using Kalman filtering, a Bayesian estimation method, fuzzy logic inference, or an artificial neural network.

It can be understood that the first group of location points of the traffic participant is a group of location points sensed by the first roadside device, and the second group of location points of the traffic participant is a group of location points obtained by combining the plurality of groups of location points obtained by the plurality of sensing devices.

In a possible implementation, location points (including the first group of location points and the second group of location points) indicated by the roadside sensing result and the multi-source fusion sensing result are discrete location points. The roadside sensing result includes at least one of time information, location information, a motion parameter, and attribute information of each location point in the first group of location points. The multi-source fusion sensing result includes at least one of time information, location information, a motion parameter, and attribute information of each location point in the second group of location points. The matching the roadside sensing result with the multi-source fusion sensing result includes: performing point-by-point matching between the first group of location points and the second group of location points. The point-by-point matching does not require a time sequence relationship herein, so that difficulty in obtaining the roadside sensing result and the multi-source fusion sensing result is reduced.

Figure 19A:
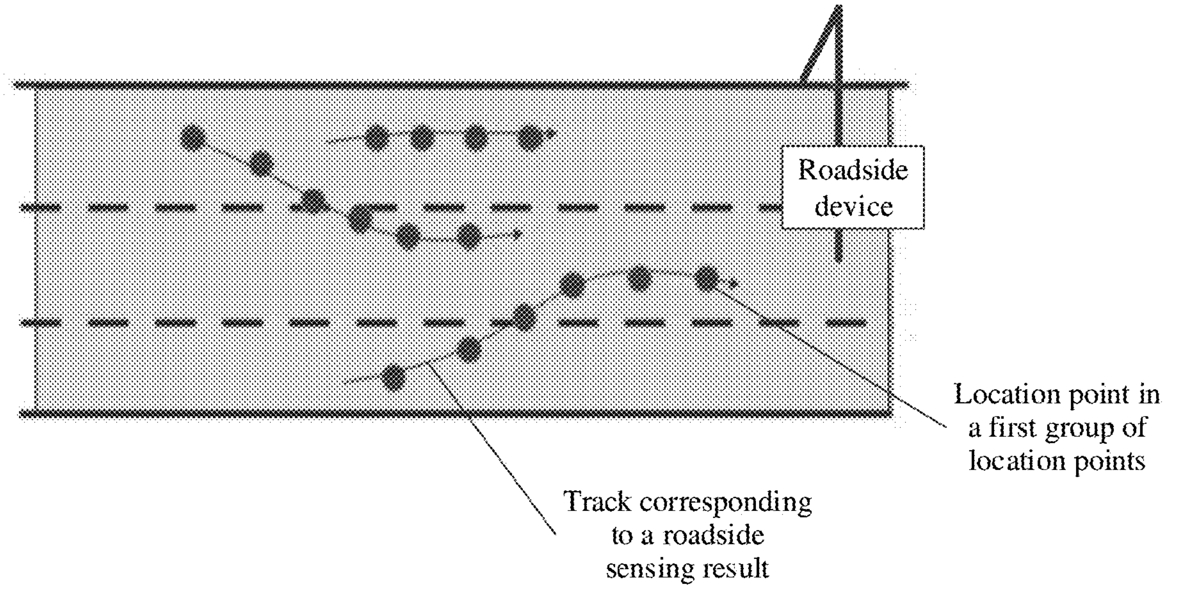
FIG. 19A is a schematic diagram of a first group of location points and a corresponding track according to an embodiment.
Figure 19B:
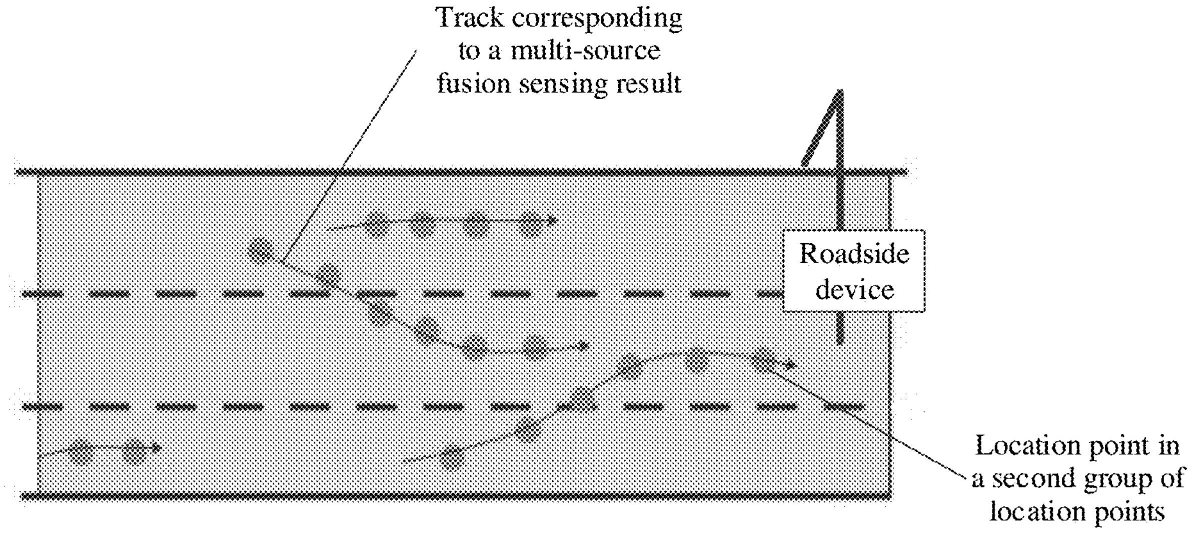
FIG. 19B is a schematic diagram of a second group of location points and a corresponding track according to an embodiment.

In a possible implementation, the location points (including the first group of location points and the second group of location points) indicated by the roadside sensing result and the multi-source fusion sensing result are location points in a track. FIG. 19A is a schematic diagram of the first group of location points and a corresponding track according to an embodiment. FIG. 19B is a schematic diagram of the second group of location points and a corresponding track according to an embodiment. The roadside sensing result includes a time sequence relationship between location points in the first group of location points, and at least one of the time information, the location information, the motion parameter, and the attribute information of each location point in the first group of location points. The multi-source fusion sensing result includes a time sequence relationship between location points in the second group of location points, and at least one of the time information, the location information, the motion parameter, and the attribute information of each location point in the second group of location points. The matching the roadside sensing result with the multi-source fusion sensing result includes: performing track matching between the roadside sensing result and the multi-source fusion sensing result. For example, a track matching algorithm may include, but is not limited to, a Hungarian algorithm, and a K-means algorithm. An algorithm used for track matching is not limited in embodiments. Herein, the track matching combines the time sequence relationship, so that the precision and confidence of the matching result can be improved.

After the roadside sensing result is matched with the multi-source fusion sensing result, a matching result of a plurality of target location points may be obtained. Herein, one target location point is a location point in the first group of location points or a location point in the second group of location points. A matching result of a target location point is one of true positive (TP), false negative (FN), and false positive (FP).

If a matching result of a target location point is TP, it indicates that the target location point is a location point in the second group of location points, and a location point matching the target location point exists in the first group of location points. If a matching result of a target location point is FN, it indicates that the target location point is a location point in the second group of location points, and no location point matching the target location point exists in the first group of location points. If a matching result of a target location point is FP, it indicates that the target location point is a location point in the first group of location points, and no location point matching the target location point exists in the second group of location points.

Figure 19C:
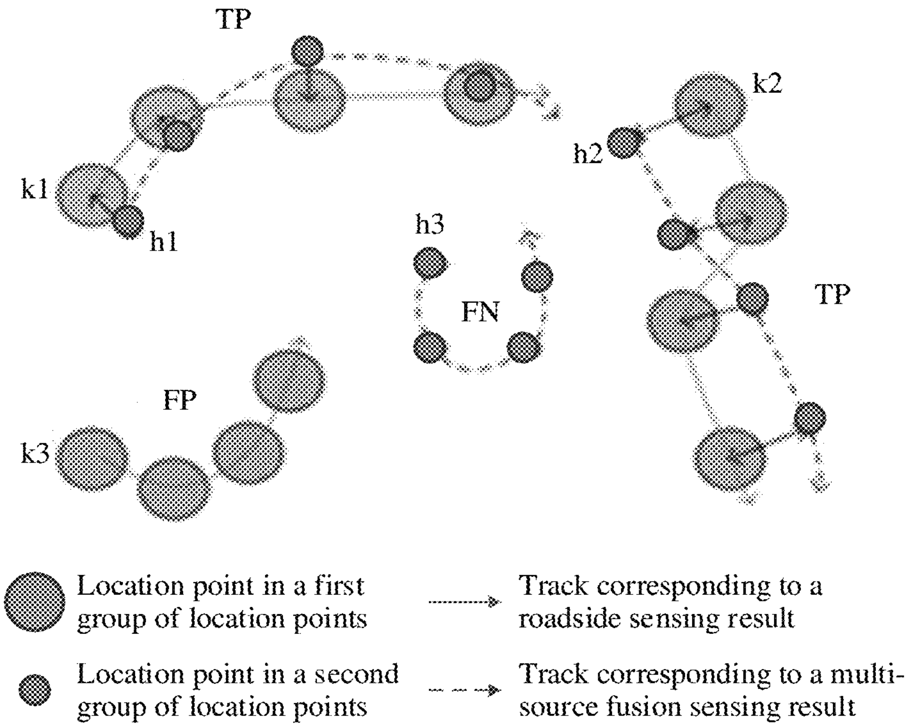
FIG. 19C is a schematic diagram of a matching result according to an embodiment.

FIG. 19C is a schematic diagram of a matching result according to an embodiment. As shown in FIG. 19C, k1, k2, and k3 are tracks corresponding to the roadside sensing result, and location points on k1, k2, and k3 are location points in the first group of location points; and h1, h2, and h3 are tracks corresponding to the multi-source fusion sensing result, and location points on h1, h2, and h3 are location points in the second group of location points. Through track matching, it is learned that h1 matches k1, h2 matches k2, and there is no track matching h3 and no track matching k3. The location points on h1 and h2 belong to the second group of location points, and location points matching the location points on h1 and h2 exist in the first group of location points. Therefore, the location points on h1 and h2 are target location points, and a matching result is TP. The location points on h3 belong to the second group of location points, and no location point matching the location points on h3 exists in the first group of location points. Therefore, the location points on h3 are target location points, and a matching result is FN. The location points on k3 belong to the first group of location points, and no location point matching the location points on k3 exists in the second group of location points. Therefore, the location points on k3 are target location points, and a matching result is FP.

Figure 19D:
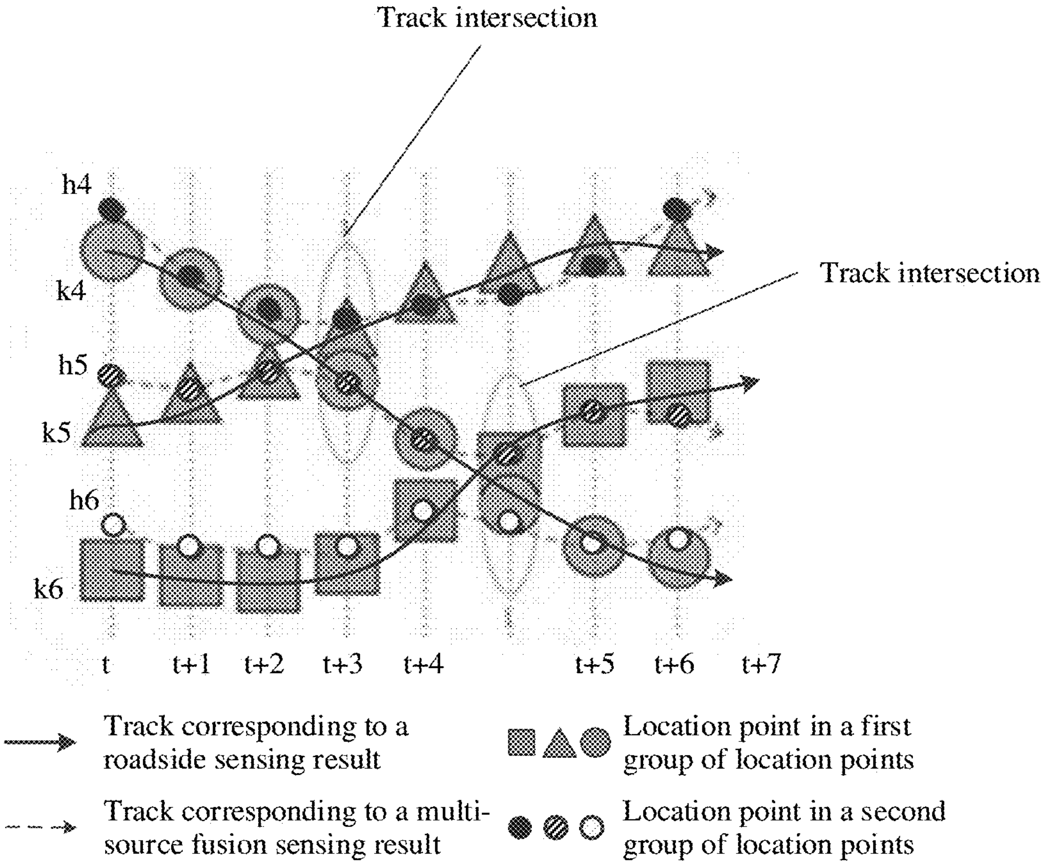
FIG. 19D is a schematic diagram of track matching according to an embodiment.

FIG. 19D is a schematic diagram of track matching according to an embodiment. As shown in FIG. 19D, k4, k5, and k6 are tracks corresponding to the roadside sensing result, and location points on k4, k5, and k6 are location points in the first group of location points; and h4, h5, and h6 are tracks corresponding to the multi-source fusion sensing result, and location points on h4, h5, and h6 are location points in the second group of location points. Tracks of different traffic participants may intersect. As shown in FIG. 19D, k4 and k5 intersect, and k4 and k6 intersect. If a part of k4 from t to t+3 and a part of k5 from t+3 to t+7 are mistakenly determined as one track, a combined track of k4 and k5 is matched with h4, and therefore, a location point on h4 is mistakenly determined as a target location point whose matching result is TP. If a part of k4 from t+5 to t+7 and a part of k6 from t to t+5 are mistakenly determined as one track, a combined track of k4 and k6 is matched with h6, and therefore, a location point on h6 is mistakenly determined as a target location point whose matching result is TP. In this embodiment, the roadside sensing result and the multi-source fusion sensing result include attribute information such as a geometric shape size and a color. When tracks of different traffic participants intersect, a possibility of track mis-determining can be reduced, and accuracy and confidence of the target location points are improved.

In a possible implementation, a target location point whose matching result is TP may be associated with indicator information, to indicate a status of the target location point. In an example, the indicator information may include one or more of a motion indicator error, a shape size error, target tracking stability, and a location point correct matching rate. The motion indicator error includes a location error and/or a speed error. For example, the location error may be dx/dy, where dx represents a difference, in a horizontal direction or longitude, between the target location point and a first location point matching the target location point, and dy represents a difference, in a vertical direction or latitude, between the target location point and the first location point matching the target location point. The speed error may be one or more of a speed difference, a speed ratio, an acceleration difference, and an acceleration ratio. The shape size error may be a size difference or a size ratio. The target tracking stability indicates a deviation between an estimated location point and a collected location point, and may reflect reliability of a group of location points. High target tracking stability indicates high reliability of a group of location points, and low target tracking stability indicates low reliability of a group of location points. In a process of determining target tracking stability, a Kalman filter, a hidden Markov model, or a mean shift may be used to estimate a location point. The location point correct matching rate represents a ratio of a quantity of location points whose matching results are TP in the second group of location points to a total quantity of location points in the second group of location points. It may be understood that, for target location points in a same second group of location points, tracking stability associated with the target location points is the same, and location point correct matching rates associated with the target location points are also the same. It may be understood that the foregoing is merely an example for description of the indicator information, and the target location point whose matching result is TP may alternatively be associated with other indicator information.

In this way, a plurality of target location points and a matching result of each target location point are obtained. The following describes a process of generating the first sensing capability information of the first roadside device based on the matching result.

In a possible implementation, the generating the first sensing capability information of the first roadside device based on the matching result may include: determining a plurality of grids based on the preselected scope of the first roadside device; combining grids whose grid indicators meet a first condition in the plurality of grids to obtain a combined grid, and continuing to combine grids whose grid indicators meet the first condition in existing grids until no grid meeting the first condition exists; determining, for any grid, the grid as a sensing region, and determining a sensing capability level of the grid based on an indicator scope within which a grid indicator of the grid falls; and determining sensing capability information of the first roadside device based on location information of each grid and a sensing capability level of each grid.

The preselected scope of the first roadside device may be a region near the first roadside device, and the preselected scope of the first roadside device may be determined based on the sensing scope factory-delivery indicator of the first roadside device and the installation direction of the first roadside device. In an example, the preselected scope of the first roadside device needs to be greater than a scope indicated by the sensing scope factory-delivery indicator of the first roadside device in the installation direction.

In a possible implementation, the determining a plurality of grids based on the preselected scope of the first roadside device may include: performing grid processing on the preselected scope of the first roadside device, to obtain the plurality of grids.

In another possible implementation, the determining a plurality of grids based on the preselected scope of the first roadside device may include: obtaining an intersection region between the preselected scope of the first roadside device and a first road, to obtain a to-be-divided region; and performing grid processing on the to-be-divided region, to obtain the plurality of grids. The first road may represent a road on which the first roadside device is located or a road sensed by the first roadside device. An association relationship between the first road and the first roadside device may be preset when the first roadside device is deployed.

Figure 20A:
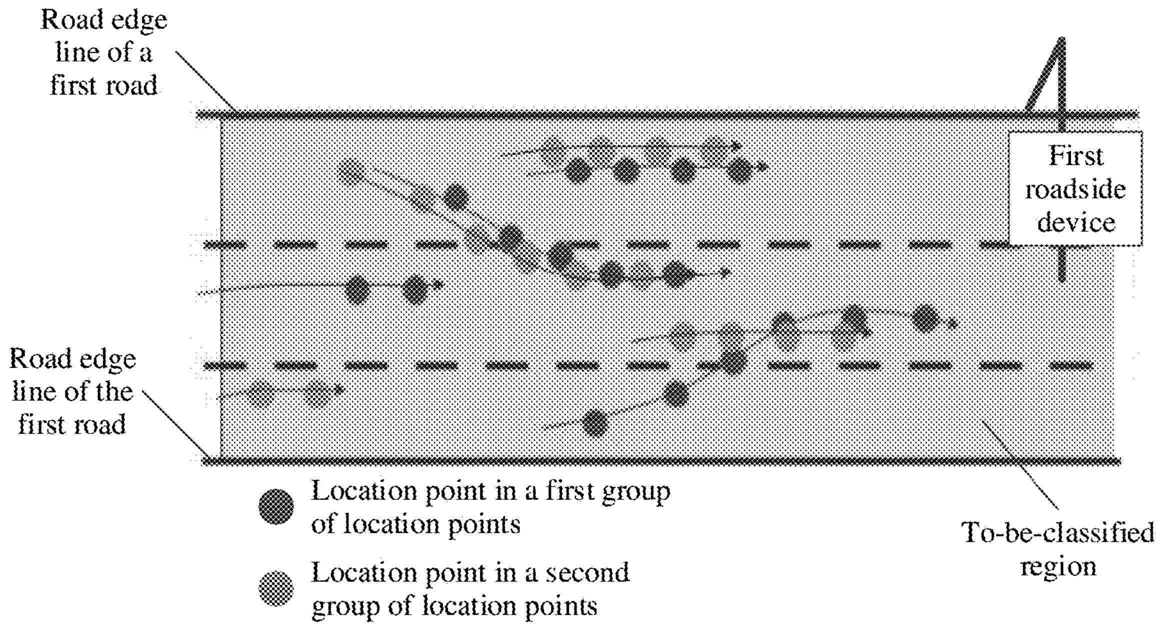
FIG. 20A is an example schematic diagram of a to-be-divided region according to an embodiment.
Figure 20B:
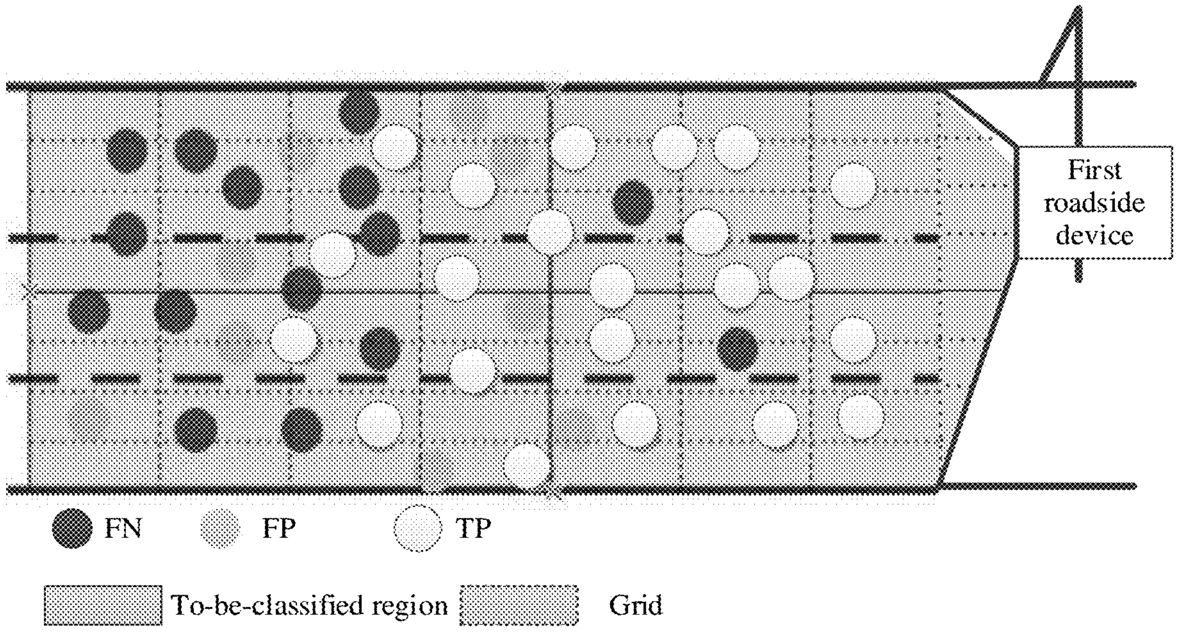
FIG. 20B is an example schematic diagram of a grid according to an embodiment.

FIG. 20A is an example schematic diagram of a to-be-divided region according to an embodiment. As shown in FIG. 20A, the to-be-divided region does not exceed a road edge line of the first road. In this way, a quantity of sensed traffic participants may not be reduced, and subsequent grid division and fusion are facilitated. FIG. 20B is an example schematic diagram of a grid according to an embodiment. As shown in FIG. 20B, the to-be-divided region may be divided into a plurality of grids. In an example, the to-be-divided region is evenly divided into a plurality of grids, to facilitate statistics management. Further, the to-be-divided region may alternatively be divided into a plurality of grids in another manner. For example, an area of a grid obtained through division in a region closer to the first roadside device is less than an area of a grid obtained through division in a region farther away from the first roadside device.

After the grids are divided, a grid indicator for each grid can be determined. In an example, for each grid, a grid indicator of the grid may be determined based on indicator information of a target location point of the grid. In an example, the grid indicator includes one or more of a checkout indicator, a motion indicator, and a tracking indicator. The checkout indicator includes an accuracy rate and/or a recall rate. The motion indicator includes a speed and/or an acceleration. The tracking indicator includes a location point correct matching rate and/or target tracking stability.

After grid indicators of the grids are determined, grids whose grid indicators meet the first condition in the plurality of grids may be combined, to obtain a combined grid. The first condition includes one or more of the following conditions: a difference between checkout indicators is less than a first threshold; a difference between motion indicators is less than a second threshold; and a difference between tracking indicators is less than a third threshold. The first threshold, the second threshold, and the third threshold may be set as used. For example, the first threshold may be 90%, the second threshold may be 1 m/s, and the third threshold may be 95%. The first threshold, the second threshold, and the third threshold are not limited.

Figure 20C:
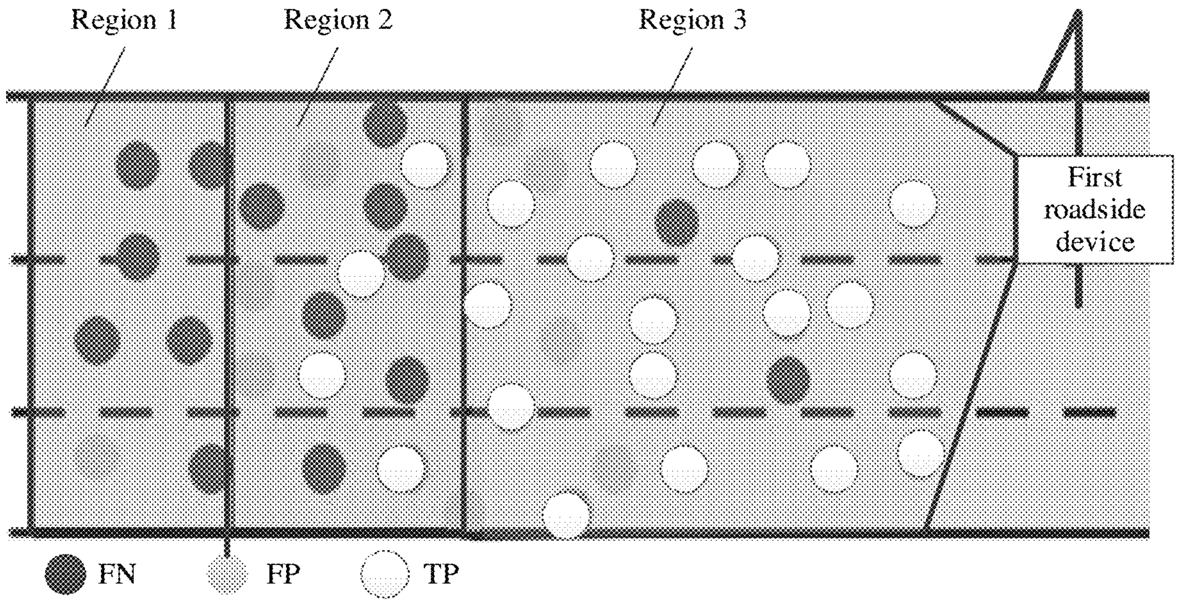
FIG. 20C is a diagram of a grid combination result according to an embodiment.

Then, the grid indicators of the grids obtained after a previous round of combination are determined, and grids whose grid indicators meet the first condition in existing grids are continuously combined until no grid meeting the first condition exists. FIG. 20C is a diagram of a combination result of grids according to an embodiment. As shown in FIG. 20C, the grids obtained through division are combined to obtain three regions: a region 1, a region 2, and a region 3. As shown in FIG. 20C, in the region 1, a proportion of target location points whose matching result is FN is large, a proportion of target location points whose matching result is FP is very small, and a proportion of target location points whose matching result is TP is extremely small (even 0). It can be understood that the first roadside device fails to sense a traffic participant existing in the region 1, and the first roadside device does not have a sensing capability in the region 1. In the region 2, a proportion of target location points whose matching result is TP is small, and a proportion of location points whose matching result is FN and a proportion of location points whose matching result is FP are large. It can be understood that the first roadside device can sense some traffic participants in the region 2, and the first roadside device has a sensing capability in the region 2, but the sensing capability is poor. In the region 3, a proportion of target location points whose matching result is TP is large, and a proportion of target location points whose matching result is FN and a proportion of target location points whose matching result is FP are very small. It can be understood that the first roadside device has a sensing capability in the region 3, and the sensing capability is strong.

When no grid meeting the first condition exists, that is, grid combination cannot continue, for any grid, the grid is determined as a sensing region and a sensing capability level of the sensing region is determined based on an indicator scope within which a grid indicator of the sensing region falls. The sensing capability information of the first roadside device is determined based on the location information of each sensing region and the sensing capability level of each sensing region.

In embodiments, each indicator scope corresponds to one sensing capability level, and that a sensing capability level of the sensing region is determined based on an indicator scope within which a grid indicator of the sensing region falls includes: When the grid indicator of the sensing region falls within a first indicator scope, the sensing capability level of the sensing region is determined as a first sensing capability level. The first indicator scope is any one of the indicator scopes, and the first sensing capability level is a sensing capability level corresponding to the first indicator scope. For example, in FIG. 20C, it is assumed that there are three sensing regions: a region 1, a region 2, and a region 3. A grid indicator of the region 1 falls within an indicator scope 1, a grid indicator of the region 2 falls within an indicator scope 2, and an indicator of the region 3 falls within an indicator scope 3. In this case, a sensing capability level of the first roadside device in the region 1 is a level 1, a sensing capability level of the first roadside device in the region 2 is a level 2, and a sensing capability level of the first roadside device in the region 3 is a level 3.

In an example, that the grid indicator of the sensing region falls within a first indicator scope may include: The checkout indicator falls within a first scope, and/or the motion indicator falls within a second scope, and/or the tracking indicator falls within a third scope. The first scope, the second scope, and the third scope may be set as used. This is not limited.

In an example, the sensing capability level may include: a dead zone, a weak sensing capability, an average sensing capability, and a strong sensing capability. In another example, the sensing capability level may include: a low level, an intermediate level, and a high level. In still another example, the sensing capability level may include: a first level, a second level, a third level, a fourth level, and the like. It may be understood that the foregoing is merely an example for description of the sensing capability level. A division manner and a division quantity of sensing capability levels are not limited.

In a possible implementation, the first sensing capability information may indicate a sensing capability of the first roadside device. For example, the first sensing capability information may indicate a region that can be sensed by the first roadside device and a region that cannot be sensed by the first roadside device. For example, the first roadside device can sense a region within 200 meters, but cannot sense a region beyond 200 meters.

In a possible implementation, the first sensing capability information may indicate a first region and a sensing capability of the first roadside device in the first region.

The first region may represent any region. In an example, the first region may be a region on the first road. The first region may be a rectangle, a sector, a polygon, or the like. A shape and an area of the first region are not limited in embodiments. For example, an effect of sensing a region within 100 meters by the first roadside device is good, that is, a sensing capability is strong. An effect of sensing a region from 100 meters to 150 meters by the first roadside device is average, that is, a sensing capability is average. An effect of sensing a region from 150 meters to 200 meters by the first roadside device is poor, that is, a sensing capability is weak. A region beyond 200 meters cannot be sensed by the first roadside device, that is, a sensing capability is none.

In a possible implementation, the first sensing capability information may indicate a first scenario, a first region, a sensing capability of the first roadside device in the first scenario, and a sensing capability of the first roadside device in the first region.

The "scenario" in embodiments identifies an environment in which a device having a sensing function works, or identifies an environment in which a target that is sensed by a device having a sensing function. The first scenario may represent any scenario. For example, the first scenario includes, but is not limited to, a scenario that affects a sensing capability, such as a day, a night, a sunny day, a cloudy day, a windy and sandy day, a rainy and snowy day, or a foggy day. It may be understood that a sensing scope of the first roadside device during daytime is greater than a sensing scope of the first roadside device at night, and a sensing scope of the first roadside device in a sunny day is greater than a sensing scope of the first roadside device in a cloudy day, a windy and sandy day, a rainy and snowy day, and a foggy day. The sensing scope of the first roadside device varies based on a wind and sand size, rain and snow intensity, or a fog level. Therefore, in embodiments, the sensing capability of the first roadside device may be described by scenario, so that accuracy of the sensing capability of the first roadside device is higher. For example, in a scenario of a sunny day, a sensing capability of the first roadside device in the region 2 shown in FIG. 20C is average, and a sensing capability of the first roadside device in the region 3 shown in FIG. 20C is strong. In a scenario of a foggy day, a sensing capability of the first roadside device in the region 2 shown in FIG. 20C is weak, and a sensing capability of the first roadside device in the region 3 shown in FIG. 20C is average.

It should be noted that, when the first sensing capability information indicates the first scenario, the first region, the sensing capability of the first roadside device in the first scenario, and the sensing capability of the first roadside device in the first region, a scenario label may be added to the roadside sensing data, the vehicle sensing data, the vehicle location data, and the terminal location data. In this way, a roadside sensing result and a multi-source fusion sensing result in the first scenario may be obtained. If no scenario label is added to the roadside sensing data, the vehicle sensing data, the vehicle location data, and the terminal location data, before the roadside sensing result and the multi-source fusion sensing result in the first scenario are obtained, third-party information (for example, time information and historical weather information) may be combined to obtain roadside sensing data, vehicle sensing data, vehicle location data, and terminal location data in the first scenario.

In this way, the first sensing capability information of the first roadside device is obtained. In embodiments, for any second roadside device, the second sensing capability information of the second roadside device may be obtained by referring to the first sensing capability information of the first roadside device. A manner of obtaining the second sensing capability information of the second roadside device, refer to a manner of obtaining the sensing capability information of the first roadside device. Details are not described herein again.

In a possible implementation, the first sensing capability information of the first roadside device may be associated with a road identifier. In this way, before a route is planned or a traffic participant plans to enter a road or a road section, sensing capability information of each roadside device on the road or the road section may be invoked, to determine a roadside sensing effect of each region on the road or the road section, which helps improve safety.

The following describes an application of the sensing capability information.

Considering that a dead zone may still exist under a plurality of roadside devices on a road due to a cause such as a block, in embodiments, an overall sensing coverage capability may be formed by combining sensing capability information of each roadside device. In a possible implementation, the method further includes: generating a plurality of pieces of sensing capability information of a plurality of roadside devices; and generating sensing dead zone information based on the plurality of pieces of sensing capability information.

The plurality of pieces of sensing capability information indicate sensing capabilities of the plurality of roadside devices. For example, if the plurality of roadside devices include the first roadside device, the plurality of pieces of sensing capability information include the first sensing capability information. In addition, the plurality of roadside devices may further include one or more second roadside devices, and the plurality of pieces of sensing capability information include one or more pieces of second sensing capability information.

The sensing dead zone information indicates a region that is not covered by one or more roadside devices in the plurality of roadside devices. In an example, the region that is not covered by one or more roadside devices in the plurality of roadside devices includes: an absolute dead zone and/or a relative dead zone. Each of the plurality of roadside devices fails to meet a sensing capability standard in the absolute dead zone, and some of the plurality of roadside devices fail to meet a sensing capability standard in the relative dead zone.

Figure 21:
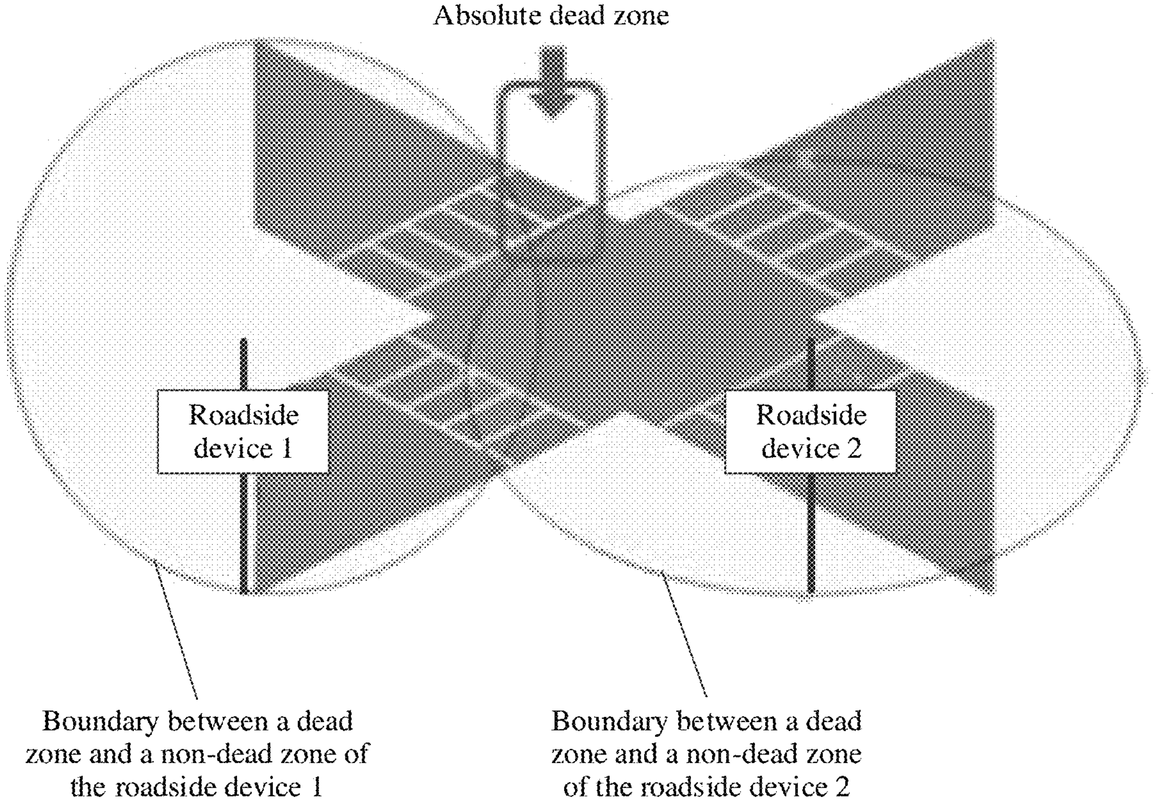
FIG. 21 is an example schematic diagram of a sensing dead zone according to an embodiment.

The sensing capability standard may be set as used, and the sensing capability standard is not limited. In an example, meeting the sensing capability standard includes, but is not limited to: meeting the preset sensing capability level (for example, the corresponding sensing level is a level 1 or a level 2), or falling within a preset indicator scope (for example, the checkout indicator falls within the preset indicator scope, and/or the motion indicator falls within the preset indicator scope, and/or the tracking indicator falls within the preset indicator scope), and the like. When a roadside device does not meet the sensing capability standard in a region, it indicates that a sensing effect of the roadside device in the region is poor, and confidence of information sensed in the region is low. Therefore, the region is a dead zone of the roadside device. FIG. 21 is an example schematic diagram of a sensing dead zone according to an embodiment. FIG. 21 shows a boundary between a sensing dead zone and a non-sensing dead zone of a roadside device 1, and a boundary between a sensing dead zone and a non-sensing dead zone of a roadside device 2. A region within the boundary is a non-sensing dead zone, and a region outside the boundary is a sensing dead zone. An intersection region of the sensing dead zone of the roadside device 1 and the non-sensing dead zone of the roadside device 2, and an intersection region of the non-sensing dead zone of the roadside device 1 and the sensing dead zone of the roadside device 2 are relative sensing dead zones. An intersection region of the sensing dead zone of the roadside device 1 and the sensing dead zone of the roadside device 2 is an absolute sensing dead zone.

A process of determining a relative sensing dead zone and an absolute sensing dead zone is described by using the roadside device 1 and the roadside device 2 shown in FIG. 21 as an example.

When a communication connection is established between the roadside device 1 and the roadside device 2, a sensing capability of a region is a best sensing capability of the roadside device 1 and the roadside device 2. For a region, if neither the sensing capability of the roadside device 1 nor the sensing capability of the roadside device 2 meets a sensing capability standard, it may be determined that the region is an absolute sensing dead zone. In this case, the relative sensing dead zone may not be marked.

When no communication connection is established between the roadside device 1 and the roadside device 2, a region in which the sensing capability of the roadside device 1 does not reach the sensing capability standard but the sensing capability of the roadside device 2 can reach the sensing capability standard, and a region in which the sensing capability of the roadside device 2 does not reach the sensing capability standard but the sensing capability of the roadside device 1 can reach the sensing capability standard are determined as relative sensing dead zones; and a region in which the sensing capability of the roadside device 1 and the sensing capability of the roadside device 2 do not reach the sensing capability standard is determined as an absolute sensing dead zone.

In an example, different identifiers may be added for the absolute sensing dead zone and the relative sensing dead zone. For example, a first identifier is added to the absolute sensing dead zone, and a second identifier is added to the relative sensing dead zone. In this way, it may be determined, based on the identifier, whether a sensing dead zone is an absolute sensing dead zone or a relative sensing dead zone. Optionally, when the relative sensing dead zone is identified, the relative sensing dead zone may be further associated with the identifier of the roadside device, to determine which roadside device a relative sensing dead zone belongs to.

In still another example, a connection may be established between sensing capability information of one roadside device and a roadside device to which the roadside device establishes a communication connection. In this way, a user may determine which roadside device establishes a communication connection to the roadside device, to determine where an absolute sensing dead zone is and where a relative sensing dead zone is.

In a possible implementation, the method further includes: generating warning prompt information based on the first sensing capability information. The warning prompt information prompts a driver to take over a vehicle in a second region, perform fault detection on the first roadside device, and reduce confidence of information that is about the second region and that is sensed by the first roadside device, or avoid the second region during route planning.

The first sensing capability information indicates that the sensing capability of the first roadside device in the second region is lower than a sensing threshold. The sensing threshold can be set as used. In an example, being below the sensing threshold may include, but is not limited to, one or more of the following: not reaching a threshold sensing capability level (for example, not reaching a first-level sensing capability level or not reaching a second-level sensing capability level), that the checkout indicator does not reach a preset checkout indicator threshold, that the motion indicator does not reach a preset motion indicator threshold, and that the tracking indicator does not reach a preset tracking indicator threshold. The checkout indicator threshold, the motion indicator threshold, and the tracking indicator threshold may be set as used. This is not limited in embodiments. Considering that the sensing capability standard is used to determine a sensing dead zone, the sensing threshold is used to perform a warning, and a warning needs to be performed in a region that is a non-sensing dead zone but has a poor sensing effect. In an example, the sensing threshold may be greater than (higher than) or equal to the sensing capability standard.

Because the sensing capability of the first roadside device in the second region is less than the sensing threshold, it indicates that a sensing effect of the first roadside device in the second region is poor, and the first roadside device cannot accurately and comprehensively sense a traffic participant in the second region. Therefore, a risk of performing autonomous driving by the vehicle in the second region is high, and the driver may take over the vehicle in the second region. In addition, fault detection may be performed on the first roadside device, to check whether the poor sensing effect of the first roadside device in the second region is caused by a fault of the first roadside device, such as when the second region is close to the first roadside device. In addition, because the sensing effect of the first roadside device in the second region is poor, accuracy of information that is about the second region and that is sensed by the first roadside device is low, and confidence of the information that is about the second region and that is sensed by the first roadside device can be reduced. In an example, the information that is about the second region and that is obtained through sensing by the first roadside device includes: a location point of a traffic participant in the second region, and one or more of time information, location information, a motion parameter, attribute information, and the like of each location point. Because the sensing effect of the first roadside device in the second region is poor, the first roadside device may avoid the second region during route planning. In this way, a possibility that an accident occurs after the vehicle enters the second region can be reduced. For example, for an autonomous vehicle, a driver does not need to take over the vehicle by avoiding the second region, and this can effectively improve user experience.

In a possible scenario, the roadside device may report a parameter about a coverage scope to a data processing apparatus. Correspondingly, the data processing apparatus generates coverage information of a roadside device based on a parameter about a coverage scope reported by the one or more roadside devices. The parameter about the coverage scope reported by the roadside device may be preconfigured, predefined, or predesigned in the roadside device, or may be obtained through actual detection. Optionally, the parameter about the coverage scope or the coverage information may include information that indicates a source of the coverage capability (for example, the coverage capability may be predesigned, measured, or estimated).

Optionally, the roadside device may include one or more sensing devices, or may be connected to one or more sensing devices. The sensing capability of the roadside device may be implemented by using a sensing device. Further, optionally, the sensing devices may be combined, and one or more sensing devices may form a sensing device group. For example, a camera and a lidar may be used as a fusion sensing device group, to perform fusion sensing combining image and laser detection.

Further, optionally, when the roadside device includes a plurality of sensing devices (or is connected to a plurality of sensing devices), a sensing coverage region in the coverage information may correspond to a sensing device or a sensing device group. For example, when the coverage information of the roadside device includes a plurality of sensing coverage regions, each of the plurality of sensing coverage regions may correspond to one sensing device, or each sensing coverage region corresponds to one sensing device group, or some of the plurality of sensing coverage regions correspond to sensing devices, and some of the sensing regions correspond to sensing device groups.

In a possible implementation, the sensing coverage region corresponding to the sensing device group and the coverage capability in the sensing coverage region are determined based on coverage capabilities of sensing devices in the sensing device group. For example, a coverage capability of the sensing device group may be obtained by fusing sensing capabilities of the plurality of sensing devices. Further, regions are classified by levels based on the fused coverage capability, to obtain the coverage region corresponding to the sensing device group.

The sensing coverage region corresponding to the sensing device group may be referred to as a multi-device sensing coverage region, and the multi-device sensing coverage region and the coverage capability of the roadside device in the multi-device sensing coverage region are determined based on coverage capabilities of the plurality of sensing devices in the sensing device group. That the plurality of sensing devices are related to the roadside device means that each of the plurality of sensing devices is related to the roadside device. That the sensing device is related to the roadside device means that the sensing device sends, to the roadside device, information sensed by the sensing device. In physical implementation, that the sensing device is related to the roadside device includes but, is not limited to, that the sensing device is disposed in the roadside device, or that the sensing device is disposed outside the roadside device but connected to the roadside device in a wireless or wired manner.

(2) For the communication capability of the roadside device, a coverage region of the roadside device is a communication region, and coverage capability information that indicates a coverage capability of the roadside device in at least one coverage region is communication capability information.

Figure 22:
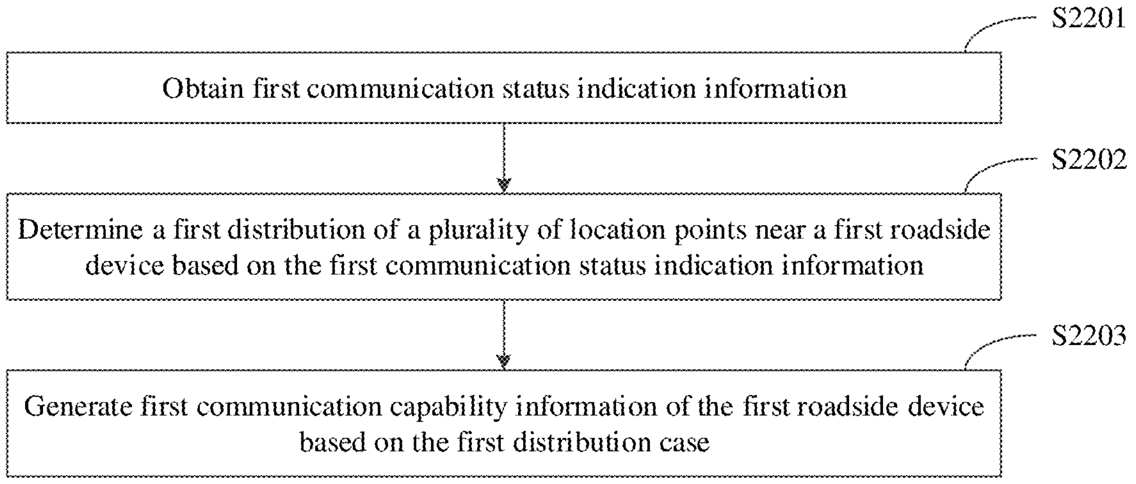
FIG. 22 is a flowchart of a communication capability information generation method according to an embodiment.

FIG. 22 is a flowchart of a communication capability information generation method according to an embodiment. As shown in FIG. 22, the method includes the following steps. Step S2201: Obtain first communication status indication information.

Step S2202: Determine a first distribution of a plurality of location points near a first roadside device based on the first communication status indication information.

Step S2203: Generate first communication capability information of the first roadside device based on the first distribution.

The first roadside device is a roadside device whose communication capability is to be determined. The first roadside device may be any roadside device. The first communication capability information may indicate communication capability information of the first roadside device. The first communication capability information may indicate a communication capability of the first roadside device, for example, a region in which the first roadside device can perform communication and a region in which the first roadside device cannot perform communication.

The first communication status indication information may indicate a plurality of terminal devices to establish communication connections to the first roadside device at the plurality of location points. When a terminal device establishes a communication connection to the first roadside device at a location point, it indicates that the location point is within a communication scope of the first roadside device, and the communication capability of the first roadside device can reach the location point. Therefore, based on a distribution of the plurality of location points of the plurality of terminal devices that establish communication connections to the first roadside device, a region that can be reached by the communication capability of the first roadside device may be determined, to conveniently and accurately obtain the communication scope of the first roadside device.

It may be understood that, the plurality of location points of the plurality of terminal devices indicated by the first communication status indication information may include: location points of different terminal devices at a same moment, location points of a same terminal device at different moments, and location points of different terminal devices at different moments. For example, the plurality of location points of the plurality of terminal devices may include: a location point 1 of a vehicle 1 at 1:00 a.m. on Monday and a location point 2 of a vehicle 2 at 1:00 a.m. on Monday; a location point 1 of the vehicle 1 at 1:00 a.m. on Monday and a location point 3 of the vehicle 1 at 1:00 p.m. on Monday; and a location point 4 of a vehicle 3 at 1:00 a.m. on Tuesday and a location point 5 of a vehicle 4 at 1:00 p.m. on Tuesday. In other words, in embodiments, whether the plurality of location points indicated by the first communication status indication information are location points of a same terminal device and whether the plurality of location points indicated by the first communication status indication information are location points collected at a same moment is not limited.

In a possible implementation, the first communication status indication information may include: location information of the plurality of indicated location points, working status information of a plurality of communication modules in the plurality of indicated terminal devices, connection status information between the plurality of indicated terminal devices and the first roadside device, identification information of the first roadside device, and time information. The location information of the location points, the working status information of the communication modules, and the time information are described above, and details are not described herein again.

The connection status information between a terminal device and a roadside device may be a connected state or a disconnected state. The connected state indicates that the terminal device establishes a communication connection to the roadside device, and the unconnected state indicates that the terminal device does not establish a communication connection to the roadside device. Because the first communication status indication information indicates that the plurality of terminal devices establish communication connections to the first roadside device at the plurality of location points, the connection status information between the plurality of terminal devices and the first roadside device in the first communication status indication information is a connected state.

The identification information of the roadside device may identify different roadside devices. For example, the identification information of the roadside device may be a name of the roadside device, a number of the first roadside device, location information of the first roadside device, an identifier of a communication module disposed on the roadside device, an identifier customized by another user, or the like. Therefore, the identification information of the first roadside device may be a name of the first roadside device, a number of the first roadside device, an RSU_ID of the first roadside device, an identifier customized by another user for the first roadside device, or the like.

The following describes a process of obtaining the first communication status indication information.

Figure 23:
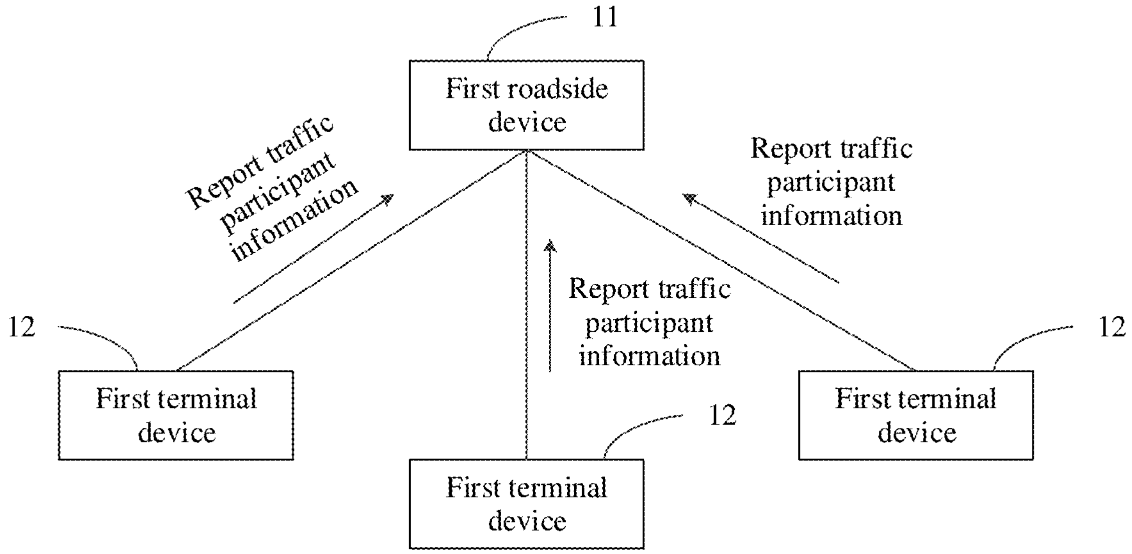
FIG. 23 is a schematic diagram of a structure of a communication system according to an embodiment.

FIG. 23 is a schematic diagram of a structure of a communication system according to an embodiment. As shown in FIG. 23, the communication system includes a first roadside device 11 and a first terminal device 12. The first roadside device 11 may represent any roadside device, and the first terminal device 12 represents a terminal device that establishes a communication connection to the first roadside device 11. The first terminal device 12 includes, but is not limited to, devices such as a vehicle-end device and a mobile terminal. The first roadside device 11 may be connected to one or more first terminal devices 12. For example, the first roadside device 11 may establish a communication connection to the first terminal device 12 by using a communication module in the first terminal device 12. After obtaining traffic participant data of the first terminal device 12, the first terminal device 12 may report the obtained traffic participant data to the first roadside device 11.

In a possible implementation, traffic participant data of a terminal device may include location information of a location in which the terminal device is located when the traffic participant data is collected, time information about collecting the traffic participant data, working status information of a communication module in the terminal device, and identification information of a roadside device connected to the terminal device. In an example, the location information may be denoted as Position, the working status information may be denoted as Connection, the identification information of the roadside device may be denoted as RSU_ID, and the time information may be denoted as Time. In this case, the traffic participant data of the terminal device may be denoted as (Position, Device, Connection, RSU_ID, Time). Because the first terminal device 12 is a terminal device that establishes a communication connection to the first roadside device 11, in the traffic participant data of the first terminal device 12, the working status information of the communication module is a "normal working state", and the identification information of the roadside device includes "identification information of the first roadside device 11". After receiving the traffic participant data reported by each first terminal device 12, the first roadside device 11 may generate first communication status indication information based on the received information.

It should be noted that, as shown in FIG. 23, it can be understood that the first terminal device 12 that establishes a communication connection to the first roadside device 11 may directly report traffic participant data to the first roadside device 11. Another terminal device that does not establish a communication connection to the first roadside device 11 cannot directly report traffic participant data of the terminal device to the first roadside device 11 (a case of forwarding by using another roadside device is not considered herein, and even if the first roadside device receives the traffic participant data forwarded by another roadside device, the first roadside device may still select, based on the identification information of the roadside device in the traffic participant data, traffic participant data of the first terminal device 12 that establishes a communication connection to the first roadside device 12). Therefore, all the traffic participant data collected by the first roadside device 11 is from the first terminal device 12 that establishes a communication connection to the first roadside device 11.

After obtaining the first communication status indication information, the first roadside device may perform step S2202 to obtain a first distribution. In an example, the first roadside device may determine the first distribution based on location information of a first location point (that is, a location point of the first terminal device indicated by the first communication status indication information).

Figure 24:
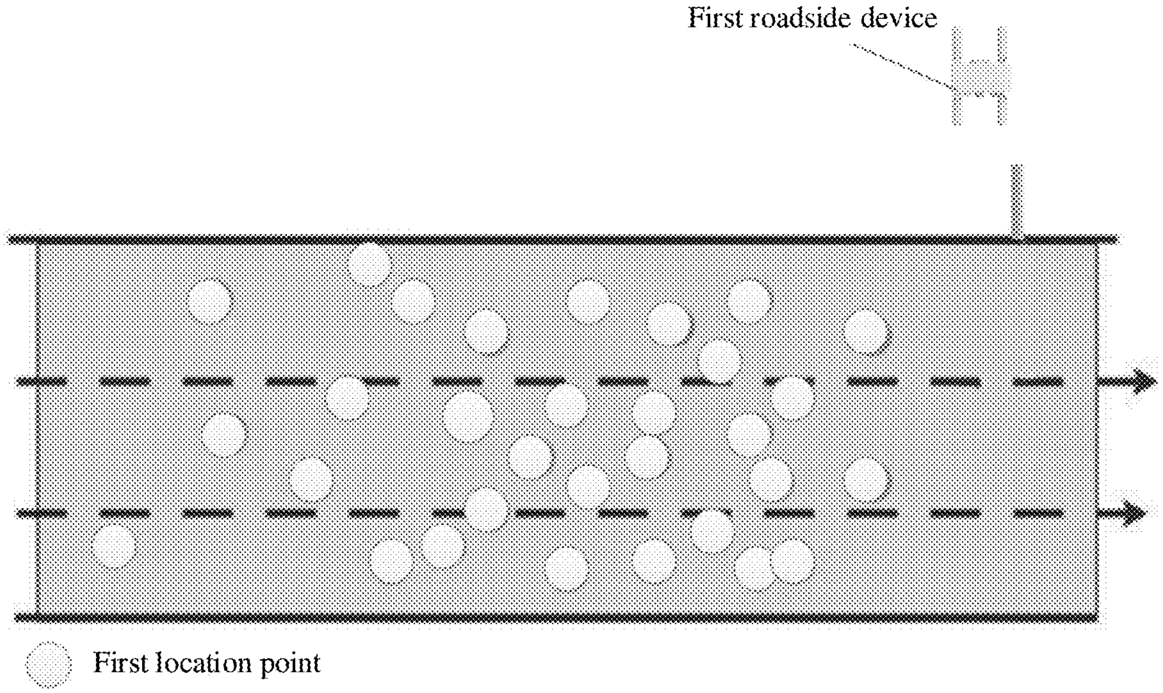
FIG. 24 is an example schematic diagram of a first distribution.

FIG. 24 is an example schematic diagram of the first distribution. As shown in FIG. 24, the first terminal device (that is, a terminal device that establishes a communication connection to the first roadside device) establishes a communication connection to the first roadside device at a plurality of location points, and location information of these location points is the first distribution. It can be understood from FIG. 24 that, in a region close to the first roadside device, there are many location points at which a communication connection can be established to the first roadside device, and in a region far away from the first roadside device, there are few location points at which a communication connection can be established to the first roadside device.

Then, the first roadside device 11 may perform step S2203 to obtain first communication capability information.

Figure 25:
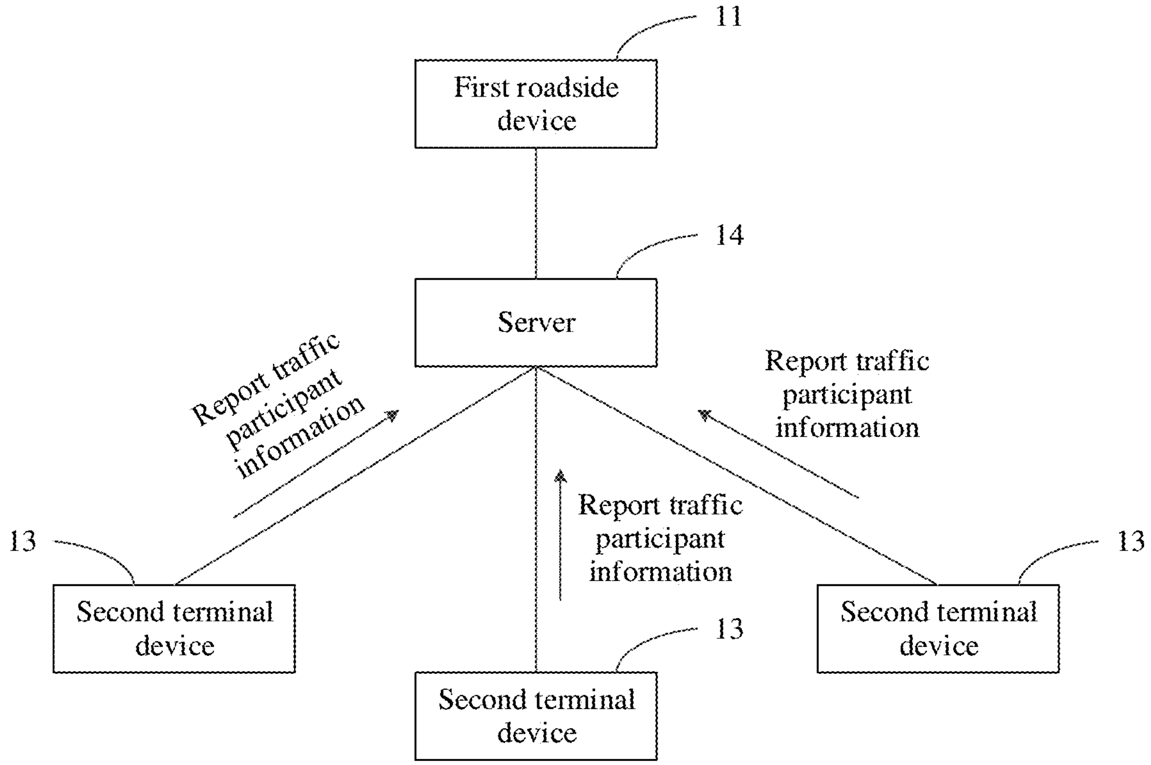
FIG. 25 is a schematic diagram of a structure of a communication system according to an embodiment.

FIG. 25 is a schematic diagram of a structure of a communication system according to an embodiment. As shown in FIG. 25, the communication system includes a first roadside device 11, a second terminal device 13, and a server 14. The first roadside device 11 may be any roadside device. The second terminal device 13 may represent a terminal device that establishes a communication connection to the server 14. Both the first roadside device 11 and the second terminal device 13 may establish a communication connection to the server 14 through a cellular network. After obtaining traffic participant data of the second terminal device 13, the second terminal device 13 may report the obtained traffic participant data to the server 14. Considering that the second terminal devices 13 may include a first terminal device 12 that establishes a communication connection to the first roadside device 11, that is, some second terminal devices 13 may establish both a communication connection to the server 14 and a communication connection to the first roadside device 11, after receiving the traffic participant data reported by each second terminal device 13, the server 14 may select, based on working status information in each piece of traffic participant data and identification information of the roadside device, traffic participant data of the second terminal device 13 that establishes a communication connection to the first roadside device. For example, the server 14 may select, from the received traffic participant data, traffic participant data in which the working status information of the communication module is "normal working state" and the identification information of the roadside device includes "identification information of the first roadside device 11", and generates the first communication status indication information based on the selected traffic participant data.

In a possible implementation, after generating the first communication status indication information, the server 14 may perform step S2202 to obtain a first distribution, or send the first communication status indication information to the first roadside device 11, and the first roadside device 11 performs step S2202 to obtain a first distribution.

In a possible implementation, in a process in which the server 14 generates the first communication status indication information, in a process in which the server 14 selects the traffic participant data, the server 14 may first find traffic participant data within a preselected scope of the first roadside device from the collected traffic participant data, and then select traffic participant data in which the working status information is "normal working state" from the traffic participant data within the preselected scope. For ease of description, a data set including the traffic participant data selected in this case is referred to as a data set A. Then, the server 14 may select, from the data set A, traffic participant data in which the identification information of the roadside device includes the "identification information of the first roadside device 11". In embodiments, a data set including the traffic participant data selected in this case is referred to as a data set B. A data set formed by traffic participant data in the data set A except the traffic participant data in the data set B is referred to as a data set C. The preselected scope is a region near the first roadside device 11, and the preselected scope may be determined based on a communication scope factory-delivery indicator the first roadside device 11 and an installation direction of the first roadside device 11. For example, the preselected scope may be obtained by reserving a specific margin (for example, 3 meters, or 5 meters) in the installation direction on the basis of the communication scope factory-delivery indicator of the first roadside device.

Figure 26:
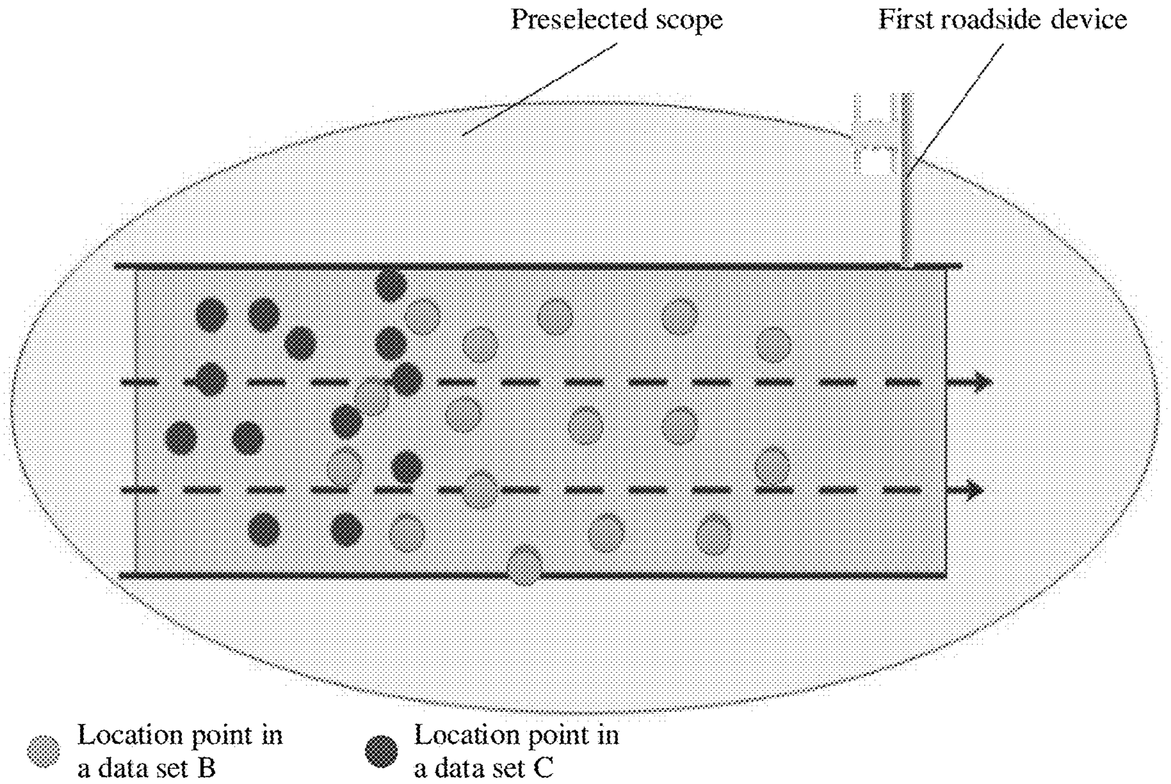
FIG. 26 is a schematic diagram of a distribution of terminal devices.

FIG. 26 is a schematic diagram of a distribution of terminal devices. As shown in FIG. 26, location points of a plurality of terminal devices are shown in a preselected scope. At some location points, the terminal device can establish a communication connection to the first roadside device, and at some location points, the terminal device cannot establish a communication connection to the first roadside device. Traffic participant data corresponding to the location points at which a communication connection can be established to the first roadside device is in the data set B, and traffic participant data corresponding to location points at which a communication connection cannot be established to the first roadside device is in the data set C. The location information of the location points in the data set B shown in FIG. 26 is the first distribution. It can be understood from FIG. 26 that, in a region close to the first roadside device, there are many location points at which a communication connection can be established to the first roadside device, and in a region far away from the first roadside device, there are few location points at which a communication connection can be established to the first roadside device.

Then, the server 14 or the first roadside device 11 may obtain the first communication capability information in step S2203.

The following describes a process of generating the first communication capability information based on the first distribution in step S2203. As shown in FIG. 23 and FIG. 25, it can be understood that step S2203 may be performed by the first roadside device, or may be performed by the server. The following uses an example in which the first roadside device performs step S2203 for description. For a process of performing step S2203 by the server, refer to a process of performing step S2203 by the first roadside device. Details are not described again in embodiments.

In a possible implementation, step S2203 may include: the first roadside device directly generates the first communication capability information based on the first distribution. The first distribution may be density of the first location point, and the first location point represents a location point of the first terminal device. In a region with a high density of the first location point, a communication capability of the first roadside device is strong, and in a region with a low density of the first location point, a communication capability of the first roadside device is weak. Therefore, the first roadside device may generate the first communication capability information based on the density of the first location point.

In a possible implementation, the first roadside device may obtain second communication status indication information, determine a second distribution based on the second status indication information, and then generate the first communication capability information based on the first distribution and the second distribution in step S2203.

The second communication status indication information indicates the at least one terminal device (for ease of description, in embodiments, the at least one terminal device is referred to as at least one third terminal device) to establish a communication connection to the second roadside device at the at least one location point (for ease of description, in embodiments, the at least one location point is referred to as at least one third location point), and a distance between the at least one third location point and the first roadside device is less than a preset threshold. For a process of obtaining the second communication status indication information, refer to the process of obtaining the first communication status indication information. The first roadside device in the process of obtaining the first communication status indication information is replaced with the second roadside device. The location information in the traffic participant information is limited to a scope in which a distance to the first roadside device is less than a preset threshold. The preset threshold may be set as used. In terms of a distance, the preset threshold may be 100 meters, 200 meters, 500 meters, 1000 meters, or the like. In an example, the first roadside device may determine the second distribution based on the location information of the third location point (that is, a location point indicated by the second communication status indication information). For the second distribution, refer to the location information of the location point in the data set B and the location information of the location point in the data set C in FIG. 26.

If a terminal device establishes a communication connection to the second roadside device at a location point at which a distance to the first roadside device is less than the preset threshold, it indicates that working status information of the communication module of the terminal device is a "normal working state", and the terminal device is near the first roadside device. In this case, the terminal device is the third terminal device, and the location point is the third location point. A third terminal device may establish a communication connection to the first roadside device at the third location point (for example, a location point in the data set B shown in FIG. 26), or may not establish a communication connection to the first roadside device (for example, a location point in the data set C shown in FIG. 26). In embodiments, the second distribution may be used as a comparison object of the first distribution. The second distribution is used to reflect a location point that actually exists near the first roadside device and that can establish a communication connection to the first roadside device. The first distribution is used to reflect a location point at which a communication connection is actually established to the first roadside device. In embodiments, a stable connection rate may be determined based on the first distribution and the second distribution. The stable connection rate may be a ratio of a quantity of first location points to a quantity of third location points. It may be understood that when the stable connection rate is high, it indicates that a quantity of location points at which a communication connection is actually established to the first roadside device is close to a quantity of location points that actually exist near the first roadside device and at which a communication connection can be established to the first roadside device, and a communication capability of the first roadside device is good. When the stable connection rate is low, it indicates that there is a large difference between the quantity of location points at which a communication connection is actually established to the first roadside device and the quantity of location points that actually exist near the first roadside device and at which a communication connection can be established to the first roadside device, and a communication capability of the first roadside device is poor. Therefore, the first roadside device may generate the first communication capability information based on the stable connection rate.

In a possible implementation, the first roadside device may obtain third communication status indication information, determine a third distribution based on the third communication status indication information, and then generate the first communication capability information based on the first distribution and the third distribution in step S2203.

The third communication status indication information indicates the at least one terminal device (for ease of description, in embodiments, the at least one terminal device is referred to as at least one second terminal device) to establish a communication connection to the server at the at least one location point (for ease of description, in embodiments, the at least one location point is referred to as at least one second location point). In addition, the at least one second terminal device has a capability of connecting to the first roadside device, and a distance between the at least one second location point and the first roadside device is less than a preset threshold. As shown in FIG. 25, a process of obtaining the third communication status indication information may be obtained by the server through selecting from received traffic participant information. For example, the server may select, from the received traffic participant information, traffic participant data whose distance to the first roadside device is less than a preset threshold and whose working status information of the communication module is a "normal working state", and then obtain the third communication status indication information based on the selected traffic participant data. In an example, the first roadside device may determine the third distribution based on the location information of the second location point (that is, a location point indicated by the third communication status indication information). For the third distribution, refer to the location information of the location point in the data set B and the location information of the location point in the data set C in FIG. 26.

If a terminal device establishes a communication connection to the server at a location point at which a distance to the first roadside device is less than the preset threshold, and the working status information of a communication module of the terminal device is "normal working state", it indicates that the terminal device is near the first roadside device and has a capability of connecting to the first roadside device. In this case, the terminal device is the second terminal device, and the location point is the second location point. If the first roadside device does not establish a communication connection to the third terminal device, it indicates that a communication capability of the first roadside device at the corresponding second location point is poor. If the first roadside device establishes a communication connection to the third terminal device, it indicates that a communication capability of the first roadside device at the corresponding third location point is strong. Therefore, in embodiments, the third distribution may be used as a comparison object of the first distribution. The third distribution is used to reflect a location point that actually exists near the first roadside device and that can establish a communication connection to the first roadside device. The first distribution is used to reflect a location point at which a communication connection is actually established to the first roadside device. In embodiments, a stable connection rate may be determined based on the first distribution and the third distribution. The stable connection rate may be a ratio of a quantity of first location points to a quantity of second location points. It may be understood that when the stable connection rate is high, it indicates that a quantity of location points at which a communication connection is actually established to the first roadside device is close to a quantity of location points that actually exist near the first roadside device and at which a communication connection can be established to the first roadside device, and a communication capability of the first roadside device is good. When the stable connection rate is low, it indicates that there is a large difference between the quantity of location points at which a communication connection is actually established to the first roadside device and the quantity of location points that actually exist near the first roadside device and at which a communication connection can be established to the first roadside device, and a communication capability of the first roadside device is poor. Therefore, the first roadside device may generate the first communication capability information based on the stable connection rate.

In a possible implementation, step S2203 may include: determining a plurality of grids based on the preselected scope of the first roadside device; combining grids whose grid indicators meet a first condition in the plurality of grids to obtain a combined grid, and continuing to combine grids whose grid indicators meet the first condition in existing grids until no grid meeting the first condition exists; determining, for each grid, the grid as a communication region, and determining a communication capability level of the grid based on an indicator scope within which a grid indicator of the grid falls; and determining first communication capability information based on location information of each grid and a communication capability level of each grid.

In an example, the determining a plurality of grids based on the preselected scope of the first roadside device may include: performing grid processing on the preselected scope of the first roadside device, to obtain the plurality of grids. In another example, the determining a plurality of grids based on the preselected scope of the first roadside device may include: obtaining an intersection region between the preselected scope of the first roadside device and a first road, to obtain a to-be-divided region; and performing grid processing on the to-be-divided region, to obtain the plurality of grids. The first road may represent a road on which the first roadside device is located or a road near the first roadside device. An association relationship between the first road and the first roadside device may be preset when the first roadside device is deployed.

The grid indicator is density or a stable connection rate of the first location point in the grid. Correspondingly, the first condition is that a density difference is less than a first threshold or a stable connection rate difference is less than a second threshold. The first threshold and the second threshold may be set as used. For example, the first threshold may be 0.2 location points/$m^2$, and the second threshold may be 0.1. The first threshold and the second threshold are not limited in embodiments.

Figure 27:
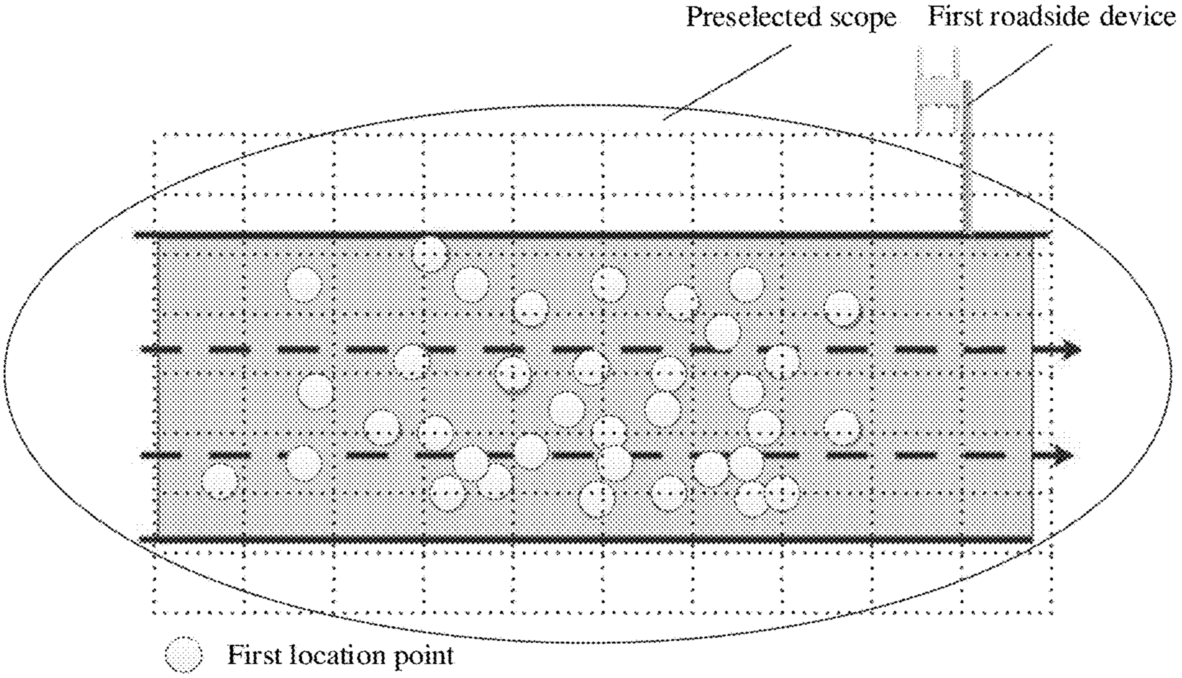
FIG. 27 is an example schematic diagram of a grid according to an embodiment.

FIG. 27 is an example schematic diagram of a grid according to an embodiment. As shown in FIG. 27, based on the first distribution shown in FIG. 24, the preselected scope of the first roadside device is divided into a plurality of grids. In an example, the to-be-divided region is evenly divided into a plurality of grids (as shown in FIG. 27), to facilitate statistics management. Additionally, the to-be-divided region may alternatively be divided into a plurality of grids in another manner. For example, an area of a grid obtained through division in a region closer to the first roadside device is less than an area of a grid obtained through division in a region farther away from the first roadside device (not shown). In this way, a number of calculations and a number of merges can be reduced.

After grid division is completed, density of first location points of each grid may be determined as a grid indicator of each grid. After grid indicators of the grids are determined, grids whose grid indicators meet the first condition in the plurality of grids may be combined, to obtain a combined grid.

Figure 28:
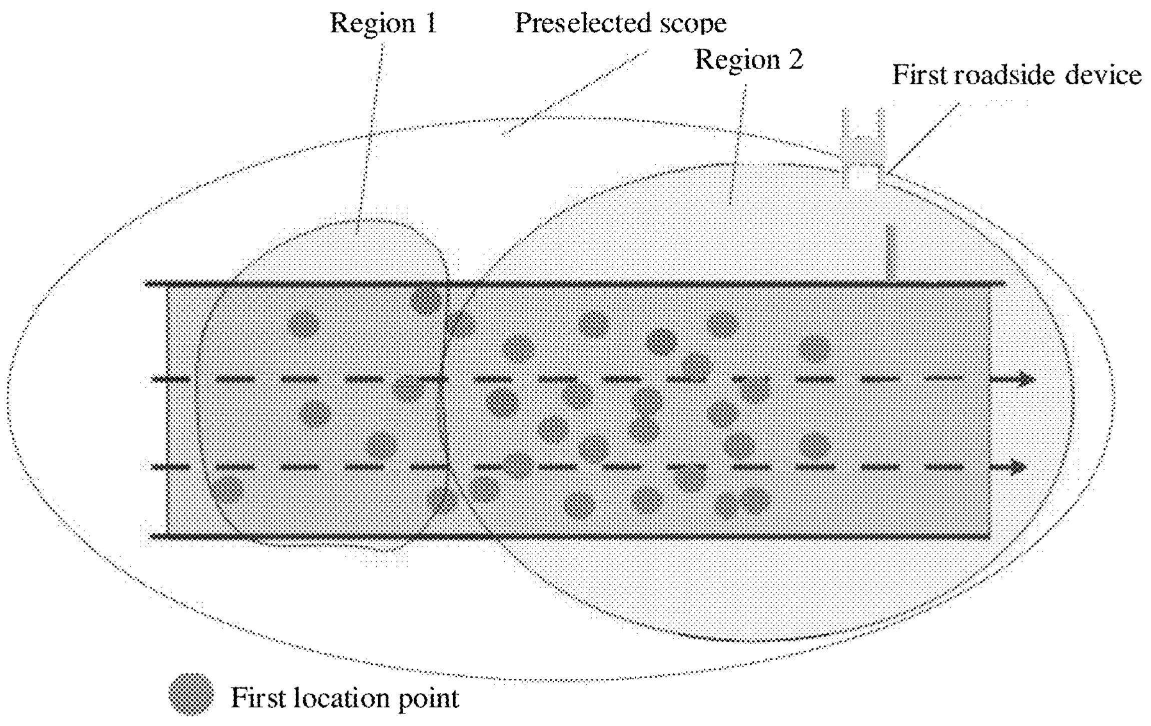
FIG. 28 is an example schematic diagram of a grid combination result according to an embodiment.

Then, the grid indicators of the grids obtained after a previous round of combination are determined, and grids whose grid indicators meet the first condition in existing grids are continuously combined until no grid meeting the first condition exists. FIG. 28 is an example schematic diagram of a grid combination result according to an embodiment. As shown in FIG. 28, the grids shown in FIG. 27 are finally combined to obtain a region 1 and a region 2. Density of the first location points in the region 1 is low, and density of the first location points in the region 2 is high. It can be understood that the first roadside device has a communication capability in the region 1, but the communication capability is poor, and has a communication capability in the region 2, and the communication capability is strong.

Figure 29:
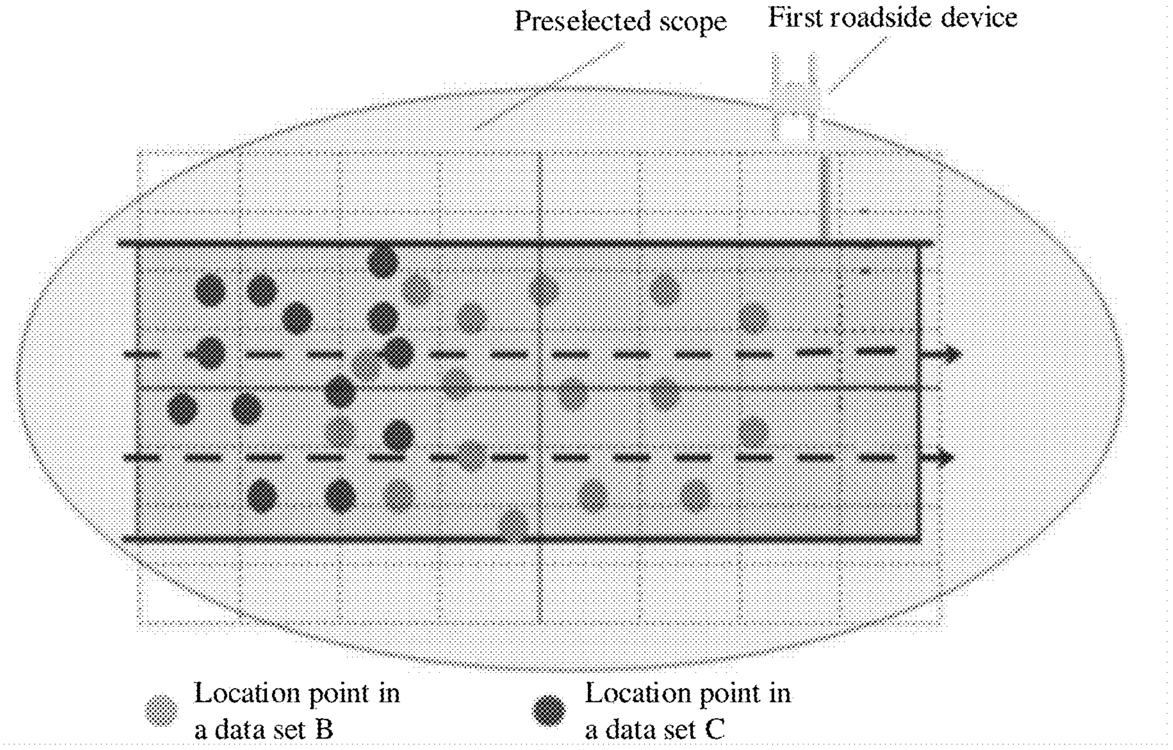
FIG. 29 is an example schematic diagram of a grid according to an embodiment.
Figure 30:
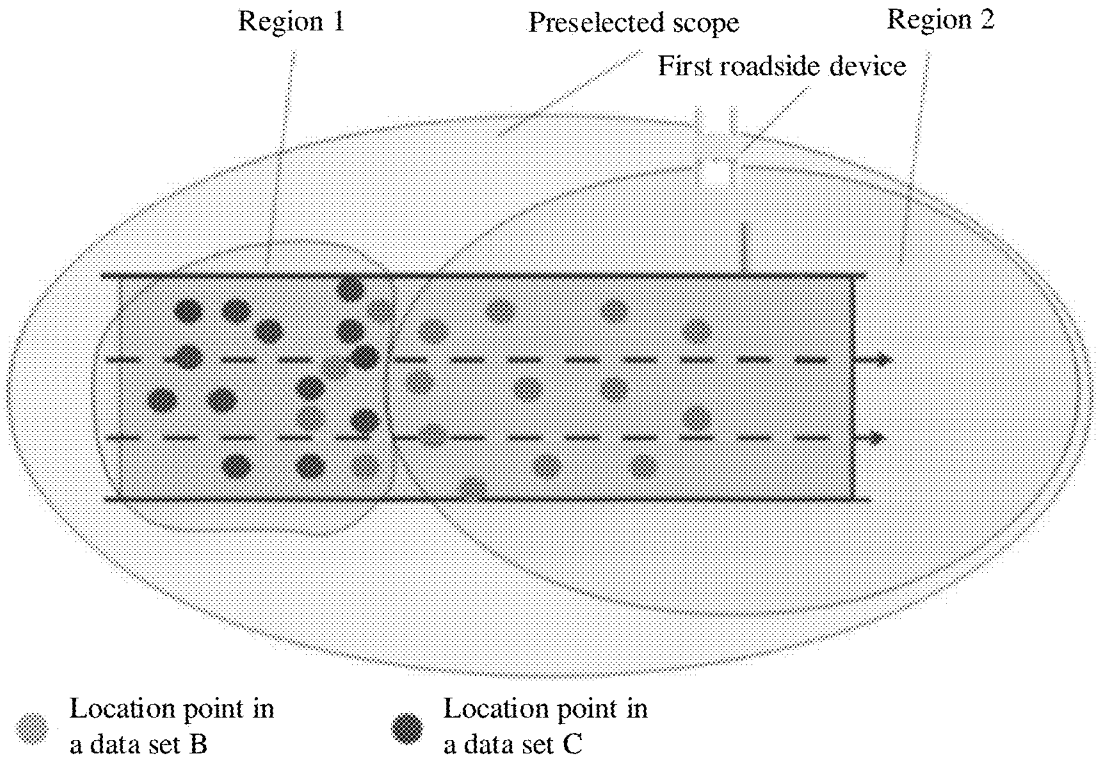
FIG. 30 is an example schematic diagram of a grid combination result according to an embodiment.

FIG. 29 is an example schematic diagram of a grid according to an embodiment. As shown in FIG. 29, based on the distribution of the terminal device shown in FIG. 26, the preselected scope of the first roadside device is divided into a plurality of grids. After grid division is completed, a stable connection rate of each grid may be determined as a grid indicator of each grid. After grid indicators of the grids are determined, grids whose grid indicators meet the first condition in the plurality of grids may be combined, to obtain a combined grid. Then, the grid indicators of the grids obtained after a previous round of combination are determined, and grids whose grid indicators meet the first condition in existing grids are continuously combined until no grid meeting the first condition exists. FIG. 30 is an example schematic diagram of a grid combination result according to an embodiment. As shown in FIG. 30, the grids shown in FIG. 29 are finally combined to obtain a region 1 and a region 2. A stable connection rate in the region 1 is low, and a stable connection rate in the region 2 is high. It can be understood that the first roadside device has a communication capability in the region 1, but the communication capability is poor, and has a communication capability in the region 2, and the communication capability is strong.

When no grid meeting the first condition exists, that is, grid combination cannot continue, for any grid, the grid is determined as a communication region and a communication capability level of the communication region is determined based on an indicator scope within which a grid indicator of the communication region falls. The communication capability information of the first roadside device can be determined based on the location information of each communication region and the communication capability level of each communication region.

In embodiments, each indicator scope corresponds to one communication capability level, and that a communication capability level of the communication region is determined based on an indicator scope within which a grid indicator of the communication region falls includes: When the grid indicator of the communication region falls within a first indicator scope, the sensing capability level of the communication region is determined as a first sensing capability level. The first indicator scope is any one of the indicator scopes, and the first communication capability level is a communication capability level corresponding to the first indicator scope. FIG. 28 and FIG. 30 are used as examples. There are two communication regions: the region 1 and the region 2. A grid indicator of the region 1 falls within an indicator scope 1, and a grid indicator of the region 2 falls within an indicator scope 2. In this case, it may be determined that a communication capability level of the first roadside device in the region 1 is a level 1, and a communication capability level of the first roadside device in region 2 is a level 2.

In an example, that the grid indicator of the communication region falls within the first indicator scope may include: the density falls within a first scope, and/or the stable connection rate falls within a second scope. The first scope and the second scope may be set as used. This is not limited in embodiments.

In an example, the communication capability level may include: a communication dead zone, a weak communication capability, an average communication capability, and a strong communication capability. In another example, the communication capability level may include: a low level, an intermediate level, and a high level. In still another example, the communication capability level may include: a first level, a second level, a third level, a fourth level, and the like. It may be understood that the foregoing is merely an example for description of the communication capability level. A division manner and a division quantity of communication capability levels are not limited in embodiments.

In a possible implementation, the first communication capability information may indicate a communication capability of the first roadside device. For example, the first communication capability information may indicate a region in which the first roadside device can perform communication and a region in which the first roadside device cannot perform communication. For example, the first roadside device may communicate with a terminal device in a region within 200 meters, but cannot communicate with a terminal device in a region beyond 200 meters.

In a possible implementation, the first communication capability information may indicate a first region and a communication capability of the first roadside device in the first region.

The first region may represent any region. In an example, the first region may be a first region on the first road. The first region may be a rectangle, a sector, an ellipse, or another shape. A shape and an area of the first region are not limited. For example, a communication effect of the first roadside device in a region within 100 meters is good, that is, a communication capability is strong. A communication effect in a region from 100 meters to 150 meters is average, that is, a communication capability is average. A communication effect in a region from 150 meters to 200 meters is poor, that is, a communication capability is weak. Communication cannot be performed in a region beyond 200 meters, this is, a communication capability is none.

In a possible implementation, the first communication capability information may indicate a first scenario, a first region, and a communication capability of the first roadside device in the first region in the first scenario.

A "scenario" in embodiments identifies an environment in which a device having a communication function is located (for example, an environment in which the first roadside device is located), or identifies an environment in which a communication object of a device having a communication function is located (for example, an environment in which a vehicle or a pedestrian is located). The first scenario may represent any scenario. For example, the first scenario includes, but is not limited to, a scenario that affects a sensing capability, such as a day, a night, a sunny day, a cloudy day, a windy and sandy day, a rainy and snowy day, or a foggy day. It may be understood that a communication scope of the first roadside device on a sunny day is greater than a communication scope of the first roadside device on a cloudy day, a windy and sandy day, a rainy and snowy day, and a foggy day. The communication scope of the first roadside device varies based on a wind and sand size, rain and snow intensity, or a fog level. The communication scope may be small when a traffic flow is large during daytime, and the communication scope may be large when a traffic flow is small at night. Therefore, in embodiments, the communication capability of the first roadside device may be described by scenario, so that accuracy of the communication capability of the first roadside device is higher. For example, in a scenario of a sunny day, a communication capability of the first roadside device in the region 1 shown in FIG. 30 is average, and a communication capability of the first roadside device in the region 2 shown in FIG. 30 is strong. In a scenario of a foggy day, a communication capability of the first roadside device in the region 1 shown in FIG. 30 is weak, and a communication capability of the first roadside device in the region 2 shown in FIG. 30 is average.

It should be noted that when the first communication capability information indicates the first scenario, the first region, and the communication capability of the first roadside device in the first region in the first scenario, a scenario label may be added to the traffic participant data. In this way, the first communication status indication information, the second communication status indication information, and the third communication status indication information in the first scenario may be obtained. If no scenario label is added to the traffic participant data, before the traffic participant data in the first scenario is obtained, the traffic participant data in the first scenario may be obtained with reference to third-party information (for example, with reference to time information and historical weather information).

In this way, the first communication capability information of the first roadside device is obtained. In embodiments, for a manner of obtaining the communication capability information of another roadside device, refer to a manner of obtaining the first communication capability information of the first roadside device. Details are not described herein again. For example, for a manner of obtaining the second communication capability information of the second roadside device, refer to a manner of obtaining the first communication capability information of the first roadside device.

In a possible implementation, the first communication capability information of the first roadside device may be associated with a road identifier. In this way, before a route is planned or a traffic participant plans to enter a road or a road section, communication capability information of each roadside device on the road or the road section may be invoked, to determine a roadside communication capability of each region on the road or the road section, which helps improve safety.

In a possible implementation, the first communication capability information may be stored as map data. In this way, when performing intelligent driving, a vehicle may obtain the first communication capability information from a map, to determine whether a driver needs to take over the vehicle when the vehicle travels to a region, and whether confidence of information from the first roadside device needs to be reduced in a region, or whether to avoid a specific region during route planning, to improve safety. It may be understood that the first communication capability information may be associated with the first roadside device and then stored as map data. Communication capability information (for example, the second communication capability information of the second roadside device) of another roadside device may also be stored as map data, to improve safety.

The following describes an application of the communication capability information.

Considering that a communication dead zone may still exist under a plurality of roadside devices on a road due to a cause such as a block, in embodiments, an overall communication coverage capability may be formed by combining communication capability information of a plurality of roadside devices. In a possible implementation, the method further includes: generating a plurality of pieces of communication capability information of a plurality of roadside devices; and generating communication dead zone information based on the plurality of pieces of communication capability information.

The plurality of pieces of communication capability information indicate communication capabilities of the plurality of roadside devices. For example, if the plurality of roadside devices include the first roadside device, the plurality of pieces of communication capability information include the first communication capability information. In addition, the plurality of roadside devices may further include one or more second roadside devices, and the plurality of pieces of communication capability information include one or more pieces of second communication capability information.

The communication dead zone information indicates a region that is not covered by one or more roadside devices in the plurality of roadside devices. In an example, a region that is not covered by one or more roadside devices in the plurality of roadside devices includes an absolute dead zone and/or a relative dead zone. Any one of the plurality of roadside devices cannot reach a threshold T1 in the absolute dead zone, and some of the plurality of roadside devices cannot reach a threshold T2 in the relative dead zone.

The threshold T1 and the threshold T2 may be set as used. The threshold T1 and the threshold T2 are not limited. The threshold T1 and the threshold T2 may indicate an expected communication effect or an acceptable communication effect. When a roadside device cannot reach the threshold T1 or the threshold T2, it indicates that a communication effect of the roadside device does not reach the expected communication effect or is unacceptable. When a roadside device can reach the threshold T1 or the threshold T2, it indicates that a communication effect of the roadside device can reach the expected communication effect or is acceptable. In an example, the threshold T1 and the threshold T2 include, but are not limited to: meeting a preset communication capability level (for example, the corresponding communication capability level is the level 1 or the level 2), falling within a preset indicator scope (for example, the density falls within the preset indicator scope, and the stable connection rate falls within the preset indicator scope), or the like. When a roadside device does not reach the threshold T1 in a region, it indicates that a communication effect of the roadside device in the region is poor, and the reliability and accuracy of the information obtained through communication by the roadside device are low (the confidence is low and incomplete). Therefore, the region is a dead zone of the roadside device. In embodiments, the threshold T1 and the threshold T2 may be the same or may be different. This is not limited.

Figure 31:
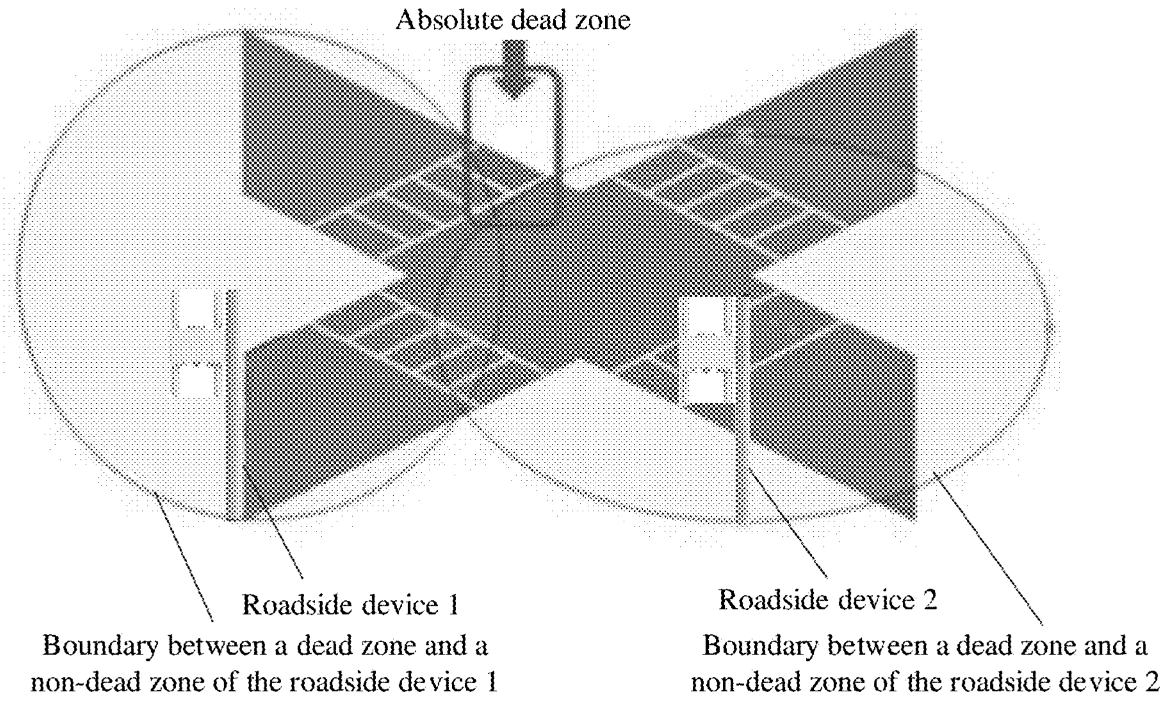
FIG. 31 is an example schematic diagram of a communication dead zone according to an embodiment.

FIG. 31 is an example schematic diagram of a communication dead zone according to an embodiment. FIG. 31 shows a boundary between a communication dead zone and a non-communication dead zone of the roadside device 1, and a boundary between a communication dead zone and a non-communication dead zone of the roadside device 2. A region within the boundary is a non-communication dead zone, and a region outside the boundary is a communication dead zone. An intersection region of the communication dead zone of the roadside device 1 and the non-communication dead zone of the roadside device 2, and an intersection region of the non-communication dead zone of the roadside device 1 and the communication dead zone of the roadside device 2 are relative communication dead zones. An intersection region of the communication dead zone of the roadside device 1 and the communication dead zone of the roadside device 2 is an absolute communication dead zone.

It is assumed that the threshold T1 is the same as the threshold T2, and a process of determining a relative communication dead zone and an absolute communication dead zone is described by using the roadside device 1 and the roadside device 2 shown in FIG. 31 as an example.

In a possible implementation, when a communication connection is established between the roadside device 1 and the roadside device 2, a communication capability of a region is a best communication capability of the roadside device 1 and the roadside device 2. For a region, if neither the communication capability of the roadside device 1 nor the communication capability of the roadside device 2 reaches the threshold T1, it may be determined that the region is an absolute communication dead zone. In this case, the relative communication dead zone may not be marked.

In a possible implementation, when no communication connection is established between the roadside device 1 and the roadside device 2, a region in which the communication capability of the roadside device 1 does not reach the threshold T1 but the communication capability of the roadside device 2 reaches the threshold T1 and a region in which the communication capability of the roadside device 2 does not reach the threshold T1 but the communication capability of the roadside device 1 reaches the threshold T1 are determined as relative communication dead zone. A region in which the communication capability of the roadside device 1 does not reach the threshold T1 and the communication capability of the roadside device 2 does not reach the threshold T1 is determined as an absolute dead zone.

In an example, different identifiers may be added for the absolute communication dead zone and the relative communication dead zone. For example, a first identifier is added to the absolute communication dead zone, and a second identifier is added to the relative communication dead zone. In this way, an absolute communication dead zone or a relative communication dead zone may be determined based on the identifier. Optionally, when the relative communication dead zone is identified, the relative communication dead zone may be further associated with the identifier of the roadside device, to determine which roadside device a relative communication dead zone belongs to.

In still another example, the communication capability information of the roadside device may be associated with a roadside device to which the roadside device establishes a communication connection. In this way, a user may determine which roadside device establishes a communication connection to the roadside device, to determine where an absolute communication dead zone is and where a relative communication dead zone is.

In a possible implementation, the method further includes: generating warning prompt information based on the first communication capability information. The warning prompt information may prompt that a driver to take over a vehicle in a second region, perform fault detection on the first roadside device, and update software of the first roadside device, or adjust deployment of the first roadside device, and reduce confidence of information from the first roadside device in the second region, or avoid the second region during route planning, where the first communication capability information indicates that the communication capability of the first roadside device in the second region is lower than a first threshold.

The first communication capability information indicates that the v capability of the first roadside device in the second region is lower than the first threshold. The first threshold can be set as used. In an example, that being lower than the first threshold may include, but is not limited to, one or more of the following: not reaching a preset communication capability level (for example, not reaching the first level of the communication capability level, or not reaching the second level of the communication capability level), that the density of the first location point does not reach a preset density threshold, and that the stable connection rate does not reach a preset stability threshold. The density threshold and the stability threshold herein may be set as used. This is not limited. Considering that the threshold T1 and the threshold T2 are used to determine a communication dead zone, the first threshold is used to perform a warning, and a warning needs to be performed in a region that is a non-communication dead zone but has a poor communication effect. In an example, the first threshold may be greater than (higher than) or equal to the threshold T1 and the threshold T2.

Because the communication capability of the first roadside device in the second region is lower than the first threshold, it indicates that the communication effect of the first roadside device in the second region is poor, and the first roadside device cannot accurately and comprehensively communicate with the terminal device in the second region. Therefore, it cannot be ensured that the first roadside device can transfer the information (including information sensed by the first roadside device and information collected from another device) obtained by the first roadside device to each terminal device in the second region. Therefore, when the vehicle performs autonomous driving in the second region, data sources may not be sufficient, a risk is high, and the driver may take over the vehicle in the second region. In addition, fault detection may be performed on the first roadside device, to check whether the poor communication effect of the first roadside device in the second region is caused by a fault of the first roadside device, such as when the second region is close to the first roadside device. Alternatively, software of the first roadside device may be updated or deployment of the first roadside device may be adjusted, so that a communication capability scope of the first roadside device is more appropriate. In addition, because the communication effect of the first roadside device in the second region is poor, the information that is about the terminal device in the second region and that is collected by the first roadside device cannot better represent an actual situation in the second region. Therefore, confidence of information obtained by the first roadside device needs to be reduced in the second region. Because the communication effect of the first roadside device in the second region is poor, the first roadside device may avoid the second region during route planning. In this way, a possibility that an accident occurs after the vehicle enters the second region can be reduced. For example, for an autonomous vehicle, a driver does not need to take over the vehicle by avoiding the second region, and this can effectively improve user experience.

Figure 8A:
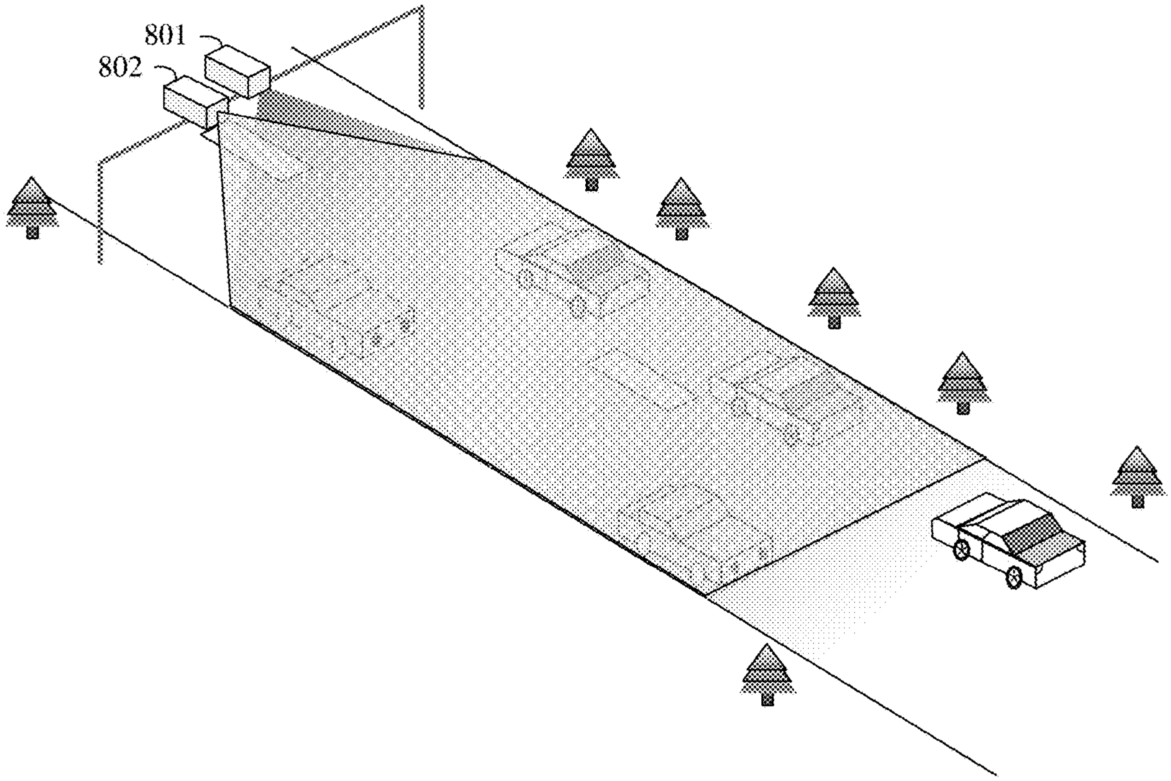
FIG. 8A is a schematic diagram of another scenario according to an embodiment.
Figure 8B:
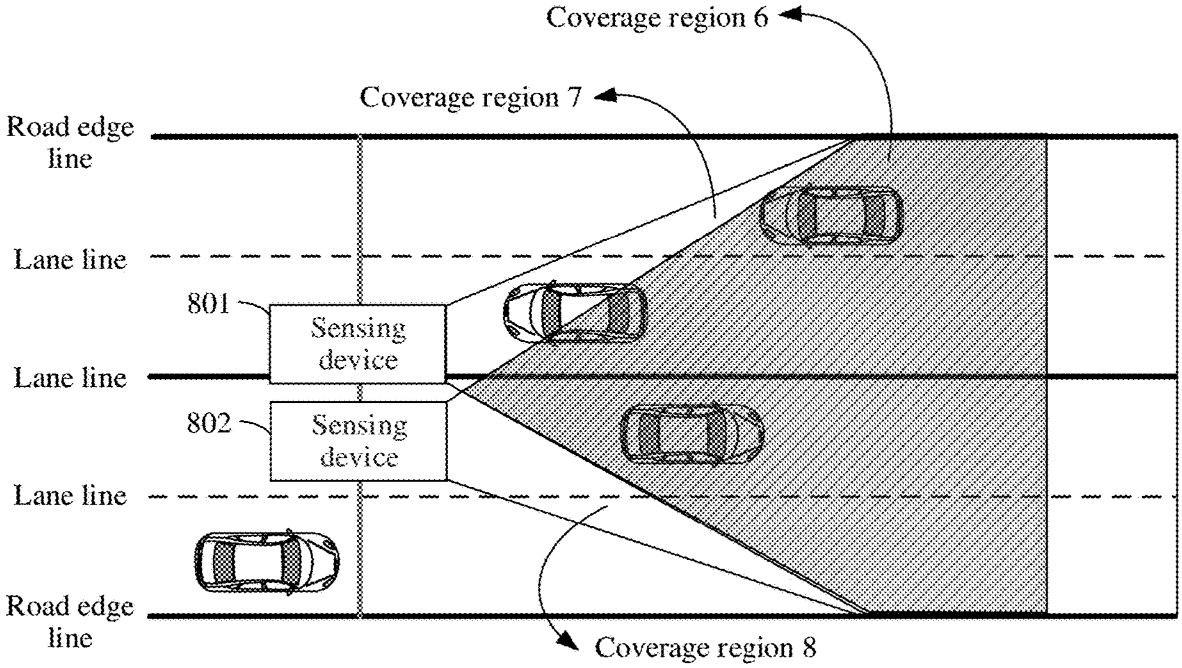
FIG. 8B is a schematic diagram of a coverage region according to an embodiment.

For example, refer to FIG. 8A and FIG. 8B. FIG. 8A is a schematic diagram of a possible scenario to which an embodiment is applicable. FIG. 8B is a schematic diagram of a possible coverage region according to an embodiment. A sensing device 801 and a sensing device 802 belong to a same sensing device group, and may sense a road condition. A sensing coverage region of the sensing device 801 and a sensing coverage region of the sensing device 802 are shown in FIG. 8B.

Table 4 is possible coverage information according to an embodiment. The coverage information shown in Table 4 is used to describe, for example, the coverage regions shown in FIG. 8A and FIG. 8B. For example, a coverage capability corresponding to a sensing device group 1 is obtained by combining coverage capabilities of a sensing device 1 and a sensing device 2. A coverage region of the sensing device group 1 is obtained based on a combined coverage capability. Optionally, when the sensing device group 1 includes a plurality of coverage regions, and the plurality of coverage regions are classified by level based on the combined coverage capability.

TABLE 4

| Coverage information | | |
|---|---|---|
| Sensor ID or sensor group ID | Coverage capability and corresponding coverage region | Fusion sensing or not |
| Sensing device group 1 | {Coverage capability: accuracy rate > 95% and recall rate > 90%; and coverage region: coverage region 6} | Yes |

Optionally, the coverage region in the coverage information may be obtained by combining coverage regions of a plurality of devices. Further, optionally, the coverage capability information in the coverage information may also be obtained by combining coverage capabilities of a plurality of devices. For example, the coverage region 6 of the sensing device group 1 is used as an example. The coverage region 6 may be obtained by combining a coverage region 7 of the sensing device 1 and a coverage region 8 of the sensing device 2. The fusion may be understood as that the coverage region 6 is obtained based on an overlapping part of the coverage region 7 and the coverage region 8. Also, in some specific implementations, fusion may further be performed through fitting, a reinforcement learning model, a deep learning model, or a preset calculation manner. This is also applicable to the foregoing method for fusing a sensing region. The coverage capability information of the coverage region 6 of the sensing device group 1 may be determined based on the coverage capability information of the sensing device 1 and the coverage capability information of the sensing device 2. For example, the coverage capability of the sensing device group 1 in the coverage region 6 is obtained by fusing coverage capabilities of the sensing device 1 and the sensing device 2. The fusion of the coverage capability information may also be performed through fitting, a reinforcement learning model, a deep learning model, or a preset calculation manner. This is also applicable to the foregoing plurality of fusion manners.

In still another possible implementation, when the coverage information includes a plurality of coverage regions, there may be an overlapping region between the plurality of coverage regions. Optionally, the coverage information further includes information about a plurality of pieces of coverage capabilities corresponding to the plurality of coverage regions. For example, as shown in FIG. 8B, there may be an overlapping region between the coverage region 7 of the sensing device 801 and the coverage region 8 of the sensing device 802. For ease of description, refer to Table 5. Table 5 is other possible coverage information according to an embodiment. The coverage information shown in Table 5 is used to describe, for example, the coverage regions shown in FIG. 8A and FIG. 8B. The coverage information shown in Table 5 may include information about the coverage region 7 of the sensing device 801 and coverage capability information corresponding to the coverage region 7 (for example, the corresponding coverage capability information may be that a sensing result accuracy rate is greater than 98% and a recall rate is greater than 94%), and may further include the coverage region 8 of the sensing device 802 and coverage capability information corresponding to the coverage region 8 (for example, the corresponding coverage capability information may be that a sensing result accuracy rate is greater than 95% and a recall rate is greater than 90%).

TABLE 5

| Coverage information | | |
|---|---|---|
| Sensor ID or sensor group ID | Coverage capability and corresponding coverage region | Fusion sensing or not |
| Sensing device 801 | {Coverage capability: accuracy rate > 98% and recall rate > 94%; and coverage region: coverage region 7} | No |

TABLE 5-continued

| Coverage information | | |
|---|---|---|
| Sensor ID or sensor group ID | Coverage capability and corresponding coverage region | Fusion sensing or not |
| Sensing device 802 | {Coverage capability: accuracy rate > 95% and recall rate > 90%; and coverage region: coverage region 8} | No |

It should be understood that there may alternatively be no overlapping region between the plurality of coverage regions, and this is still applicable to a case in which there is no overlapping region between the plurality of coverage regions.

Figure 9:
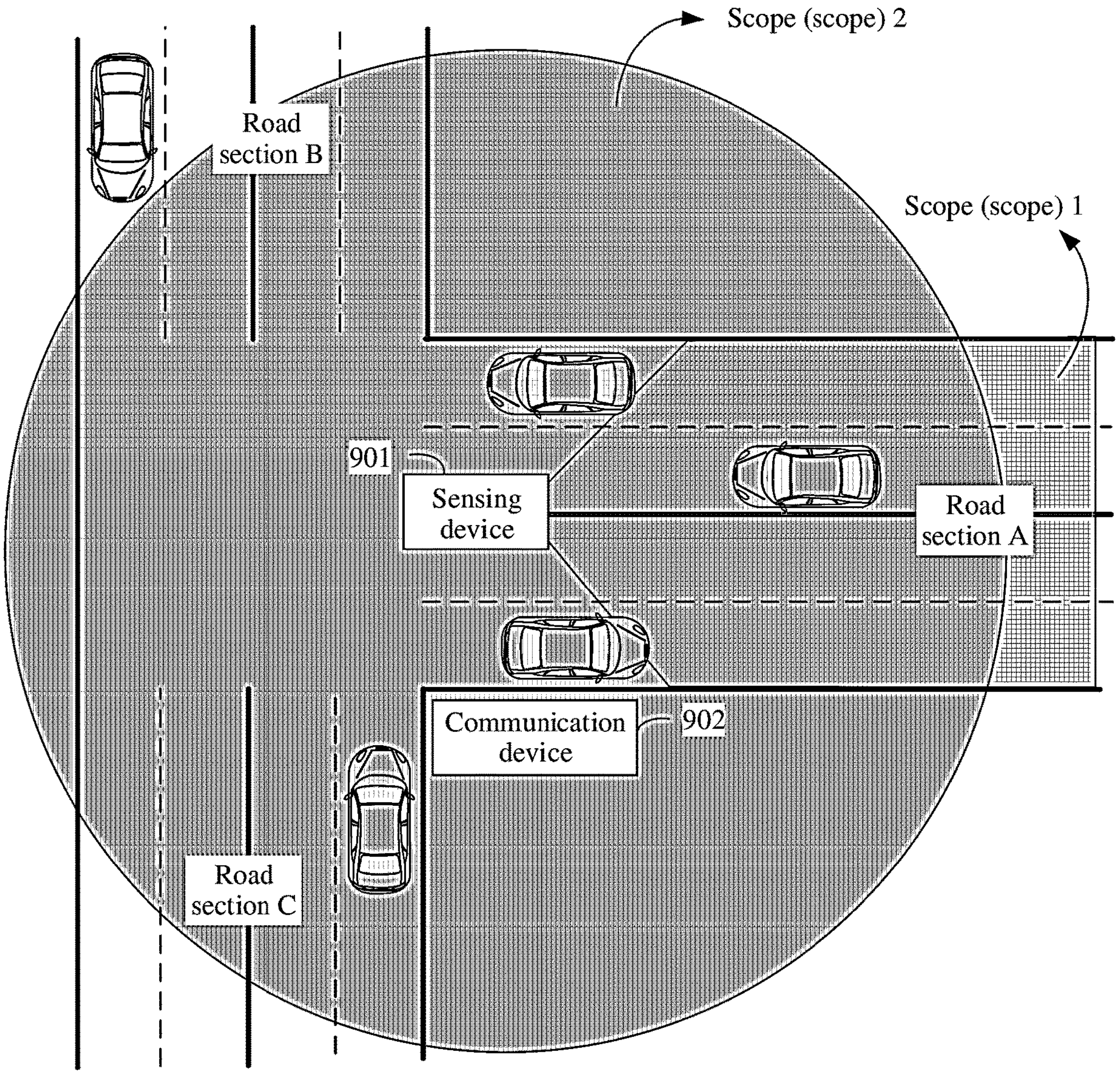
FIG. 9 is a schematic diagram of a dead zone according to an embodiment.

Optionally, the coverage information may further include information about a dead zone, where the dead zone may include at least one of a communication dead zone, a sensing dead zone, or the like. It should be understood that the coverage region in the coverage information may be obtained through division based on different levels of coverage capabilities. Therefore, the dead zone may also correspond to different dead zone levels. For example, a region in which a sensing result accuracy rate is lower than 40% is used as a first level sensing dead zone, and a region in which a sensing result accuracy rate is lower than 10% is used as a second level sensing dead zone. Optionally, the communication dead zone and the sensing dead zone may be independent of each other, or processing such as obtaining an intersection may be performed. For example, refer to FIG. 9. FIG. 9 is a schematic diagram of a possible dead zone according to an embodiment. A scope 1 is a coverage region of a sensing device 901, and a scope 2 is a coverage region corresponding to a communication capability of a communication device 902. A road section A is in the two coverage regions, and a road section B and a road section C are sensing dead zones, but are not completely communication dead zones. Therefore, a vehicle or another apparatus located in the road section B and the road section C can still receive sensing result from the sensing device 901.

Optionally, the coverage capability information of the roadside device in the at least one coverage region indicates a plurality of capabilities in a plurality of environments. For example, in different weather environments such as a sunny day, a rainy day, and a foggy day, the coverage capability information may be different. For another example, the coverage capability information of the roadside device may be different at different moments such as day and night or under different temperature, humidity, and luminance conditions.

In a possible implementation, the coverage information may include information that indicates an applicable scenario. For example, as shown in Table 6, the coverage information includes an applicable scenario field, and the field indicates a coverage capability of a sensing device 3 in different environments. When the coverage information is subsequently used, a scenario factor may be appropriately considered, to improve accuracy of the coverage scope of the coverage capability and improve reliability.

TABLE 6

| Coverage information | |
|---|---|
| Sensor ID | Coverage capability and corresponding coverage region |
| Sensing device 3 | {Coverage capability: accuracy rate ≥ 90%; coverage region: (description of the coverage region); and applicable scenario: sunny day} |
| Sensing device 3 | {Coverage capability: accuracy rate ≥ 90%; coverage region: (description of the coverage region); and applicable scenario: rainy day} |
| Sensing device 3 | {Coverage capability: accuracy rate ≥ 75%; coverage region: (description of the coverage region); and applicable scenario: sunny day} |
| Sensing device 3 | {Coverage capability: accuracy rate ≥ 75%; coverage region: (description of the coverage region); and applicable scenario: rainy day} |

It should be understood that Table 6 uses an applicable scenario as an example for description. During specific implementation, the coverage information may alternatively include one or more of a season, a time period, weather, temperature, humidity, luminance, or the like.

Optionally, the coverage information may further include one or more of an identifier of a roadside device, a tile identifier (ID), and the like. The tile is a component of a tile map. In a possible implementation, when the coverage information is map data, the coverage information may include the tile ID.

A tile ID can be used to associate coverage information with a tile. This facilitates map updating based on the coverage information, and facilitates the storage and management of the coverage information.

Step S402: The data processing apparatus stores the coverage information as map data.

The data processing apparatus may directly store the obtained coverage information, or may store the obtained coverage information after processing the coverage information. The processed coverage information better meets a storage requirement of the map data. A form of the processed coverage information may be different from that of the obtained coverage information, but indicated content of the processed coverage information and indicated content of the obtained coverage information are consistent.

Figure 11:
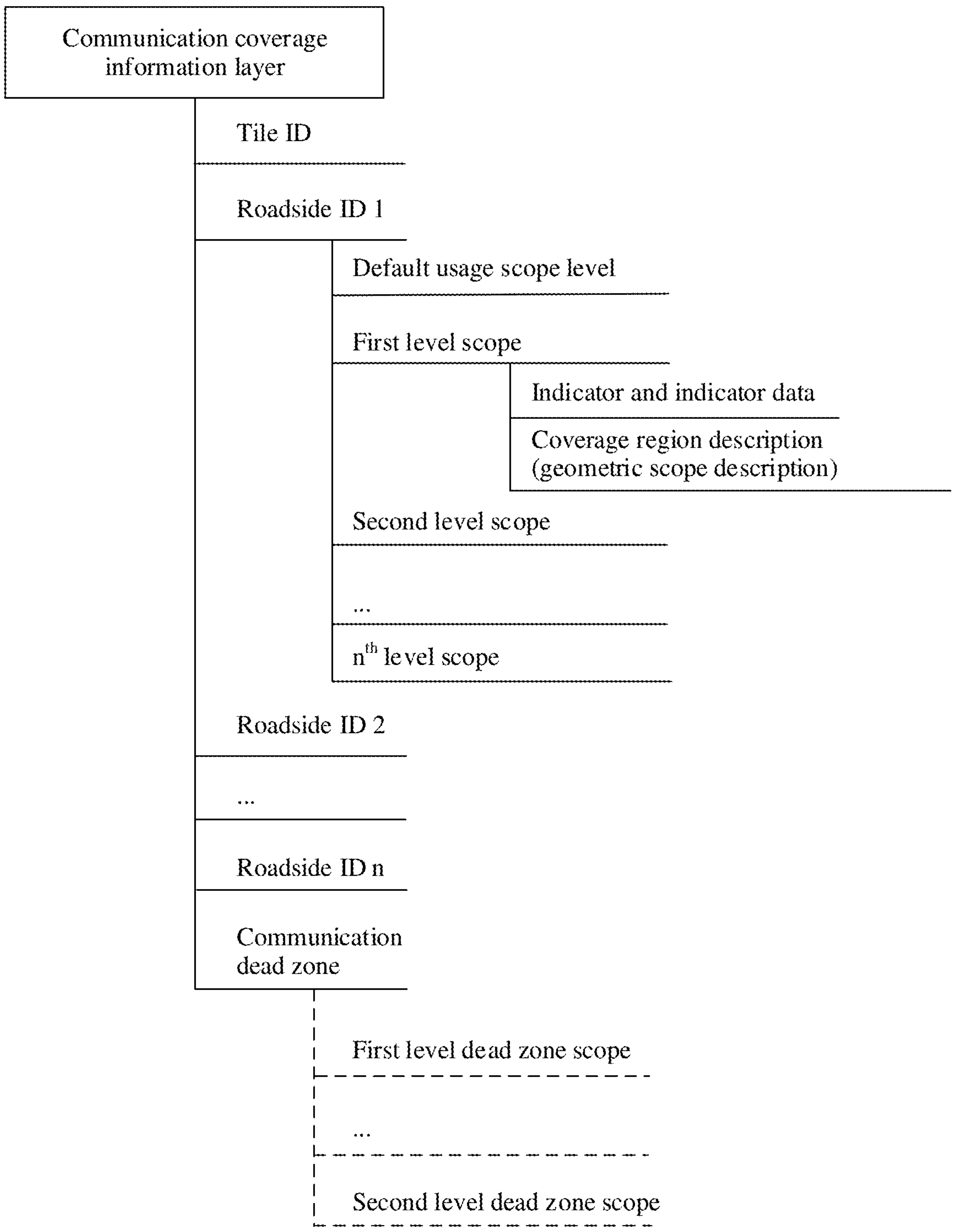
FIG. 11 is a schematic diagram of a data structure of coverage information according to an embodiment.

The storing the coverage information as map data means that the coverage information is stored in a storage medium of a cloud, a roadside, or a terminal in a compilation form or a storage format of other information in the map as information carried in the map. For example, refer to FIG. 11. FIG. 11 is a schematic diagram of a possible data structure in which coverage information is used as map data according to an embodiment. A tile ID identifies a map tile, and a roadside ID identifies a roadside device. A communication coverage scope is used as an example. A lower layer of each roadside ID includes information about a communication coverage scope corresponding to the roadside ID, and may include a default usage scope level and a coverage region of at least one level. The default usage scope level indicates a coverage region corresponding to a coverage capability of a level that is displayed by default. Levels (such as a first level scope, a second level scope, and a third level scope) indicate different coverage capabilities. A lower layer of the scope level may include a coverage region, and optionally further includes content (that is, an indicator in the figure) indicated by the level.

Figure 12:
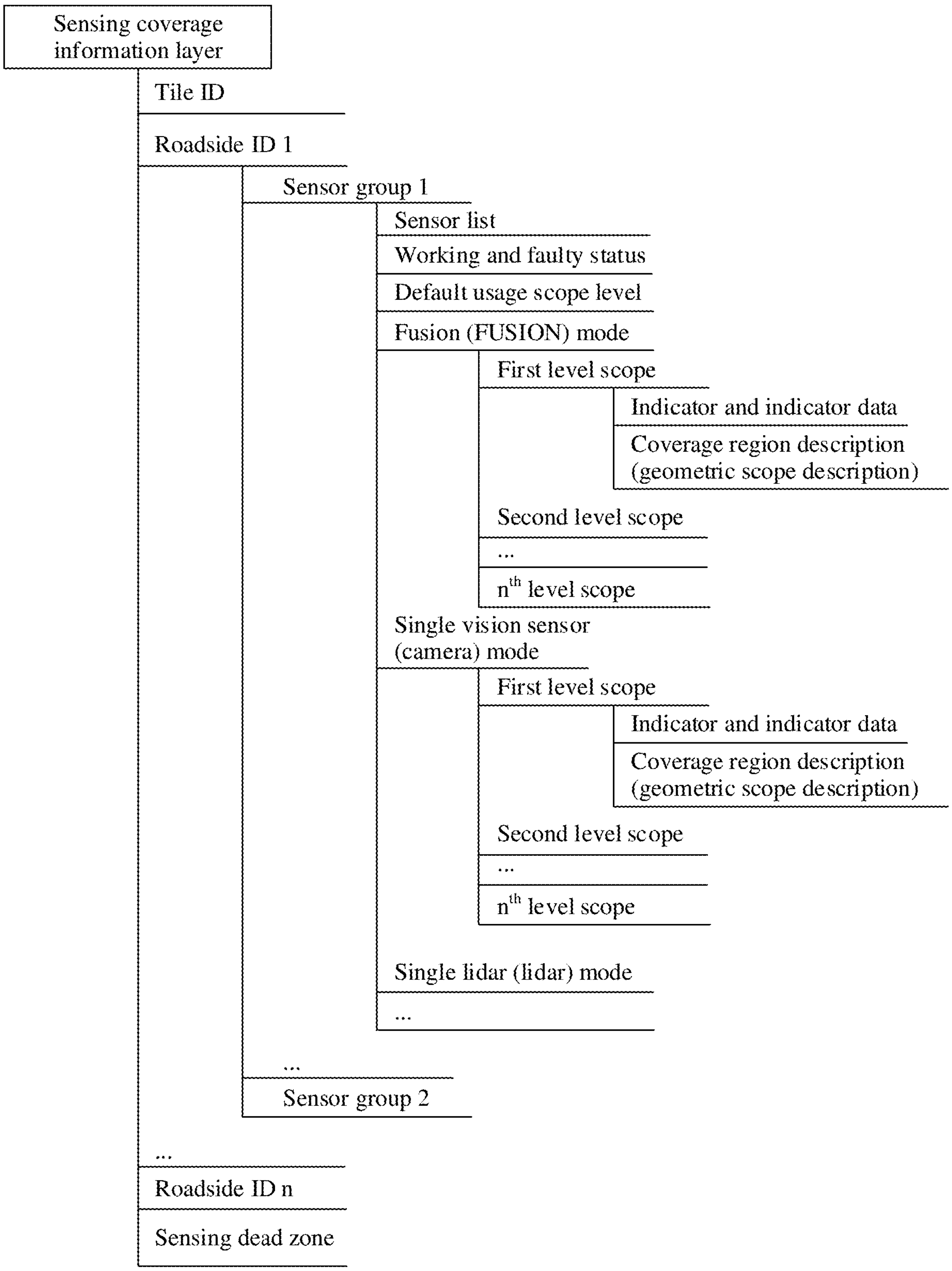
FIG. 12 is a schematic diagram of another data structure of coverage information according to an embodiment.

Optionally, in the data structure shown in FIG. 11, a lower layer of the scope level may include an indicator (or content or an indicator item) indicated by the level and a value (or a value range) corresponding to the indicator, for example, "indicator: accuracy rate, value range: ≥90". The data structure shown in FIG. 11 is merely an example. When the roadside device includes a plurality of sensing devices or a plurality of communication devices, a lower layer of the ID of the roadside device may include IDs of the plurality of sensing devices (or of sensing device groups) or IDs of the plurality of communication devices (or of communication device groups). For example, refer to FIG. 12. FIG. 12 is a schematic diagram of another structure of coverage information according to an embodiment. A lower layer of each roadside ID includes a sensor (or referred to as a sensing device) ID, a sensor group ID, or the like. For example, in the data structure shown in FIG. 12, a lower layer of the roadside device ID may include an identifier of a sensor group, and an identifier of a sensor. A lower layer of the identifier of the sensor group includes one or more of a sensor list of the sensor group, a working status of each sensor in the sensor list (for example, a normal working state, failure, or another working state), a default usage scope level, and a working mode (including a fusion mode and a single sensor mode). The default usage scope level indicates a coverage region corresponding to a coverage capability of a level that is displayed by default. Levels (such as a first level scope, a second level scope, and a third level scope) indicate different coverage capabilities. A lower layer of the scope level may include a coverage region, and optionally further includes content (that is, an indicator in the figure) indicated by the level. A lower layer of the identifier of the sensor group includes a working status of a sensor, a fault status, whether the default scope level is used, whether the sensor is in a fusion mode, and the like. A fusion sensor that includes a lidar and a visual sensor (camera, or referred to as a camera machine, an image sensor, or a video camera) in the sensor group is used as an example. The data structure of the coverage information may include a sensing region and a coverage capability that are obtained by fusion, may also include a sensing region and a coverage capability that are of a single lidar, and may also include a sensing region and a coverage capability that are of a single vision sensor.

Figure 10A:
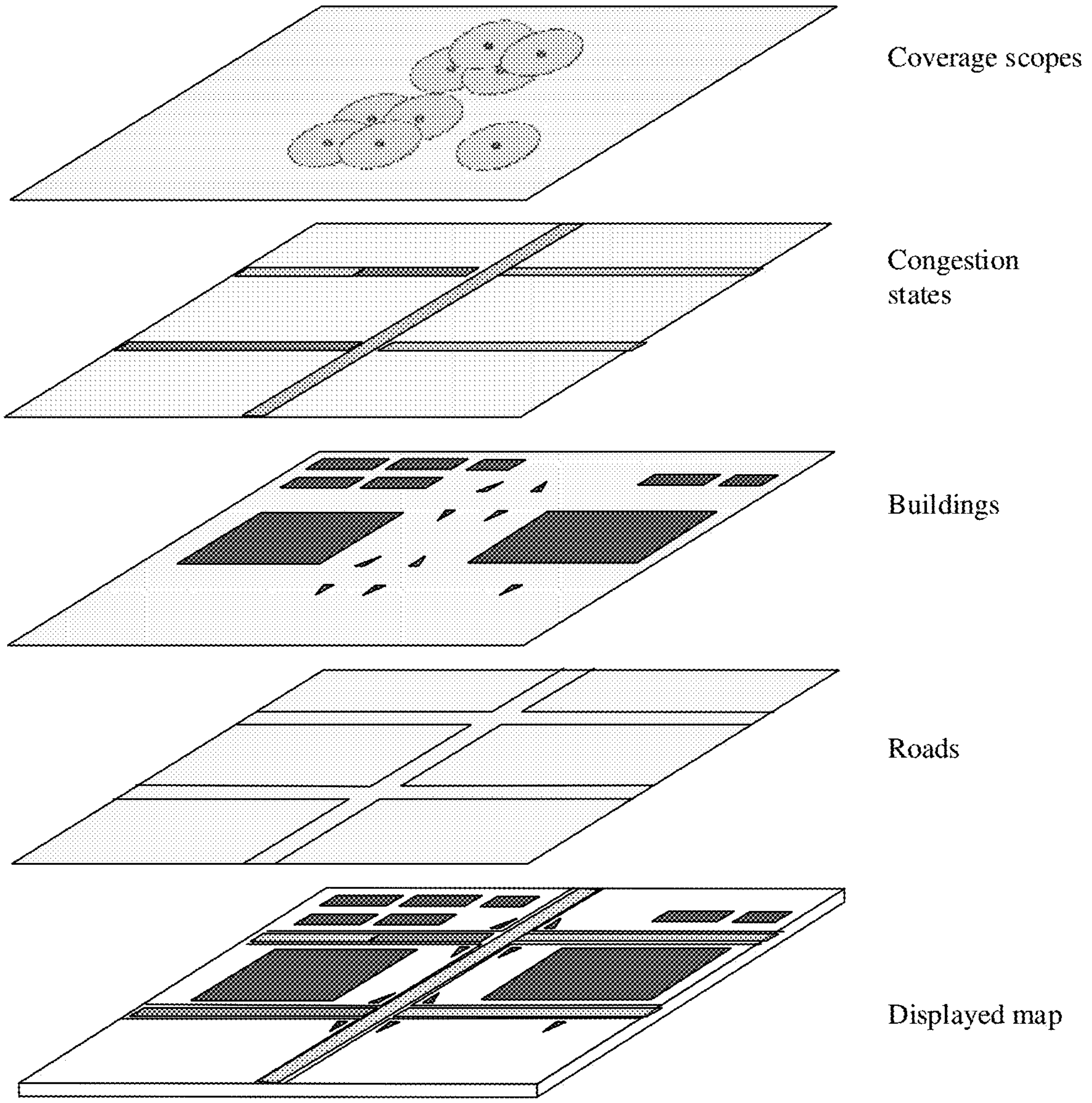
FIG. 10A is a schematic diagram of a map layer according to an embodiment.

In a possible implementation, the data processing apparatus may generate a first layer based on the coverage capability, where the first layer belongs to the foregoing map. For example, refer to FIG. 10A, FIG. 10A is a schematic diagram of a possible map layer according to an embodiment. A map shown in FIG. 10A may include layers (only an example) such as a coverage scope layer, a road layer, a building layer, and a congestion state layer.

Figure 10B:
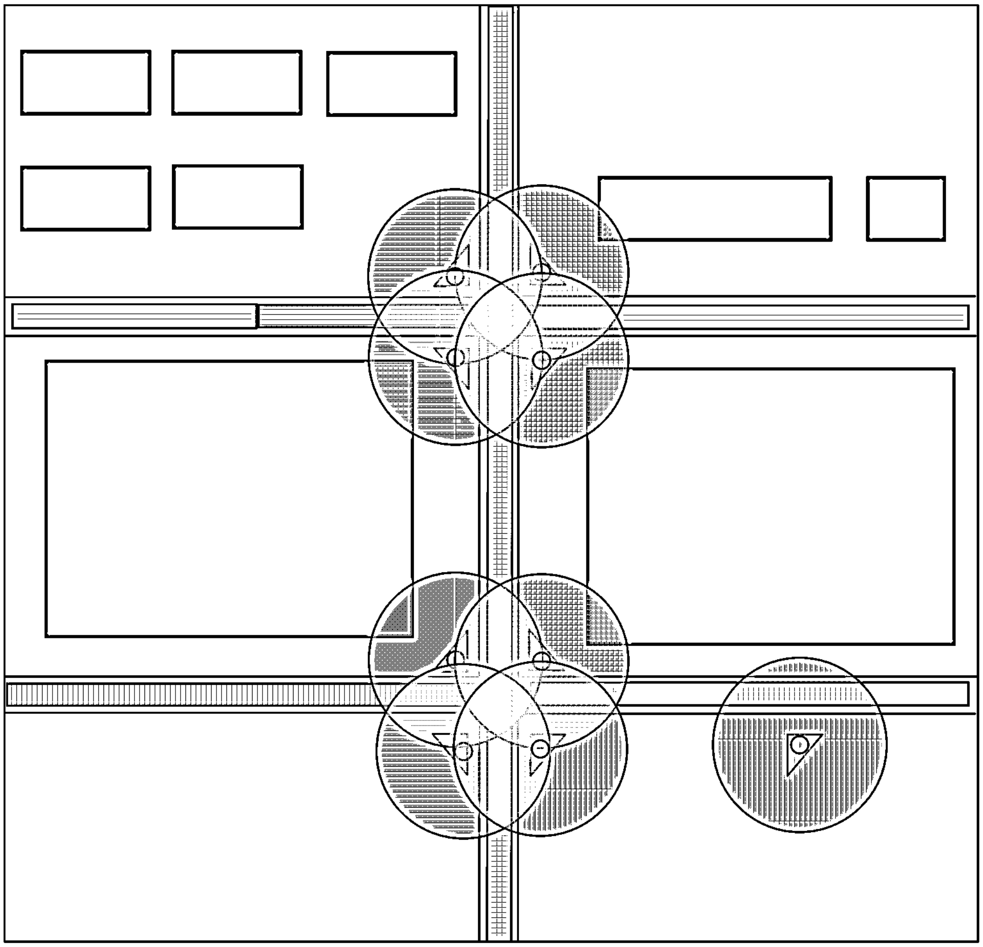
FIG. 10B is a schematic diagram of a map according to an embodiment.

The coverage information may be displayed on a display interface. For example, the map layer of the coverage information may be separately displayed, or may be displayed on the map display interface together with another map layer in a superimposed manner. For example, refer to FIG. 10B. FIG. 10B is a schematic diagram of a possible map according to an embodiment. A map shown in FIG. 10B may be obtained by superimposing a coverage scope layer, a congestion state layer, a road layer, and a building layer for display.

It should be understood that the data processing apparatus may further update the coverage scope layer in the map based on the coverage information. The updating the map includes one or more of adding a coverage region, reducing a coverage region, modifying a coverage region, modifying capability information, and the like. For example, a coverage region in a different environment is selected for display based on an environment change, or display of a coverage region of a faulty roadside device is stopped when the roadside device is faulty. In an implementation, the data processing apparatus may receive update indication information, to update the map.

In still another possible implementation, the data processing apparatus may determine, based on the coverage information, a data structure corresponding to the map. Subsequently, the data processing apparatus may update the map based on the data structure corresponding to the map.

Optionally, the data structure in FIG. 11 or FIG. 12 may include a dead zone.

Alternatively, the dead zone may include different levels. For details, refer to the foregoing description. Details are not described herein again.

In a possible implementation, as a map generation apparatus, the data processing apparatus may send the map to another apparatus (a vehicle, a roadside device, a driver assistance server, or the like) after generating or updating the map that includes the coverage information.

The data processing apparatus may further perform information processing by using the coverage information. For example, the data processing apparatus determines one or more of a safety level of the vehicle, a driving policy of the vehicle, and the like based on the coverage capability.

For example, the following two possible implementations s are used in this embodiment:

In Design 1, the data processing apparatus determines the safety level of the vehicle based on the coverage capability. The safety level of the vehicle may be used to determine a weight used by an autonomous driving apparatus of the vehicle to participate in a vehicle operation. Table 7 is a possible safety level table of a vehicle according to this embodiment. It can be understood that, when the vehicle is located in a region corresponding to a first level scope, the safety level is level 1. In this case, the data processing apparatus may cope with a driving scenario based on a sensing result or communication data of a roadside device, and may not require a driver. For other safety levels, see the description.

TABLE 7

| Safety level of a vehicle | | |
|---|---|---|
| Coverage capability | Safety level | Description |
| First level scope | Level 1 | Cope with a driving scenario based on a sensing result or communication data, and a driver may not be required |
| Second level scope | Level 2 | Drive based on a sensing result or communication data, and a driver remains alert to take over the driving |
| Third level scope | Level 3 | Driver assistance is provided based on a sensing result, and a driving operation is taken over by a driver |
| Fourth level scope | Level 4 | A driver drives |

In Design 2, the data processing apparatus determines the driving policy of the vehicle based on the coverage capability. The driving policy may include one or more of a safety level, confidence of a sensing result, whether a driver needs to take over a vehicle, whether autonomous driving (or assisted driving) needs to be started, and the like. For example, the coverage capability corresponds to a first coverage region, and the vehicle may determine the coverage capability of the current roadside device based on whether the vehicle is in the first coverage region, and further adjust the driving policy.

For example, in response to a fact that a first vehicle is located in the first coverage region, the safety level of the first vehicle is determined as a high safety level. Alternatively, in response to a fact that a first vehicle is located in the first coverage region, confidence of a sensing result of the roadside device is improved. Alternatively, in response to a fact that a first vehicle is located in the first coverage region, a first reminder message is triggered, where the first reminder message is used to remind the user to enable the autonomous driving function of the first vehicle or enable the assisted driving function of the first vehicle. Alternatively, in response to a fact that a first vehicle leaves the first coverage region, a second reminder message is triggered, where the second reminder message is used to remind the user to take over the first vehicle.

This embodiment uses a possible implementation as an example. As shown in FIG. 7, that the data processing apparatus is included in the vehicle 702 is used as an example. When the vehicle 702 is located in the sensing coverage region in which the accuracy rate is 90%, a safety level of the vehicle can be improved. Similarly, when the vehicle 702 is located in the sensing coverage region in which the accuracy rate is 90%, confidence in a sensing result of the roadside device may be improved. Similarly, when the vehicle is located in the sensing coverage region in which the accuracy rate is 90%, the first reminder message may be triggered. The first reminder message is used to remind the user to enable the autonomous driving function of the first vehicle or enable the assisted driving function of the first vehicle.

Optionally, when the vehicle leaves the sensing coverage region in which the accuracy rate is 90%, the second reminder message may be triggered. The second reminder message is used to remind the user to take over the first vehicle. It can be understood that, when the vehicle is located in the sensing coverage region in which the accuracy rate is 90%, the sensing result of the roadside device on the vehicle 702 and the environment around the vehicle 702 is accurate. In this case, confidence of the sensing result is improved, so that a more reliable driving operation can be determined based on the sensing result, to improve safety.

In a possible implementation, the data processing apparatus may obtain a dead zone based on the coverage information, to control an action of the vehicle. For example, refer to FIG. 9. FIG. 9 is a schematic diagram of a possible dead zone scope according to an embodiment. When a vehicle is located in a communication dead zone of the communication device 902, a communication connection to the communication device 902 may be actively cut off, to prevent unstable connections from occupying communication and processing resources of the vehicle. When the vehicle is located in a sensing dead zone of the sensing device 901, or a detection result used by the vehicle is located in the sensing dead zone of the sensing device 901, confidence of a sensing result of the sensing device 901 may be reduced, or the sensing result from the sensing device 901 may not be used.

In this embodiment, content of the coverage information is designed, so that a use requirement for a coverage scope of a roadside device is met. Subsequently, when using a service provided by the roadside device, a vehicle or a service provider may determine a coverage region of the roadside device and a coverage capability in the region based on the coverage information, to obtain reliability, robustness, and the like of the service provided by the roadside device. For example, based on the coverage information, confidence of a sensing result of the roadside device in a region may be more accurately obtained, or an indicator such as robustness of a communication connection to the roadside device in a region may be obtained, to improve reliability of autonomous driving or assisted driving.

Figure 13:
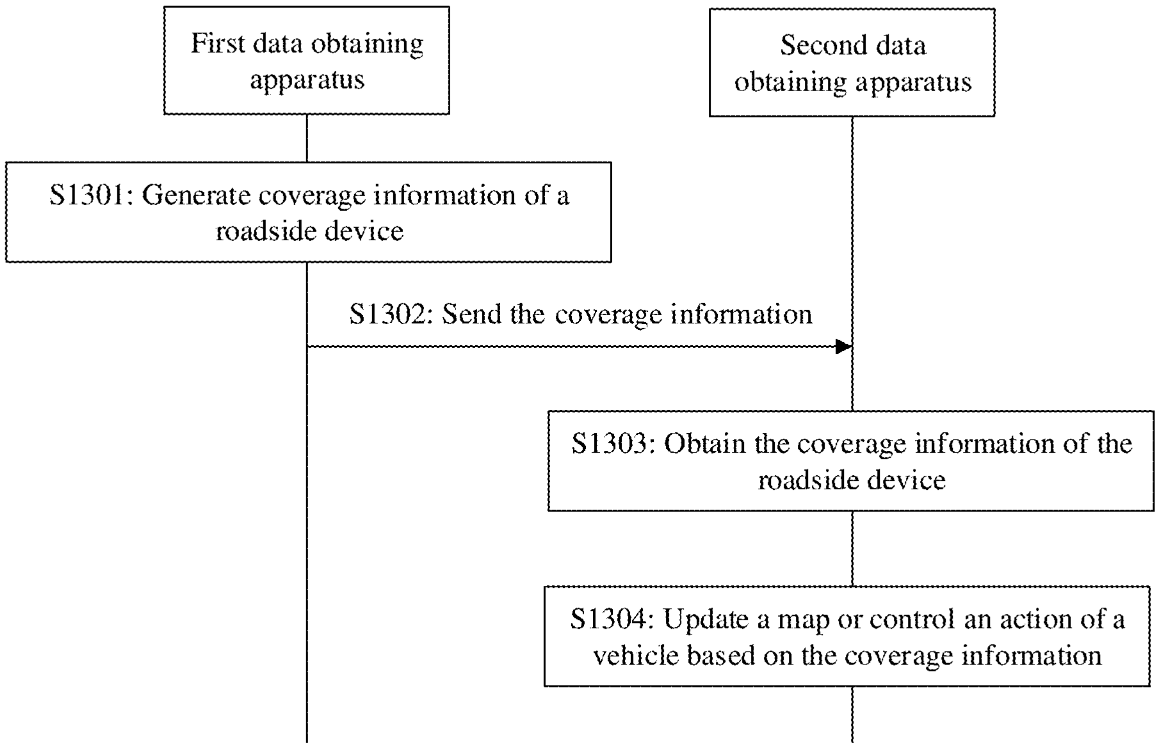
FIG. 13 is a schematic flowchart of another data processing method according to an embodiment.

FIG. 13 is a schematic flowchart of another data processing method according to an embodiment. Optionally, the data processing method shown in FIG. 13 may be applied to the scenario shown in FIG. 1. The data processing method may include at least the following steps. Step S1301: A first data processing apparatus generates coverage information of a roadside device.

The first data processing apparatus may be a terminal device (for example, a roadside device or a vehicle) or may be a network side device (for example, a server or a cloud).

Optionally, a parameter used to generate the coverage information of the roadside device may alternatively be reported by the roadside device, or may be collected by the first data processing apparatus, or may be obtained by the first data processing apparatus through calculation based on a sensing result and a communication result of the roadside device.

The coverage information may also be referred to as coverage data, and includes a coverage region of the roadside device, coverage capability information of the roadside device in the coverage region, and the like. The coverage region of the roadside device is within a coverage scope of the roadside device. The coverage capability is a coverage capability of the roadside device in the coverage region, and the coverage capability may be described by using coverage capability information. For detailed description of the coverage information, the coverage region, and the coverage capability, refer to related description in step S401. Details are not described herein again.

The coverage capability may indicate different indicators, or may be referred to as content. In a possible implementation, the coverage capability is a coverage capability of the roadside device in a communication coverage region, and the coverage capability information may indicate at least one of the following content (or indicators): a data accuracy rate, a packet loss rate, a communication delay, communication stability, or signal strength. In still another possible implementation, the coverage capability is a coverage capability of the roadside device in a sensing coverage region, and the coverage capability information indicates at least one of the following content (or indicators): a sensing result accuracy rate, a false detection rate, a missing detection rate, a recall rate, sensing precision, sensing average precision, detection stability, or detection location precision. For detailed description of the content (indicators), refer to the related description in step S401. Details are not described herein again.

There may be one or more coverage regions included in the coverage information.

Correspondingly, there may also be one or more pieces of coverage capability information. Optionally, when a plurality of sensing coverage regions are included, the plurality of sensing coverage regions may be classified based on levels of sensing capabilities. Similarly, when a plurality of communication coverage regions are included, the plurality of communication coverage regions may be classified based on levels of communication capabilities.

Optionally, when the coverage information includes a plurality of coverage regions, there may be an overlapping region between the plurality of coverage regions.

Optionally, the roadside device may include one or more sensing devices, or may be connected to one or more sensing devices. The sensing capability of the roadside device may be implemented by using a sensing device. Further, optionally, the sensing devices may be combined, and one or more sensing devices may form a sensing device group.

Further, optionally, when the roadside device includes a plurality of sensing devices (or is connected to a plurality of sensing devices), a sensing coverage region in the coverage information may correspond to a sensing device or a sensing device group. In a possible implementation, the sensing coverage region corresponding to the sensing device group and the coverage capability in the sensing coverage region are determined based on coverage capabilities of sensing devices in the sensing device group. For example, the coverage region in the coverage information may be obtained by combining coverage regions of a plurality of single devices.

Optionally, the coverage information may further include information about a dead zone, where the dead zone may include at least one of a communication dead zone, a sensing dead zone, or the like.

Optionally, the coverage capability information of the roadside device in the at least one coverage region indicates a plurality of capabilities in a plurality of environments.

Optionally, the coverage information may further include one or more of an identifier of a roadside device, a tile ID, and the like.

For detailed description of related concepts in step S1301, refer to related description in step S401. Details are not described herein again.

Step S1302: The first data processing apparatus sends the coverage information.

For example, the first data processing apparatus may communicate with another apparatus by using a wired link, a wireless link, or a wired and wireless combined link, to send the coverage information to the another apparatus. Optionally, a data link for sending and receiving information between the first data processing apparatus and another apparatus may include various types of connection media, and may be a wired link (like an optical fiber), a wireless link, a combination of a wired link and a wireless link, or the like. For example, a connection technology may include 802.11b/g, Bluetooth, Zigbee, a vehicle-mounted short-range wireless communication technology, a global system for mobile communications (GSM), a general packet radio service (GPRS), a universal mobile telecommunications system (UMTS), an ultra-wideband (UWB) technology, and a vehicle-mounted wireless transmission technology. Further, there may be another technology that may be used to support communication between the first data processing apparatus and another apparatus.

Step S1303: A second data processing apparatus obtains the coverage information of the roadside device.

It may be understood that the first data processing apparatus may send the coverage information of the roadside device to the second data processing apparatus. Correspondingly, the second data processing apparatus receives the coverage information of the roadside device from the first data processing apparatus.

The second data processing apparatus may be a terminal device (for example, a roadside device or a vehicle) or may be a network side device (for example, a server or a cloud).

For example, refer to FIG. 7. The first data processing apparatus may be the roadside device 701, and the second data processing apparatus may be the vehicle 702 (or the cloud 703). The roadside apparatus may generate coverage information based on a coverage capability of the roadside apparatus, and may further send the coverage information to the vehicle 702 (or the cloud 703). Correspondingly, the vehicle 702 (or the cloud 703) obtains the coverage information.

For another example, the first data processing apparatus may be the cloud 703, and the second data processing apparatus may be the vehicle 702 (the roadside device 701). The first data processing apparatus may send the coverage information to the vehicle 702 (the roadside device 701). Correspondingly, the vehicle 702 (the roadside device 701) may receive the coverage information sent by the cloud 703. Optionally, the coverage information may include coverage information of the roadside device 701, and optionally, may further include coverage information of another roadside device (not shown in FIG. 7).

Step S1304: The second data processing apparatus updates a map or controls an action of a vehicle based on the coverage information, that is, generates a control signal used to control the vehicle.

For details, refer to related description in step S402. Details are not described herein again.

An embodiment further provides coverage data. The coverage data is used to describe a coverage scope of a roadside device. For example, the coverage data includes a coverage region, a coverage capability of the roadside device in the coverage region, and the like. The coverage region of the roadside device is within the coverage scope of the roadside device, and may include a sensing coverage region, a communication coverage region, or the like. The coverage capability can be a coverage capability of the roadside device in the coverage region, and the coverage capability may be described by using coverage capability information. The coverage capability may indicate different indicators, or may be referred to as content.

In a possible implementation, the coverage capability is a coverage capability of the roadside device in a communication coverage region, and the coverage capability information may indicate at least one of the following content (or indicators): a data accuracy rate, a packet loss rate, a communication delay, communication stability, or signal strength.

In still another possible implementation, the coverage capability is a coverage capability of the roadside device in a sensing coverage region, and the coverage capability information indicates at least one of the following content (or indicators): a sensing result accuracy rate, a false detection rate, a missing detection rate, a recall rate, sensing precision, sensing average precision (AP), detection stability, or detection location precision.

There may be one or more coverage regions included in the coverage information.

Correspondingly, there may also be one or more pieces of coverage capability information. Optionally, when a plurality of sensing coverage regions are included, the plurality of sensing coverage regions may be classified based on levels of sensing capabilities. Similarly, when a plurality of communication coverage regions are included, the plurality of communication coverage regions may be classified based on levels of communication capabilities.

Further, optionally, when the roadside device includes a plurality of sensing devices (or is connected to a plurality of sensing devices), a sensing coverage region in the coverage information may correspond to a sensing device or a sensing device group. In a possible implementation, the sensing coverage region corresponding to the sensing device group and the coverage capability in the sensing coverage region are determined based on coverage capabilities of sensing devices in the sensing device group. For example, the coverage region in the coverage information may be obtained by combining coverage regions of a plurality of single devices.

Optionally, the coverage information may further include one or more of an identifier of a roadside device, a tile ID, information about a dead zone, a roadside device ID, and the like. The dead zone may include at least one of a communication dead zone, a sensing dead zone, and the like.

Optionally, coverage data may be represented at a plurality of levels.

In a possible case of communication coverage data, a first level is a roadside device ID, and a lower level (which is referred to as a second level for ease of description) of the roadside device ID includes a plurality of scope levels. A lower level (which is referred to as a third level for ease of description) of each scope level includes coverage capability information and a coverage region (or coverage region indication information). For example, a structure of the communication coverage data may be shown in FIG. 11.

In a possible case of sensing coverage data, a first level is a roadside device ID, and a lower level (which is referred to as a second level for ease of description) of the roadside device ID includes a sensing device ID or a sensing device group ID. A lower level of the sensing device ID (or sensing device group ID) (which is referred to as a third level for ease of description) includes a plurality of scope levels. A lower level (which is referred to as a fourth level for ease of description) of the scope level includes coverage capability information and a coverage region (or coverage region indication information). For example, a structure of the communication coverage data may be shown in FIG. 12.

The methods and the coverage data in embodiments are described above in detail, and apparatuses in embodiments are provided below.

Figure 14:
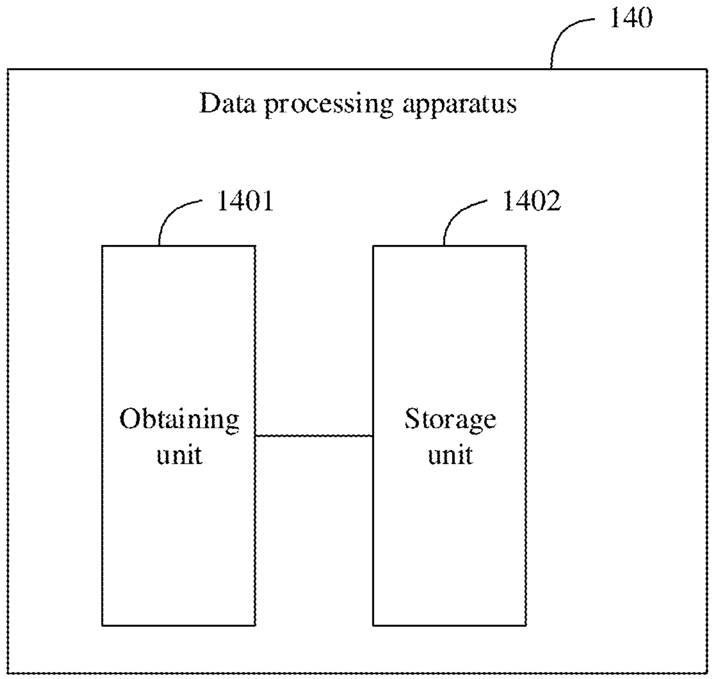
FIG. 14 is a schematic diagram of a structure of a data processing apparatus according to an embodiment.

FIG. 14 is a schematic diagram of a structure of a data processing apparatus 140 (referred to as an apparatus 140 below) according to an embodiment. The apparatus 140 may be an independent device, or may be a component in an independent device, such as a chip or an integrated circuit.

In a possible implementation, the apparatus 140 may be the data processing apparatus in the embodiment shown in FIG. 4, or a component in the data processing apparatus, such as a chip or an integrated circuit.

In still another possible implementation, the apparatus 140 may be the second data processing apparatus in the embodiment shown in FIG. 13, or a component in the second data processing apparatus, such as a chip or an integrated circuit.

The apparatus 140 includes an obtaining unit 1401 and a storage unit 1402.

The obtaining unit 1401 is configured to obtain coverage information of a roadside device, where the coverage information includes coverage region information that indicates at least one coverage region of the roadside device and coverage capability information that indicates a coverage capability of the roadside device in the at least one coverage region.

The storage unit 1402 is configured to store the coverage information as map data.

For the coverage information, the coverage region, the coverage region information, the coverage capability, and the coverage capability information, refer to the foregoing description. Details are not described herein again.

It may be understood that, in the apparatus embodiments, division into a plurality of units or modules is merely logical division based on functions, and is not intended to limit a specific structure of the apparatus. In implementation, some function modules may be subdivided into more fine function modules, and some function modules may be combined into one function module. However, regardless of whether the function modules are subdivided or combined, general procedures performed by the apparatus 140 in a data processing process are the same. In some embodiments, each unit corresponds to respective program code (or a program instruction). When the program code corresponding to the unit is run on a processor, the unit is controlled by the processor to execute a corresponding procedure to implement a corresponding function.

Figure 15:
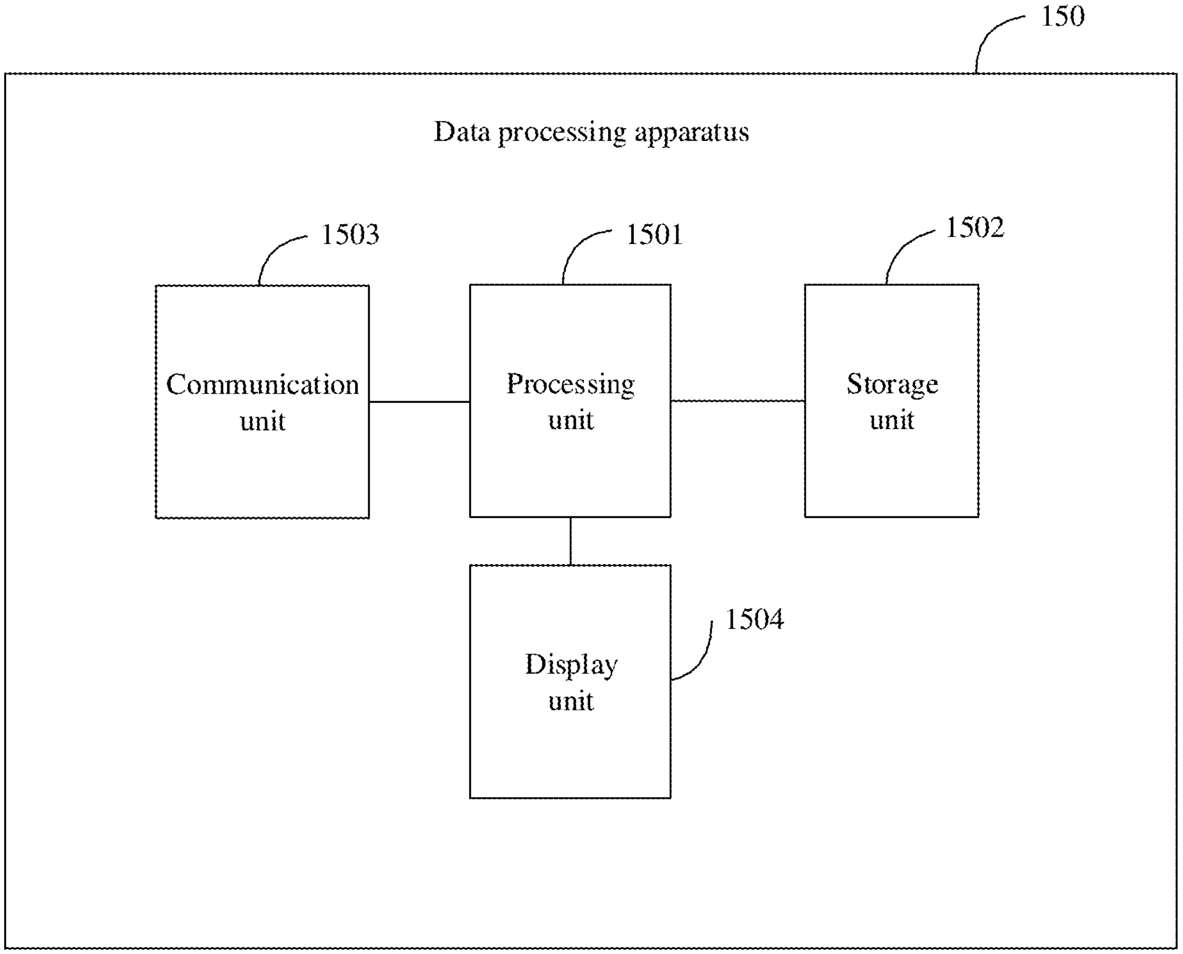
FIG. 15 is a schematic diagram of a structure of another data processing apparatus according to an embodiment.

FIG. 15 is a schematic diagram of a structure of a data processing apparatus 150 (referred to as an apparatus 150 below) according to an embodiment. The apparatus 150 may be an independent device, or may be a component in an independent device, such as a chip or an integrated circuit.

The apparatus 150 includes a processing unit 1501, a storage unit 1502, a communication unit 1503, and a display unit 1504.

In one case, the processing unit 1501 is configured to generate coverage information of a roadside device, where the coverage information includes coverage region information that indicates at least one coverage region of the roadside device and coverage capability information that indicates a coverage capability of the roadside device in the at least one coverage region. The storage unit 1502 is configured to store the coverage information generated by the processing unit 1501 as map data.

In another case, the communication unit 1503 is configured to receive coverage information of a roadside device, where the coverage information includes coverage region information that indicates at least one coverage region of the roadside device and coverage capability information that indicates a coverage capability of the roadside device in the at least one coverage region. The storage unit 1502 is configured to store the coverage information received by the communication unit 1503 as map data.

For the coverage information, the coverage region, the coverage region information, the coverage capability, and the coverage capability information, refer to the foregoing description. Details are not described herein again.

As an optional unit in the apparatus 150, the display unit 1504 is configured to display the coverage information on a display interface.

Optionally, the communication unit 1503 is configured to send the coverage information.

Optionally, the processing unit 1501 is further configured to generate a control signal for controlling a vehicle based on the coverage information.

Optionally, the processing unit 1501 is further configured to perform information processing based on the coverage information, for example, determine confidence of the sensing information or determine a safety level of the vehicle.

Figure 16:
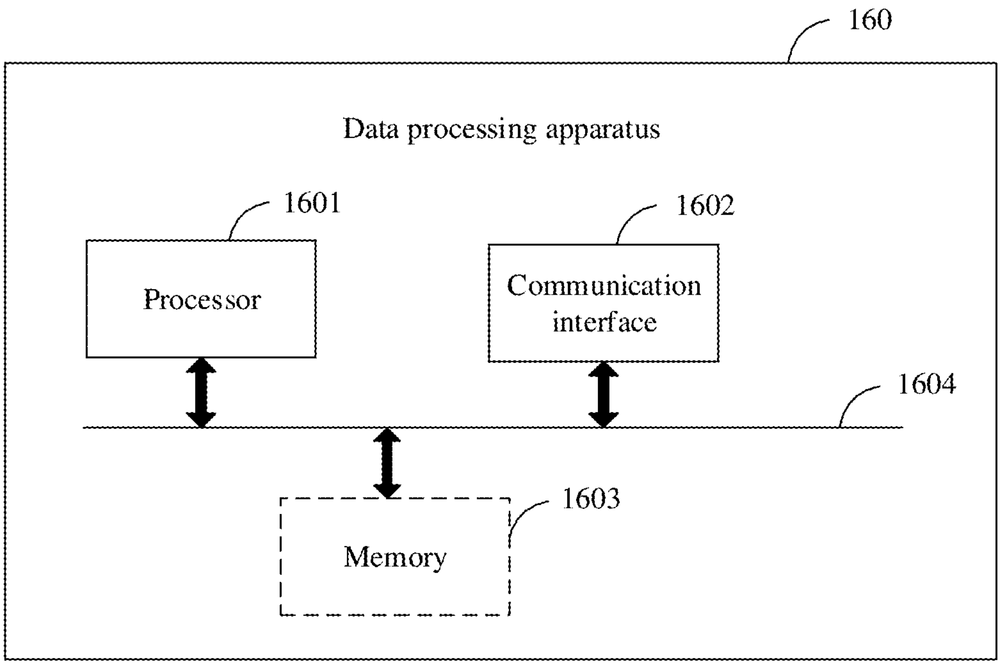
FIG. 16 is a schematic diagram of a structure of still another data processing apparatus according to an embodiment.

FIG. 16 is a schematic diagram of a structure of a data processing apparatus 160 according to an embodiment. The apparatus 160 may be an independent device (for example, one of a node or a terminal), or may be a component in an independent device, such as a chip or an integrated circuit. The apparatus 160 may include at least one processor 1601 and a communication interface 1602. Further, optionally, the apparatus 160 may further include at least one memory 1603. Further, optionally, the apparatus 160 may further include a bus 1604. The processor 1601, the communication interface 1602, and the memory 1603 are connected through the bus 1604.

The processor 1601 is a module that performs an arithmetic operation and/or a logical operation, and may be one or a combination of a plurality of processing modules such as a central processing unit (CPU), a graphics processing unit (GPU), a microprocessor unit (MPU), an application-specific integrated circuit (ASIC), a field programmable logic gate array (FPGA), a complex programmable logic device (CPLD), a coprocessor (which assists a central processing unit to complete corresponding processing and application), and a microcontroller unit (MCU).

The communication interface 1602 may be configured to provide an information input or output for the at least one processor. The communication interface 1602 may be configured to receive data sent from the outside and/or send data to the outside, and may be a wired link interface such as an Ethernet cable, or may be a wireless link. (Wi-Fi, Bluetooth, universal wireless transmission, in-vehicle short-range communication technology, a short-range wireless communication technology and the like) interface. Optionally, the communication interface 1602 may further include a transmitter (for example, a radio frequency transmitter or an antenna), a receiver, or the like coupled to the interface.

For example, the communication interface 1602 may further include an antenna. An electromagnetic wave is received by using the antenna. The communication interface 1602 may further perform frequency modulation and filtering processing on an electromagnetic wave signal, and send the processed signal to the processor 1601. For another example, the communication interface 1602 may further receive a to-be-sent signal from the processor 1601, perform frequency modulation and amplification on the signal, and convert the signal into an electromagnetic wave for radiation through the antenna.

The memory 1603 is configured to provide storage space, and the storage space may store data such as an operating system and a computer program. The memory 1603 may be one or a combination of a random access memory (RAM), a read-only memory (ROM), an erasable programmable read-only memory (EPROM), a portable read-only memory (CD-ROM), or the like.

The at least one processor 1601 in the apparatus 160 is configured to invoke a computer program stored in the at least one memory 1603, to perform the foregoing method, for example, the method described in the embodiments shown in FIG. 4 and FIG. 13.

In a possible implementation, the apparatus 160 may be the data processing apparatus in the embodiment shown in FIG. 4, or a component in the data processing apparatus, such as a chip or an integrated circuit.

In still another possible implementation, the apparatus 160 may be the second data processing apparatus in the embodiment shown in FIG. 13, or a component in the second data processing apparatus, such as a chip or an integrated circuit.

An embodiment further provides a terminal. The terminal is configured to implement the method described in the embodiment shown in FIG. 4 or FIG. 13. The terminal includes, but is not limited to, a vehicle or a portable terminal.

In an implementation, the terminal includes the foregoing apparatus, for example, the apparatus shown in FIG. 14, FIG. 15, or FIG. 16.

An embodiment further provides a non-transitory computer-readable storage medium.

The non-transitory computer-readable storage medium stores a computer program. When the computer program is run on one or more processors, the method in the embodiment shown in FIG. 4 or FIG. 13 is implemented.

An embodiment further provides a computer program product. When the computer program product runs on one or more processors, the method in the embodiment shown in FIG. 4 is implemented.

An embodiment further provides a chip system. The chip system includes a communication interface and at least one processor. The communication interface is configured to provide information input/output for the at least one processor, and/or the communication interface is configured to send or receive data. The processor is configured to invoke a computer program (or computer instructions), to implement the method in the embodiment shown in FIG. 4 or FIG. 13.

It should be noted that in the embodiments, the computer program in the memory may be prestored, or may be downloaded from the internet and stored when the device is used. A source of the computer program in the memory is not limited. The coupling in embodiments may be an indirect coupling or a connection between apparatuses, units, or modules in an electrical form, a mechanical form, or another form, and is used for information exchange between the apparatuses, the units, or the modules.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer program instructions are loaded and executed on a computer, the procedure or functions according to embodiments are all or partially generated. The computer may be a general-purpose computer, a dedicated computer, a computer network, or another programmable apparatus. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The non-transitory computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the procedures of the methods in embodiments may be implemented by a computer program instructing related hardware. The program may be stored in a non-transitory computer-readable storage medium. When the program is run, the procedures of the methods in embodiments are performed. The foregoing storage medium includes any medium that can store program code, such as a ROM, a random access memory RAM, a magnetic disk, or an optical disc.

What is claimed is:

1. A method comprising:

periodically obtaining, by a moving vehicle, coverage region information of a roadside device, wherein the roadside device comprising at least one sensing device for collecting information describing a surrounding environment, wherein the coverage region information comprises coverage capability information that indicates a coverage capability of the roadside device in each of a plurality of coverage regions, wherein the plurality of coverage regions comprises a coverage scope provided by the coverage region information and each coverage region is based on a range of values of the coverage capability information, and wherein the range is based on a comparison between the collected information and a fusion sensing result generated from sensing data of a plurality of sensing devices within the surrounding environment; and storing the coverage region information as map data.

2. The method according to claim 1, wherein the plurality of coverage regions are classified into discrete levels corresponding to predefined ranges of the coverage capability.

3. The method according to claim 1, wherein the plurality of coverage regions comprises at least one sensing coverage region.

4. The method according to claim 3, wherein the sensing coverage region comprises a multi-device sensing coverage region, and the multi-device sensing coverage region and a coverage capability of the roadside device in the multi-device sensing coverage region are determined based on coverage capabilities of the plurality of sensing devices related to the roadside device.

5. The method according to claim 3, wherein the roadside device is related to a first sensing device and a second sensing device, the sensing coverage region comprises a first coverage region of the first sensing device and a second coverage region of the second sensing device, and the coverage capability information comprises first coverage capability information that indicates a coverage capability of the first sensing device in the first coverage region and second coverage capability information that indicates a coverage capability of the second sensing device in the second coverage region.

6. The method according to claim 1, wherein the coverage region information further comprises information that indicates a dead zone, and the dead zone comprises at least one of a communication dead zone and a sensing dead zone.

7. The method according to claim 1, wherein, based on the coverage capability in one of the plurality of coverage regions that is a communication coverage region, the coverage capability information indicates at least one of:

a data accuracy rate, a packet loss rate, a communication delay, communication stability, and signal strength.

8. The method according to claim 1, wherein, when the coverage capability is a coverage capability of the roadside device in a sensing coverage region, the coverage capability information indicates at least one of:

a sensing result accuracy rate, a false detection rate, a missing detection rate, a recall rate, sensing precision, detection stability, and detection location precision.

9. The method according to claim 1, wherein the coverage capability information indicates coverage capabilities in a plurality of environments.

10. The method according to claim 1, wherein the coverage region information further comprises an identifier of the roadside device.

11. The method according to claim 1, wherein the coverage region information further comprises a tile identifier.

12. The method according to claim 1, further comprising:

displaying the coverage region information on a display interface.

13. The method according to claim 1, further comprising:

sending the coverage region information.

14. The method according to claim 1, further comprising:

performing information processing or generating a control signal for controlling a vehicle, based on the coverage region information.

15. An apparatus comprising:

at least one processor; and one or more memories coupled to the at least one processor and storing programming instructions for execution, causing the at least one processor to:

periodically obtain coverage region information of a roadside device, wherein the roadside device comprising at least one sensing device for collecting information describing a surrounding environment, wherein the coverage region information comprises coverage capability information that indicates a coverage capability of the roadside device in each of a plurality of coverage regions, wherein the plurality of coverage regions comprises a coverage scope provided by the coverage region information and each coverage region is based on a range of values of the coverage capability information, and wherein the range is based on a comparison between the collected information and a fusion sensing result generated from sensing data of a plurality of sensing devices within the surrounding environment; and store the coverage region information as map data.

16. The apparatus according to claim 15, wherein the plurality of coverage regions are classified into discrete levels corresponding to predefined ranges of the coverage capability.

17. The apparatus according to claim 15, wherein the plurality of coverage regions comprises at least one sensing coverage region.

18. The apparatus according to claim 17, wherein the sensing coverage region comprises a multi-device sensing coverage region, and the multi-device sensing coverage region and a coverage capability of the roadside device in the multi-device sensing coverage region are determined based on coverage capabilities of the plurality of sensing devices related to the roadside device.

19. The apparatus according to claim 17, wherein the roadside device is related to a first sensing device and a second sensing device, the sensing coverage region comprises a first coverage region of the first sensing device and a second coverage region of the second sensing device, and wherein the coverage capability information comprises first coverage capability information that indicates a coverage capability of the first sensing device in the first coverage region and second coverage capability information that indicates a coverage capability of the second sensing device in the second coverage region.

20. The apparatus according to claim 15, wherein the coverage region information further comprises information that indicates a dead zone, and the dead zone comprises at least one of a communication dead zone and a sensing dead zone.

21. The apparatus according to claim 15, wherein, based on the coverage capability in one of the plurality of coverage regions that is a communication coverage region, the coverage capability information indicates at least one of:

a data accuracy rate, a packet loss rate, a communication delay, communication stability, and signal strength.

22. The apparatus according to claim 15, wherein, when the coverage capability is a coverage capability of the roadside device in a sensing coverage region, the coverage capability information indicates at least one of:

a sensing result accuracy rate, a false detection rate, a missing detection rate, a recall rate, sensing precision, detection stability, and detection location precision.

23. The apparatus according to claim 15, wherein the coverage capability information indicates coverage capabilities in a plurality of environments.

24. The apparatus according to claim 15, wherein the coverage region information further comprises an identifier of the roadside device.

25. The apparatus according to claim 15, wherein the coverage region information further comprises a tile identifier.

26. The apparatus according to claim 15, wherein the programming instructions are for execution further cause the at least one processor to:

display the coverage region information on a display interface.

27. The apparatus according to claim 15, wherein the programming instructions are for execution further cause the at least one processor to:

send the coverage region information.

28. The apparatus according to claim 15, wherein the programming instructions are for execution further cause the at least one processor to:

perform information processing or generate a control signal for controlling a vehicle, based on the coverage region information.

* * * * *